US012623774B2

(12) United States Patent
Thompson et al.

(10) Patent No.: US 12,623,774 B2
(45) **Date of Patent: \*May 12, 2026**

(54) AUTONOMOUS AERIAL VEHICLE HARDWARE CONFIGURATION

(71) Applicant: Skydio, Inc., San Mateo, CA (US)

(72) Inventors: Benjamin Scott Thompson, San Carlos, CA (US); Adam Parker Bry, Redwood City, CA (US); Asher Mendel Robbins-Rothman, Redwood City, CA (US); Abraham Galton Bachrach, Emerald Hills, CA (US); Yevgeniy Kozlenko, Mountain View, CA (US); Kevin Patrick Smith O'Leary, San Francisco, CA (US); Patrick Allen Lowe, Palo Alto, CA (US); Daniel Thomas Adams, Palo Alto, CA (US); Justin Michael Sadowski, Menlo Park, CA (US); Zachary Albert West, Mountain View, CA (US); Josiah Timothy VanderMey, Redwood City, CA (US)

(73) Assignee: Skydio, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/645,897

(22) Filed: Apr. 25, 2024

(65) Prior Publication Data

US 2025/0002144 A1    Jan. 2, 2025

Related U.S. Application Data

(60) Continuation of application No. 17/873,549, filed on Jul. 26, 2022, now Pat. No. 11,970,287, which is a (Continued)

(51) Int. Cl.
*B64C 27/32* (2006.01)
*B64C 27/00* (2006.01)
(Continued)

(52) U.S. Cl.
CPC ............ *B64C 27/32* (2013.01); *B64C 27/001* (2013.01); *B64C 39/024* (2013.01); *B64D 47/08* (2013.01);
(Continued)

(58) Field of Classification Search
CPC ..... B64C 27/32; B64C 27/001; B64C 39/024; B64D 47/08; B64U 20/87; B64U 10/14;
(Continued)

(56) References Cited

U.S. PATENT DOCUMENTS 2,834,573 A * 5/1958 Stalker .................... F04D 29/32
415/181
3,081,964 A * 3/1963 Quenzler ............ B64C 29/0033
244/54

(Continued)

FOREIGN PATENT DOCUMENTS

WO    WO 2018/036231 A1    3/2018

*Primary Examiner* — Medhat Badawi

(57) ABSTRACT

An introduced autonomous aerial vehicle can include multiple cameras for capturing images of a surrounding physical environment that are utilized for motion planning by an autonomous navigation system. In some embodiments, the cameras can be integrated into one or more rotor assemblies that house powered rotors to free up space within the body of the aerial vehicle. In an example embodiment, an aerial vehicle includes multiple upward-facing cameras and multiple downward-facing cameras with overlapping fields of view to enable stereoscopic computer vision in a plurality of directions around the aerial vehicle. Similar camera arrangements can also be implemented in fixed-wing aerial vehicles.

22 Claims, 52 Drawing Sheets

Related U.S. Application Data division of application No. 16/395,110, filed on Apr. 25, 2019, now Pat. No. 11,453,513.

(60) Provisional application No. 62/663,194, filed on Apr. 26, 2018.

(51) Int. Cl.

| | |
|---|---|
| *B64C 39/02* | (2023.01) |
| *B64D 47/08* | (2006.01) |
| *B64U 20/87* | (2023.01) |
| *G06V 20/13* | (2022.01) |
| *G06V 20/17* | (2022.01) |
| *B64U 10/14* | (2023.01) |
| *B64U 10/25* | (2023.01) |
| *B64U 20/30* | (2023.01) |
| *B64U 30/29* | (2023.01) |
| *B64U 50/39* | (2023.01) |
| *B64U 70/10* | (2023.01) |
| *B64U 101/30* | (2023.01) |

(52) U.S. Cl.
CPC ............. *B64U 20/87* (2023.01); *G06V 20/13* (2022.01); *G06V 20/17* (2022.01); *B64U 10/14* (2023.01); *B64U 10/25* (2023.01); *B64U 20/30* (2023.01); *B64U 30/29* (2023.01); *B64U 50/39* (2023.01); *B64U 70/10* (2023.01); *B64U 2101/30* (2023.01); *B64U 2201/10* (2023.01)

(58) Field of Classification Search
CPC ........ B64U 10/25; B64U 20/30; B64U 30/29; B64U 50/39; B64U 70/10; B64U 2101/30; B64U 2201/10; B64U 30/10; G06V 20/13; G06V 20/17
See application file for complete search history.

(56) References Cited

U.S. PATENT DOCUMENTS

| | | | | |
|---|---|---|---|---|
| 4,093,155 A * | 6/1978 | Kincaid, Jr. | ............ | B64C 27/12 |
| | | | | 416/171 |
| 4,123,020 A | 10/1978 | Korsak | | |
| 5,709,357 A * | 1/1998 | von Wilmowsky | .... | B64C 27/52 |
| | | | | 244/17.23 |
| 5,727,754 A * | 3/1998 | Carter, Jr. | ............ | B64C 27/02 |
| | | | | 244/17.11 |
| 6,233,003 B1 * | 5/2001 | Ono | ..................... | H04N 13/221 |
| | | | | 348/E13.008 |
| 6,352,411 B1 * | 3/2002 | Bucher | ................... | F04D 29/34 |
| | | | | 403/302 |
| 6,435,453 B1 * | 8/2002 | Carter, Jr. | ............. | B64C 27/02 |
| | | | | 244/17.11 |
| 6,487,779 B1 * | 12/2002 | Underthun | ............. | B26B 7/005 |
| | | | | 30/296.1 |
| 6,561,456 B1 | 5/2003 | Devine | | |
| 6,655,631 B2 * | 12/2003 | Austen-Brown | .... | B64D 27/355 |
| | | | | 244/12.4 |
| 6,802,694 B2 * | 10/2004 | Bucher | ................... | F04D 29/34 |
| | | | | 416/207 |
| 6,843,447 B2 | 1/2005 | Morgan | | |
| 7,448,571 B1 * | 11/2008 | Carter, Jr. | ............ | B64C 27/021 |
| | | | | 244/6 |
| 7,789,341 B2 | 9/2010 | Arlton et al. | | |
| 7,959,104 B2 * | 6/2011 | Kuntz | ................... | A63H 27/12 |
| | | | | 244/50 |
| 8,016,226 B1 | 9/2011 | Wood | | |
| 8,251,308 B2 | 8/2012 | Choi | | |
| 8,511,606 B1 | 8/2013 | Lutke et al. | | |
| 8,588,210 B2 | 11/2013 | Newberg et al. | | |
| 8,897,770 B1 | 11/2014 | Frolov et al. | | |
| 8,991,741 B2 | 3/2015 | Wang | | |
| 9,030,149 B1 * | 5/2015 | Chen | ..................... | F16M 11/04 |
| | | | | 318/648 |
| 9,120,560 B1 | 9/2015 | Armer et al. | | |
| 9,139,310 B1 | 9/2015 | Wang | | |
| 9,284,058 B2 | 3/2016 | Wang | | |
| 9,457,901 B2 * | 10/2016 | Bertrand | ............. | B64U 30/293 |
| 9,469,394 B2 * | 10/2016 | Vaughn | ................. | B64U 10/13 |
| 9,567,076 B2 * | 2/2017 | Zhang | .................... | B64U 20/87 |
| 9,643,720 B2 * | 5/2017 | Hesselbarth | ........... | C12M 23/46 |
| 9,678,506 B2 * | 6/2017 | Bachrach | .......... | G01C 21/1656 |
| 9,714,090 B2 | 7/2017 | Frolov et al. | | |
| 9,718,564 B1 | 8/2017 | Beckman et al. | | |
| 9,764,829 B1 * | 9/2017 | Beckman | ............ | B64C 29/0033 |
| 9,764,836 B1 | 9/2017 | Elzinga et al. | | |
| 9,783,075 B2 | 10/2017 | Henry et al. | | |
| 9,798,322 B2 * | 10/2017 | Bachrach | ............ | G05D 1/0094 |
| 9,821,909 B2 * | 11/2017 | Moshe | .................. | B64C 27/22 |
| 9,834,305 B2 * | 12/2017 | Taylor | ................... | B64U 30/10 |
| 9,840,339 B1 | 12/2017 | O'brien et al. | | |
| 9,891,621 B2 * | 2/2018 | Bachrach | ............ | G05D 1/0027 |
| 9,930,298 B2 | 3/2018 | Bevirt | | |
| D816,546 S * | 5/2018 | Wang | ......................... | D12/16.1 |
| 9,972,212 B1 * | 5/2018 | Sperindeo | ................. | G06T 7/90 |
| 10,011,354 B2 * | 7/2018 | Goldstein | ............ | B64U 30/293 |
| 10,040,553 B2 | 8/2018 | Frolov et al. | | |
| 10,099,793 B2 | 10/2018 | Ullman et al. | | |
| 10,104,289 B2 * | 10/2018 | Enriquez | ............... | G03B 31/00 |
| 10,137,983 B2 * | 11/2018 | Horn | ..................... | B64U 10/20 |
| 10,207,820 B2 | 2/2019 | Sullivan et al. | | |
| 10,246,184 B2 | 4/2019 | Ragland | | |
| 10,315,761 B2 * | 6/2019 | McCullough | ........... | B64C 39/02 |
| 10,351,235 B2 * | 7/2019 | Karem | ................... | B64C 39/12 |
| 10,386,188 B2 * | 8/2019 | Tian | ........................ | G01S 17/86 |
| 10,435,176 B2 * | 10/2019 | McClure | ............... | G05D 1/102 |
| 10,453,348 B2 | 10/2019 | Speasl et al. | | |
| 10,455,155 B1 * | 10/2019 | Kalinowski | .......... | H04N 23/685 |
| 10,467,685 B1 | 11/2019 | Brisson et al. | | |
| 10,494,094 B2 * | 12/2019 | Foley | ..................... | B64U 50/19 |
| 10,513,329 B2 * | 12/2019 | Ou | ........................ | B64U 30/20 |
| 10,520,943 B2 * | 12/2019 | Martirosyan | ........... | G06T 7/292 |
| 10,549,850 B1 | 2/2020 | Ryan et al. | | |
| 10,611,048 B1 * | 4/2020 | Helsing | ................ | B27K 3/0235 |
| 10,612,523 B1 * | 4/2020 | Srinivasan | ............. | F03D 13/25 |
| 10,618,650 B2 * | 4/2020 | Hasinski | ................ | B64U 30/26 |
| 10,618,656 B2 | 4/2020 | Campbell | | |
| 10,633,092 B2 | 4/2020 | Willford | | |
| 10,647,404 B2 * | 5/2020 | Sugaki | ................... | B64C 27/56 |
| 10,669,023 B2 * | 6/2020 | Heinen | ................. | B64U 10/16 |
| 10,676,188 B2 * | 6/2020 | Campbell | .............. | B64C 27/26 |
| 10,710,735 B2 | 7/2020 | Murrow | | |
| 10,717,524 B1 * | 7/2020 | Boyes | .................. | G06Q 10/083 |
| 10,793,270 B2 | 10/2020 | Chen et al. | | |
| 10,816,967 B2 * | 10/2020 | Bachrach | ............... | G01C 23/00 |
| 10,831,186 B2 * | 11/2020 | Van Niekerk | ........ | G05D 1/0044 |
| D906,170 S * | 12/2020 | Thompson | .................. | D12/16.1 |
| 10,913,546 B2 | 2/2021 | Krauss et al. | | |
| 10,946,959 B2 * | 3/2021 | Nwosu | .................. | B64U 10/14 |
| 10,981,661 B2 * | 4/2021 | Oldroyd | ................. | B64C 39/08 |
| 10,992,865 B2 | 4/2021 | Kalinowski et al. | | |
| 11,007,290 B2 | 5/2021 | Kreitenberg et al. | | |
| 11,034,443 B2 | 6/2021 | Frolov et al. | | |
| 11,065,976 B2 | 7/2021 | Venturelli et al. | | |
| 11,091,258 B2 * | 8/2021 | Groninga | ............... | B64C 15/02 |
| 11,124,298 B2 | 9/2021 | Chen et al. | | |
| 11,130,566 B2 | 9/2021 | Mikic et al. | | |
| 11,148,805 B2 | 10/2021 | Cooper et al. | | |
| 11,292,598 B2 * | 4/2022 | Foley | ..................... | B64C 27/08 |
| 11,305,869 B1 | 4/2022 | Ward | | |
| 11,308,815 B2 | 4/2022 | Speasl et al. | | |
| 11,378,959 B1 | 7/2022 | Nielsen | | |
| 11,407,526 B2 | 8/2022 | Wang | | |
| 11,453,513 B2 * | 9/2022 | Thompson | ............ | B64C 39/024 |
| 11,465,739 B2 * | 10/2022 | Hymer | .................... | B64C 27/22 |
| 11,524,766 B2 | 12/2022 | Campbell | | |
| 11,530,028 B1 * | 12/2022 | Wiegman | ............... | B64D 31/06 |
| 11,597,515 B2 | 3/2023 | Passley | | |
| 11,619,952 B2 * | 4/2023 | Kwon | .................. | G05D 1/0808 |
| | | | | 701/3 |

(56) References Cited

U.S. PATENT DOCUMENTS

| | | | |
|---|---|---|---|
| 11,628,932 B2* | 4/2023 | Seung | B64U 60/50 |
| | | | 244/17.23 |
| 11,636,447 B1* | 4/2023 | Mishra | G07C 5/006 |
| | | | 705/305 |
| 11,636,771 B2 | 4/2023 | Barker et al. | |
| 11,738,613 B1* | 8/2023 | Spikes | B60B 19/02 |
| | | | 244/2 |
| 11,829,161 B2* | 11/2023 | Vander Mey | B64C 27/10 |
| 11,840,329 B1 | 12/2023 | Hinman | |
| 11,891,164 B1 | 2/2024 | Woodworth et al. | |
| 11,988,099 B2 | 5/2024 | Zatorski et al. | |
| 12,202,634 B1* | 1/2025 | England | B64U 20/87 |
| 2001/0046442 A1* | 11/2001 | Bucher | F04D 25/088 |
| | | | 416/210 R |
| 2003/0141409 A1 | 7/2003 | Lisoski et al. | |
| 2004/0118969 A1 | 6/2004 | Maccready et al. | |
| 2005/0224874 A1 | 10/2005 | Chakravarthi et al. | |
| 2006/0192046 A1 | 8/2006 | Heath et al. | |
| 2006/0249622 A1 | 11/2006 | Steele | |
| 2006/0251522 A1* | 11/2006 | Matheny | F01D 5/326 |
| | | | 416/219 R |
| 2006/0266881 A1 | 11/2006 | Hughey | |
| 2007/0085904 A1 | 4/2007 | Heyworth | |
| 2008/0251308 A1* | 10/2008 | Molnar | B64C 27/02 |
| | | | 180/209 |
| 2009/0283629 A1* | 11/2009 | Kroetsch | B64U 20/40 |
| | | | 244/17.23 |
| 2009/0294573 A1 | 12/2009 | Wilson et al. | |
| 2010/0171001 A1* | 7/2010 | Karem | G05D 1/0858 |
| | | | 244/76 R |
| 2011/0001020 A1* | 1/2011 | Forgac | B64C 29/0033 |
| | | | 244/7 A |
| 2011/0139665 A1 | 6/2011 | Madsen | |
| 2011/0268194 A1* | 11/2011 | Nagano | H04N 21/23614 |
| | | | 375/E7.076 |
| 2012/0232718 A1* | 9/2012 | Rischmuller | A63H 30/04 |
| | | | 701/2 |
| 2012/0287274 A1* | 11/2012 | Bevirt | H04N 7/185 |
| | | | 348/E7.085 |
| 2013/0051778 A1* | 2/2013 | Dimotakis | G03B 15/006 |
| | | | 396/12 |
| 2013/0099063 A1* | 4/2013 | Grip | B64D 27/353 |
| | | | 156/60 |
| 2013/0175390 A1* | 7/2013 | Woodworth | B64D 1/14 |
| | | | 244/54 |
| 2013/0176423 A1* | 7/2013 | Rischmuller | A63H 27/12 |
| | | | 348/114 |
| 2013/0251525 A1 | 9/2013 | Saiz | |
| 2013/0280084 A1* | 10/2013 | Nagle | B64C 11/26 |
| | | | 29/889.6 |
| 2014/0356174 A1* | 12/2014 | Wang | A63H 27/001 |
| | | | 416/204 R |
| 2015/0136897 A1* | 5/2015 | Seibel | B64U 30/293 |
| | | | 244/6 |
| 2015/0137424 A1* | 5/2015 | Lyons | B29C 43/54 |
| | | | 264/317 |
| 2015/0149000 A1* | 5/2015 | Rischmuller | G05D 1/102 |
| | | | 701/7 |
| 2015/0259066 A1* | 9/2015 | Johannesson | B64U 20/50 |
| | | | 244/17.27 |
| 2015/0266571 A1* | 9/2015 | Bevirt | B64C 29/0033 |
| | | | 244/7 C |
| 2015/0321758 A1* | 11/2015 | Sarna, II | G05D 1/0011 |
| | | | 244/63 |
| 2015/0370250 A1* | 12/2015 | Bachrach | G01C 23/00 |
| | | | 701/2 |
| 2016/0009387 A1 | 1/2016 | Kummer et al. | |
| 2016/0009413 A1 | 1/2016 | Lee et al. | |
| 2016/0011592 A1 | 1/2016 | Zhang et al. | |
| 2016/0129998 A1* | 5/2016 | Welsh | B64U 20/92 |
| | | | 244/12.3 |
| 2016/0137298 A1* | 5/2016 | Youngblood | A63H 27/12 |
| | | | 244/17.23 |
| 2016/0144957 A1 | 5/2016 | Claridge et al. | |
| 2016/0144969 A1 | 5/2016 | Rawdon et al. | |
| 2016/0185466 A1 | 6/2016 | Dreano, Jr. | |
| 2016/0214713 A1* | 7/2016 | Cragg | B64U 30/20 |
| 2016/0214715 A1* | 7/2016 | Meffert | B64U 20/87 |
| 2016/0257426 A1 | 9/2016 | Mozer | |
| 2016/0286128 A1* | 9/2016 | Zhou | H04N 23/698 |
| 2016/0327950 A1* | 11/2016 | Bachrach | H04N 23/661 |
| 2016/0332739 A1 | 11/2016 | Wong | |
| 2016/0340028 A1* | 11/2016 | Datta | B64U 30/296 |
| 2016/0364989 A1 | 12/2016 | Speasl et al. | |
| 2016/0376000 A1* | 12/2016 | Kohstall | B64C 37/00 |
| | | | 114/313 |
| 2016/0376004 A1* | 12/2016 | Claridge | B64C 19/00 |
| | | | 701/3 |
| 2017/0023949 A1 | 1/2017 | Fisher et al. | |
| 2017/0036771 A1* | 2/2017 | Woodman | B64C 25/54 |
| 2017/0050749 A1 | 2/2017 | Pilskalns | |
| 2017/0057630 A1* | 3/2017 | Schwaiger | B64C 3/385 |
| 2017/0073085 A1 | 3/2017 | Tremblay et al. | |
| 2017/0075351 A1* | 3/2017 | Liu | H04N 23/685 |
| 2017/0113793 A1* | 4/2017 | Toulmay | B64C 27/22 |
| 2017/0113800 A1* | 4/2017 | Freeman | B64U 30/299 |
| 2017/0117676 A1 | 4/2017 | James et al. | |
| 2017/0126935 A1 | 5/2017 | Tai et al. | |
| 2017/0129464 A1 | 5/2017 | Wang et al. | |
| 2017/0144776 A1 | 5/2017 | Fisher et al. | |
| 2017/0158328 A1* | 6/2017 | Foley | B64U 30/296 |
| 2017/0217585 A1* | 8/2017 | Hulsman | B64U 50/13 |
| 2017/0225802 A1 | 8/2017 | Lussier et al. | |
| 2017/0233069 A1* | 8/2017 | Apkarian | B64U 40/20 |
| | | | 244/7 R |
| 2017/0240061 A1 | 8/2017 | Waters | |
| 2017/0240273 A1 | 8/2017 | Yuen | |
| 2017/0240274 A1* | 8/2017 | Regev | B64U 10/20 |
| 2017/0244270 A1* | 8/2017 | Waters | H02J 50/90 |
| 2017/0297681 A1* | 10/2017 | Yamada | B64U 10/13 |
| 2017/0297738 A1* | 10/2017 | von Flotow | B64D 1/02 |
| 2017/0301111 A1* | 10/2017 | Zhao | H04N 23/90 |
| 2017/0327218 A1* | 11/2017 | Morin | B64C 3/385 |
| 2017/0329324 A1 | 11/2017 | Bachrach et al. | |
| 2018/0024570 A1* | 1/2018 | Hutson | G05D 1/102 |
| | | | 701/4 |
| 2018/0032042 A1* | 2/2018 | Turpin | H04N 13/296 |
| 2018/0046187 A1* | 2/2018 | Martirosyan | G05D 1/0094 |
| 2018/0093171 A1* | 4/2018 | Mallinson | A63F 7/20 |
| 2018/0093781 A1* | 4/2018 | Mallinson | B64F 1/04 |
| 2018/0157276 A1* | 6/2018 | Fisher | G01C 21/18 |
| 2018/0162530 A1 | 6/2018 | Klein | |
| 2018/0181119 A1* | 6/2018 | Lee | G05D 1/0038 |
| 2018/0186464 A1 | 7/2018 | Woodworth et al. | |
| 2018/0194463 A1* | 7/2018 | Hasinski | B64U 30/20 |
| 2018/0208301 A1* | 7/2018 | Ye | B64U 30/29 |
| 2018/0208311 A1* | 7/2018 | Zhang | H04N 23/698 |
| 2018/0284575 A1* | 10/2018 | Sugaki | H04N 23/51 |
| 2018/0312253 A1* | 11/2018 | Zhao | G05D 1/106 |
| 2018/0312254 A1* | 11/2018 | Ni | B64U 30/293 |
| 2018/0326255 A1* | 11/2018 | Schranz | A63B 21/08 |
| 2018/0327091 A1 | 11/2018 | Burks et al. | |
| 2019/0002124 A1* | 1/2019 | Garvin | B64D 47/08 |
| 2019/0002127 A1 | 1/2019 | Straus et al. | |
| 2019/0023395 A1* | 1/2019 | Lee | G08G 5/74 |
| 2019/0023416 A1 | 1/2019 | Borko et al. | |
| 2019/0084673 A1* | 3/2019 | Chen | B64U 20/50 |
| 2019/0100313 A1* | 4/2019 | Campbell | B64U 10/14 |
| 2019/0102874 A1* | 4/2019 | Goja | G06Q 10/00 |
| 2019/0118944 A1* | 4/2019 | Kimchi | G08G 5/76 |
| 2019/0135403 A1* | 5/2019 | Perry | B64U 10/25 |
| 2019/0144100 A1* | 5/2019 | Samir | B64C 13/34 |
| | | | 244/39 |
| 2019/0168872 A1* | 6/2019 | Grubb | B64F 5/10 |
| 2019/0215457 A1 | 7/2019 | Enke et al. | |
| 2019/0248487 A1* | 8/2019 | Holtz | G06V 20/17 |
| 2019/0270526 A1 | 9/2019 | Hehn et al. | |
| 2019/0289193 A1* | 9/2019 | Bevirt | B64U 80/82 |
| 2019/0329877 A1 | 10/2019 | Benson et al. | |
| 2019/0329903 A1* | 10/2019 | Thompson | G06V 20/13 |

(56) References Cited

U.S. PATENT DOCUMENTS

| | | | |
|---|---|---|---|
| 2019/0377345 A1* | 12/2019 | Bachrach | G06V 20/17 |
| 2019/0378423 A1* | 12/2019 | Bachrach | H04L 67/12 |
| 2019/0379268 A1* | 12/2019 | Adams | H02K 41/0358 |
| 2020/0001990 A1* | 1/2020 | Jiang | B64C 11/02 |
| 2020/0023995 A1* | 1/2020 | Song | B64D 45/00 |
| 2020/0036896 A1 | 1/2020 | Kalinowski et al. | |
| 2020/0041996 A1* | 2/2020 | Bachrach | G05D 1/0094 |
| 2020/0064135 A1* | 2/2020 | Lai | G05D 1/101 |
| 2020/0073385 A1* | 3/2020 | Jobanputra | G06N 20/00 |
| 2020/0108930 A1* | 4/2020 | Foley | B64U 80/00 |
| 2020/0117183 A1 | 4/2020 | Moon et al. | |
| 2020/0140071 A1 | 5/2020 | Heinen et al. | |
| 2020/0156749 A1* | 5/2020 | Scacchi | B63H 3/008 |
| 2020/0164966 A1* | 5/2020 | Suzuki | B64U 50/19 |
| 2020/0165007 A1 | 5/2020 | Augugliaro et al. | |
| 2020/0277054 A1* | 9/2020 | Lee | B64D 45/00 |
| 2020/0391864 A1* | 12/2020 | Lee | B64U 20/87 |
| 2020/0407078 A1* | 12/2020 | Shimamoto | B64F 1/222 |
| 2021/0009269 A1 | 1/2021 | Chen et al. | |
| 2021/0021760 A1* | 1/2021 | Liu | H04N 23/90 |
| 2021/0061482 A1* | 3/2021 | Ulrich | B64C 27/82 |
| 2021/0070468 A1 | 3/2021 | Svirsky et al. | |
| 2021/0072770 A1* | 3/2021 | Kwon | G05D 1/042 |
| 2021/0107620 A1 | 4/2021 | Weekes et al. | |
| 2021/0107639 A1 | 4/2021 | Hymer | |
| 2021/0107646 A1 | 4/2021 | Sweeny et al. | |
| 2021/0107682 A1 | 4/2021 | Kozlenko et al. | |
| 2021/0107684 A1 | 4/2021 | Le | |
| 2021/0109312 A1* | 4/2021 | Honjo | G03B 15/006 |
| 2021/0197983 A1 | 7/2021 | Wang et al. | |
| 2021/0206487 A1* | 7/2021 | Iqbal | B64C 29/0083 |
| 2021/0214068 A1* | 7/2021 | Bry | B64D 47/08 |
| 2021/0261252 A1* | 8/2021 | Dayan | B64U 10/13 |
| 2021/0269174 A1 | 9/2021 | Shuff | |
| 2021/0276704 A1 | 9/2021 | Pantalone et al. | |
| 2021/0284335 A1 | 9/2021 | Mclaughlin et al. | |
| 2021/0309388 A1 | 10/2021 | Ratajczak et al. | |
| 2021/0314490 A1 | 10/2021 | Kalinowski et al. | |
| 2021/0362849 A1* | 11/2021 | Bower | B64C 9/00 |
| 2021/0403177 A1* | 12/2021 | Thompson | B64C 39/024 |
| 2022/0001982 A1 | 1/2022 | Chen et al. | |
| 2022/0009626 A1* | 1/2022 | Baharav | B64C 27/26 |
| 2022/0019247 A1 | 1/2022 | Dayan et al. | |
| 2022/0119102 A1* | 4/2022 | Shaanan | B64C 27/59 |
| 2022/0121836 A1 | 4/2022 | Dins et al. | |
| 2022/0177109 A1* | 6/2022 | Hefner | B64C 29/02 |
| 2022/0185475 A1* | 6/2022 | Foley | B64C 39/028 |
| 2022/0234745 A1 | 7/2022 | Abramov et al. | |
| 2022/0234747 A1* | 7/2022 | Bower | B60L 50/60 |
| 2022/0278538 A1* | 9/2022 | Kainzmaier | B64U 50/37 |
| 2022/0315224 A1* | 10/2022 | Kominami | B64U 50/19 |
| 2022/0324569 A1* | 10/2022 | Zhou | B64D 5/00 |
| 2022/0355952 A1* | 11/2022 | Thompson | B64C 27/32 |
| 2022/0363382 A1 | 11/2022 | Mccann | |
| 2022/0374013 A1 | 11/2022 | Bachrach et al. | |
| 2022/0411102 A1 | 12/2022 | Thompson et al. | |
| 2022/0411103 A1 | 12/2022 | Thompson et al. | |
| 2022/0412023 A1 | 12/2022 | Palombini | |
| 2023/0002074 A1 | 1/2023 | Thompson et al. | |
| 2023/0023246 A1 | 1/2023 | Mclaughlin et al. | |
| 2023/0121187 A1 | 4/2023 | Tazume | |
| 2023/0144408 A1 | 5/2023 | Thompson et al. | |
| 2023/0166862 A1* | 6/2023 | Thompson | B64C 39/024 244/17.23 |
| 2023/0250805 A1 | 8/2023 | Choi et al. | |
| 2023/0280742 A1* | 9/2023 | Bachrach | G05D 1/0094 701/2 |
| 2023/0280746 A1 | 9/2023 | Bachrach et al. | |
| 2023/0283902 A1* | 9/2023 | Flanigan | G05D 1/0038 701/3 |
| 2025/0002144 A1* | 1/2025 | Thompson | G06V 20/13 |

* cited by examiner

Objective 332

Target 334

Dead-zone 336

Weighting 338

Other Parameters 340

AUTONOMOUS AERIAL VEHICLE HARDWARE CONFIGURATION

CROSS-REFERENCE TO RELATED APPLICATION(S)

This application is a continuation of U.S. patent application Ser. No. 17/873,549, titled "AUTONOMOUS AERIAL VEHICLE HARDWARE CONFIGURATION," filed Jul. 26, 2022; which is a divisional of U.S. patent application Ser. No. 16/395,110, titled "AUTONOMOUS AERIAL VEHICLE HARDWARE CONFIGURATION," filed Apr. 25, 2019; which is entitled to the benefit and/or right of priority of U.S. Provisional Patent Application No. 62/663,194, titled "AUTONOMOUS UAV HARDWARE CONFIGURATIONS," filed Apr. 26, 2018, the contents of each of which are hereby incorporated by reference in their entirety for all purposes. This application is therefore entitled to a priority date of Apr. 26, 2018.

TECHNICAL FIELD

The present disclosure relates to autonomous aerial vehicle technology.

BACKGROUND

Vehicles can be configured to autonomously navigate a physical environment. For example, an autonomous vehicle with various onboard sensors can be configured to generate perception inputs based on the surrounding physical environment that are then used to estimate a position and/or orientation of the autonomous vehicle within the physical environment. In some cases, the perception inputs may include images of the surrounding physical environment captured by cameras on board the vehicle. An autonomous navigation system can then utilize these position and/or orientation estimates to guide the autonomous vehicle through the physical environment.

BRIEF DESCRIPTION OF THE DRAWINGS

FIG. 3B shows a block diagram of an example objective that can be applied as part of the objective-based motion planning illustrated in FIG. 3A.

DETAILED DESCRIPTION

Example Implementation of an Autonomous Aerial Vehicle

Figure 1A:
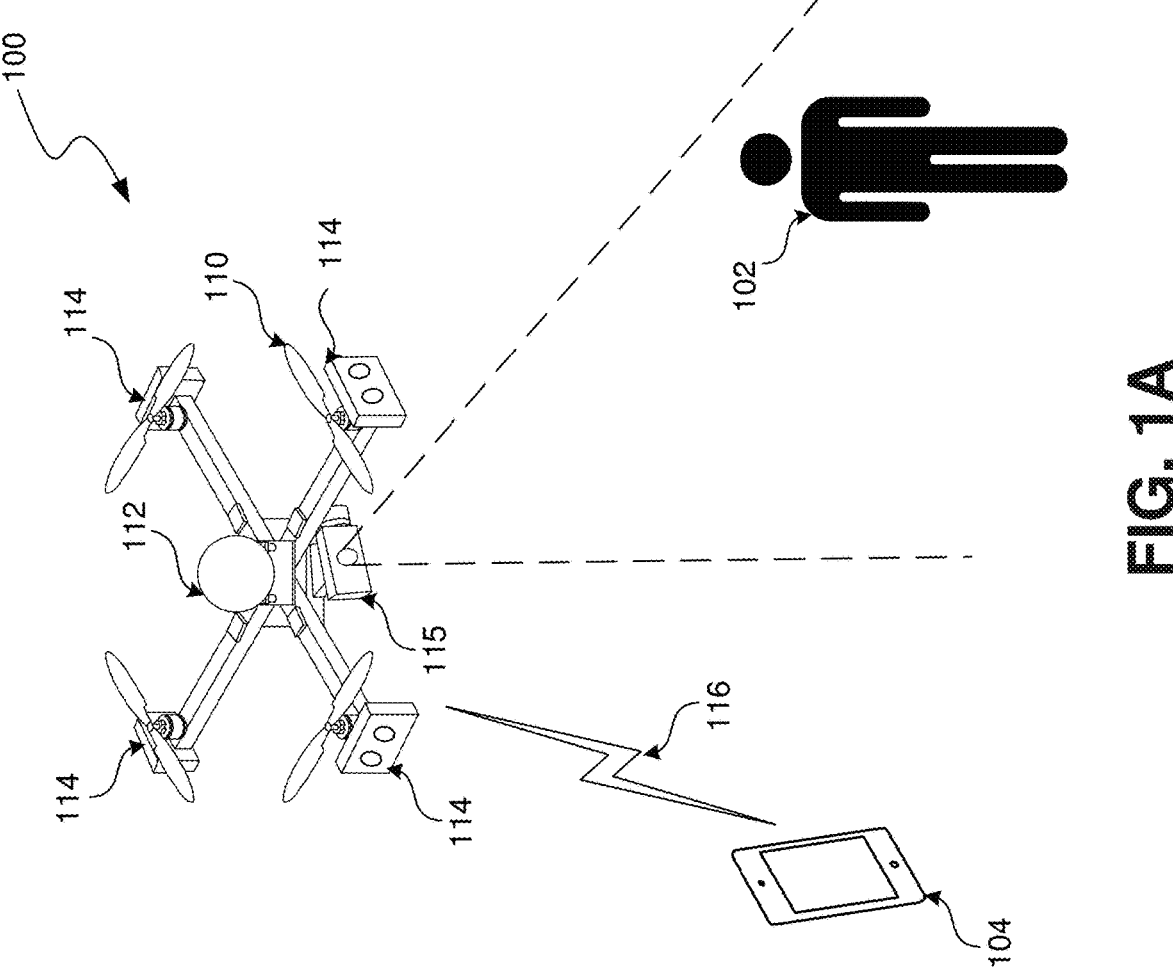
FIG. 1A shows a first example unmanned aerial vehicle (UAV).
Figure 1B:
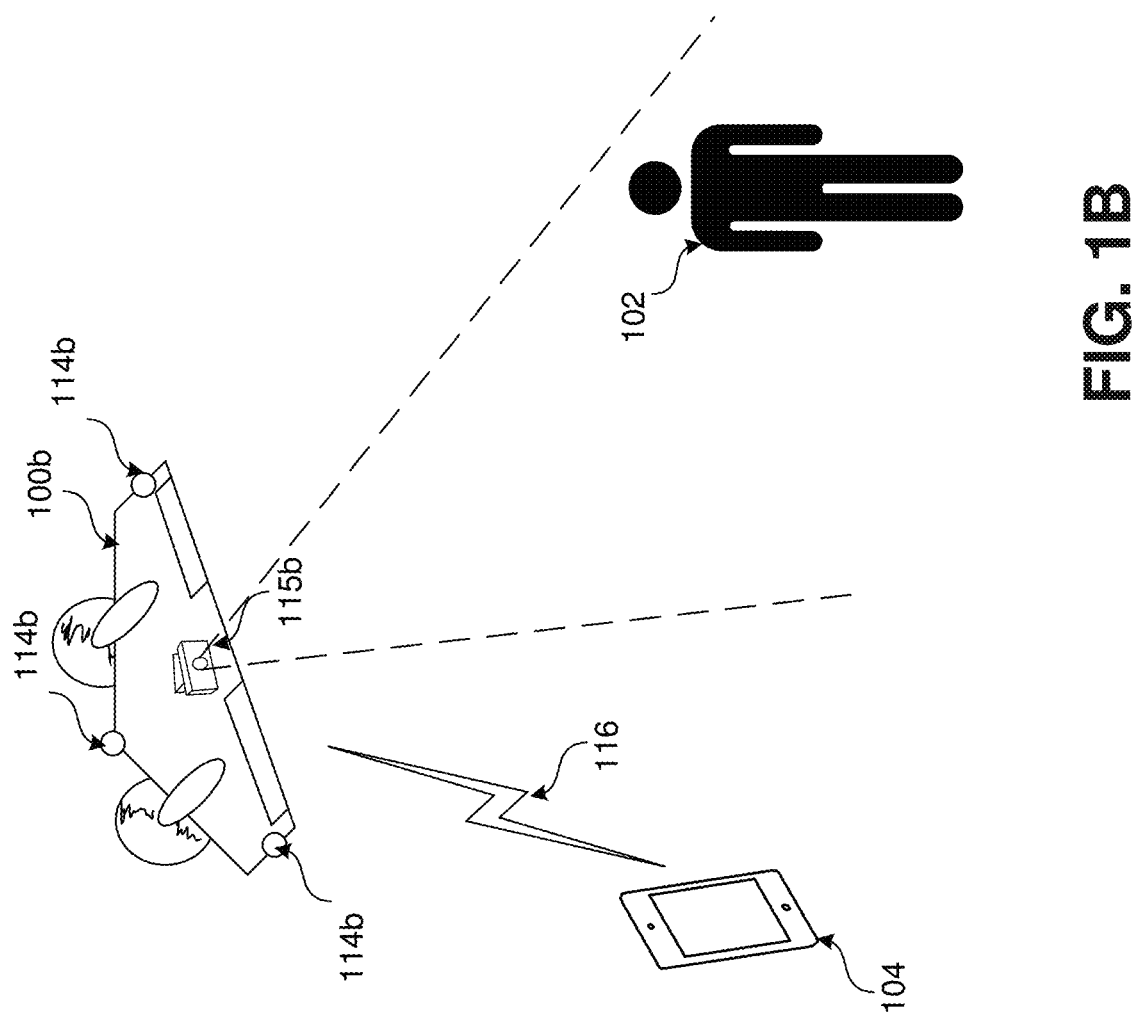
FIG. 1B shows a second example UAV.

FIGS. 1A and 1B show example implementations of autonomous aerial vehicles that can be configured according to the introduced technique. Specifically, FIG. 1A shows an example implementation of an unmanned aerial vehicle (UAV) 100 in the form of a rotor-based aircraft such as a "quadcopter." The example UAV 100 includes propulsion and control actuators 110 (e.g., powered rotors and/or aerodynamic control surfaces) for maintaining controlled flight, various sensors for automated navigation and flight control 112, and one or more image capture devices 114 and 115 for capturing images of the surrounding physical environment while in flight. "Images," in this context, include both still images and captured video. Although not shown in FIG. 1A, UAV 100 may also include other sensors (e.g., for capturing audio) and systems for communicating with other devices (e.g., a mobile device 104) via a wireless communication channel 116.

In the example depicted in FIG. 1A, the image capture devices 114 and/or 115 are depicted capturing images of an object 102 in the physical environment that happens to be a person. In some cases, the image capture devices 114/115 may be configured to capture images for display to users (e.g., as an aerial video platform) and/or, as described above, may also be configured for capturing images for use in autonomous navigation. In other words, the UAV 100 may autonomously (i.e., without direct human control) navigate the physical environment, for example, by processing images captured by any one or more image capture devices 114/115. While in autonomous flight, UAV 100 can also capture images using any one or more image capture devices that can be displayed in real time and/or recorded for later display at other devices (e.g., mobile device 104).

FIG. 1A shows an example configuration of a UAV 100 with multiple image capture devices configured for different purposes. In the example configuration shown in FIG. 1A, the UAV 100 includes multiple image capture devices 114 arranged about a perimeter of the UAV 100. The image capture devices 114 may be configured to capture images for use by a visual navigation system in guiding autonomous flight by the UAV 100 and/or a tracking system for tracking other objects in the physical environment (e.g., as described with respect to FIG. 2). Specifically, the example configuration of UAV 100 depicted in FIG. 1A includes an array of multiple stereoscopic image capture devices 114 placed around a perimeter of the UAV 100 so as to provide stereoscopic image capture up to a full 360 degrees around the UAV 100. However, as will be described, certain embodiments of the introduced technique include alternative arrangements of image capture devices. Accordingly, the arrangement of image capture devices 114 depicted in FIG. 1A is not to be construed as limiting.

In addition to the array of image capture devices 114, the UAV 100 depicted in FIG. 1A also includes another image capture device 115 configured to capture images that are to be displayed but not necessarily used for autonomous navigation. In some embodiments, the image capture device 115 may be similar to the image capture devices 114 except in how captured images are utilized. However, in other embodiments, the image capture devices 115 and 114 may be configured differently to suit their respective roles.

In many cases, it is generally preferable to capture images that are intended to be viewed at as high a resolution as possible given hardware and software constraints. On the other hand, if used for visual navigation and/or object tracking, lower resolution images may be preferable in certain contexts to reduce processing load and provide more robust motion planning capabilities. Accordingly, in some embodiments, the image capture device 115 may be configured to capture relatively high resolution (e.g., above 3840×2160) color images, while the image capture devices 114 may be configured to capture relatively low resolution (e.g., below 320×240) grayscale images. Again, these configurations are examples provided to illustrate how image capture devices 114 and 115 may differ depending on their respective roles and constraints of the system. Other implementations may configure such image capture devices differently.

The UAV 100 can be configured to track one or more objects such as a human subject 102 through the physical environment based on images received via the image capture devices 114 and/or 115. Further, the UAV 100 can be configured to track image capture of such objects, for example, for filming purposes. In some embodiments, the image capture device 115 is coupled to the body of the UAV 100 via an adjustable mechanism that allows for one or more degrees of freedom of motion relative to a body of the UAV 100. The UAV 100 may be configured to automatically adjust an orientation of the image capture device 115 so as to track image capture of an object (e.g., human subject 102) as both the UAV 100 and object are in motion through the physical environment. In some embodiments, this adjustable mechanism may include a mechanical gimbal mechanism that rotates an attached image capture device about one or more axes. In some embodiments, the gimbal mechanism may be configured as a hybrid mechanical-digital gimbal system coupling the image capture device 115 to the body of the UAV 100. In a hybrid mechanical-digital gimbal system, orientation of the image capture device 115 about one or more axes may be adjusted by mechanical means, while orientation about other axes may be adjusted by digital means. For example, a mechanical gimbal mechanism may handle adjustments in the pitch of the image capture device 115, while adjustments in the roll and yaw are accomplished digitally by transforming (e.g., rotating, panning, etc.) the captured images so as to effectively provide at least three degrees of freedom in the motion of the image capture device 115 relative to the UAV 100.

In some embodiments, an autonomous aerial vehicle may instead be configured as a fixed-wing aircraft, for example, as depicted in FIG. 1B. Similar to the UAV 100 described with respect to FIG. 1A, the fixed-wing UAV 100b shown in FIG. 1B may include multiple image capture devices 114b arranged around the UAV 100b that are configured to capture images for use by a visual navigation system in guiding autonomous flight by the UAV 100b. The example fixed-wing UAV 100b may also include a subject image capture device 115b configured to capture images (e.g., of subject 102) that are to be displayed but not necessarily used for navigation. For simplicity, certain embodiments of the introduced technique may be described herein with reference to the UAV 100 of FIG. 1A; however, a person having ordinary skill in the art will recognize that such descriptions can be similarly applied in the context of the fixed-wing UAV 100b of FIG. 1B.

The mobile device 104 depicted in both FIGS. 1A and 1B may include any type of mobile device such as a laptop computer, a table computer (e.g., Apple iPad™), a cellular telephone, a smart phone (e.g., Apple iPhone™), a handled gaming device (e.g., Nintendo Switch™), a single-function remote control device, or any other type of device capable of receiving user inputs, transmitting signals for delivery to the UAV 100 (e.g., based on the user inputs), and/or presenting information to the user (e.g., based on sensor data gathered by the UAV 100). In some embodiments, the mobile device 104 may include a touch screen display and an associated graphical user interface (GUI) for receiving user inputs and presenting information. In some embodiments, the mobile device 104 may include various sensors (e.g., an image capture device, accelerometer, gyroscope, GPS receiver, etc.) that can collect sensor data. In some embodiments, such sensor data can be communicated to the UAV 100, for example, for use by an onboard navigation system of the UAV 100.

Figure 2:
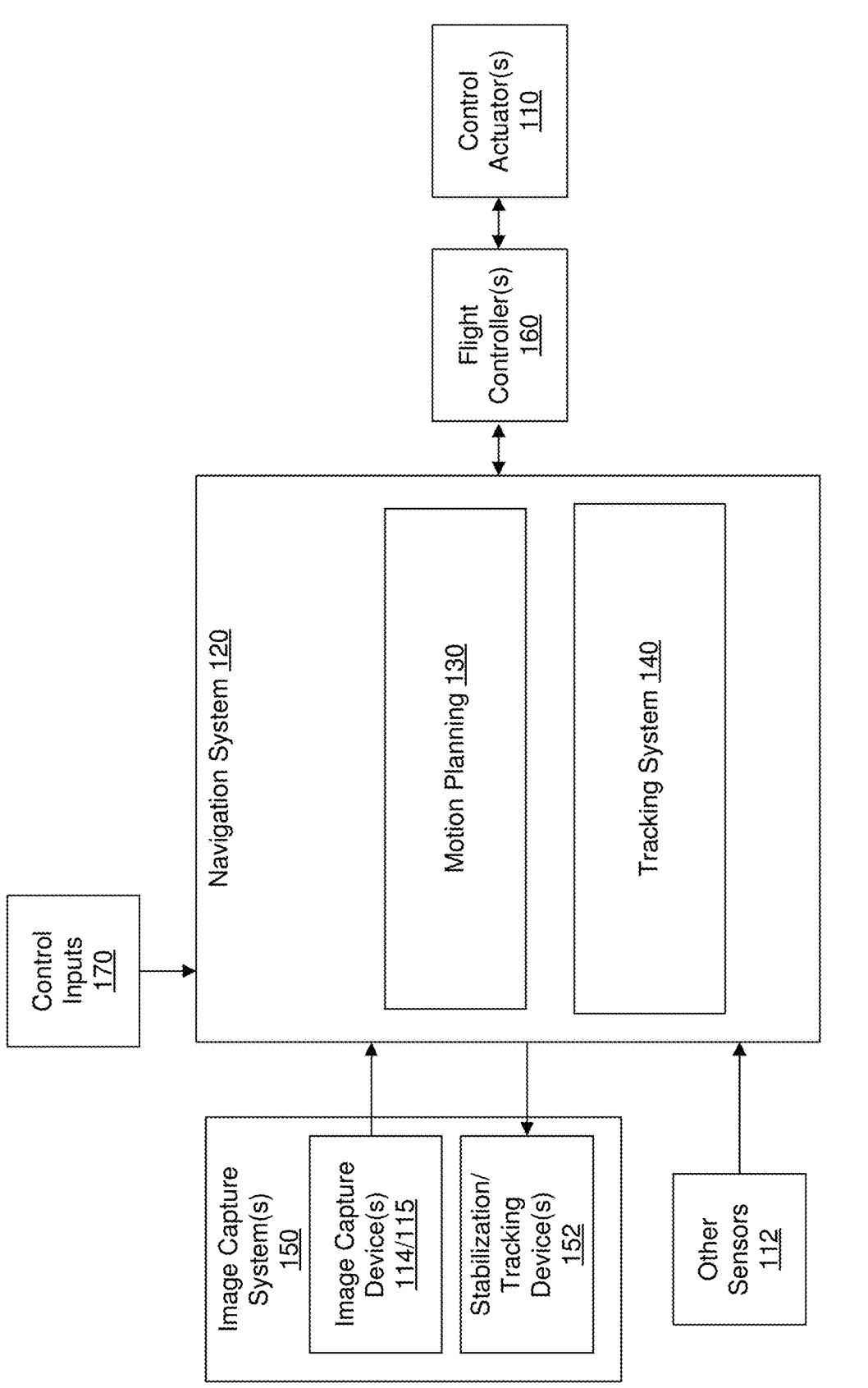
FIG. 2 shows a block diagram of an example navigation system for a UAV.

FIG. 2 is a block diagram that illustrates an example navigation system 120 that may be implemented as part of the example UAV 100. The navigation system 120 may include any combination of hardware and/or software. For example, in some embodiments, the navigation system 120 and associated subsystems may be implemented as instructions stored in memory and executable by one or more processors.

As shown in FIG. 2, the example navigation system 120 includes a motion planner 130 (also referred to herein as a "motion planning system") for autonomously maneuvering the UAV 100 through a physical environment and a tracking system 140 for tracking one or more objects in the physical environment. Note that the arrangement of systems shown in FIG. 2 is an example provided for illustrative purposes and is not to be construed as limiting. For example, in some embodiments, the tracking system 140 may be separate from the navigation system 120. Further, the subsystems making up the navigation system 120 may not be logically separated as shown in FIG. 2 and instead may effectively operate as a single integrated navigation system.

In some embodiments, the motion planner 130, operating separately or in conjunction with the tracking system 140, is configured to generate a planned trajectory through a three-dimensional (3D) space of a physical environment based, for example, on images received from image capture devices 114 and/or 115, data from other sensors 112 (e.g., IMU, GPS, proximity sensors, etc.), and/or one or more control inputs 170. Control inputs 170 may be from external sources such as a mobile device operated by a user or may be from other systems on board the UAV 100.

In some embodiments, the navigation system 120 may generate control commands configured to cause the UAV 100 to maneuver along the planned trajectory generated by the motion planner 130. For example, the control commands may be configured to control one or more control actuators 110 (e.g., powered rotors and/or control surfaces) to cause the UAV 100 to maneuver along the planned 3D trajectory. Alternatively, a planned trajectory generated by the motion planner 130 may be output to a separate flight controller 160 that is configured to process trajectory information and generate appropriate control commands configured to control the one or more control actuators 110.

The tracking system 140, operating separately or in conjunction with the motion planner 130, may be configured to track one or more objects in the physical environment based, for example, on images received from image capture devices 114 and/or 115, data from other sensors 112 (e.g., IMU, GPS, proximity sensors, etc.), one or more control inputs 170 from external sources (e.g., from a remote user, navigation application, etc.), and/or one or more specified tracking objectives. Tracking objectives may include, for example, a designation by a user to track a particular detected object in the physical environment or a standing objective to track objects of a particular classification (e.g., people).

As alluded to above, the tracking system 140 may communicate with the motion planner 130, for example, to maneuver the UAV 100 based on measured, estimated, and/or predicted positions, orientations, and/or trajectories of the UAV 100 itself and of other objects in the physical environment. For example, the tracking system 140 may communicate a navigation objective to the motion planner 130 to maintain a particular separation distance to a tracked object that is in motion.

In some embodiments, the tracking system 140, operating separately or in conjunction with the motion planner 130, is further configured to generate control commands configured to cause one or more stabilization/tracking devices 152 to adjust an orientation of any image capture devices 114/115 relative to the body of the UAV 100 based on the tracking of one or more objects. Such stabilization/tracking devices 152 may include a mechanical gimbal or a hybrid digital-mechanical gimbal, as previously described. For example, while tracking an object in motion relative to the UAV 100, the tracking system 140 may generate control commands configured to adjust an orientation of an image capture device 115 so as to keep the tracked object centered in the field of view (FOV) of the image capture device 115 while the UAV 100 is in motion. Similarly, the tracking system 140 may generate commands or output data to a digital image processor (e.g., that is part of a hybrid digital-mechanical gimbal) to transform images captured by the image capture device 115 to keep the tracked object centered in the FOV of the image capture device 115 while the UAV 100 is in motion. The image capture devices 114/115 and associated stabilization/tracking devices 152 are collectively depicted in FIG. 2 as an image capture system 150.

In some embodiments, a navigation system 120 (e.g., specifically a motion planning component 130) is configured to incorporate multiple objectives at any given time to generate an output such as a planned trajectory that can be used to guide the autonomous behavior of the UAV 100. For example, certain built-in objectives, such as obstacle avoidance and vehicle dynamic limits, can be combined with other input objectives (e.g., a landing objective) as part of a trajectory generation process. In some embodiments, the trajectory generation process can include gradient-based optimization, gradient-free optimization, sampling, end-to-end learning, or any combination thereof. The output of this trajectory generation process can be a planned trajectory over some time horizon (e.g., 10 seconds) that is configured to be interpreted and utilized by a flight controller 160 to generate control commands (usable by control actuators 110) that cause the UAV 100 to maneuver according to the planned trajectory. A motion planner 130 may continually perform the trajectory generation process as new perception inputs (e.g., images or other sensor data) and objective inputs are received. Accordingly, the planned trajectory may be continually updated over some time horizon, thereby enabling the UAV 100 to dynamically and autonomously respond to changing conditions.

Figure 3A:
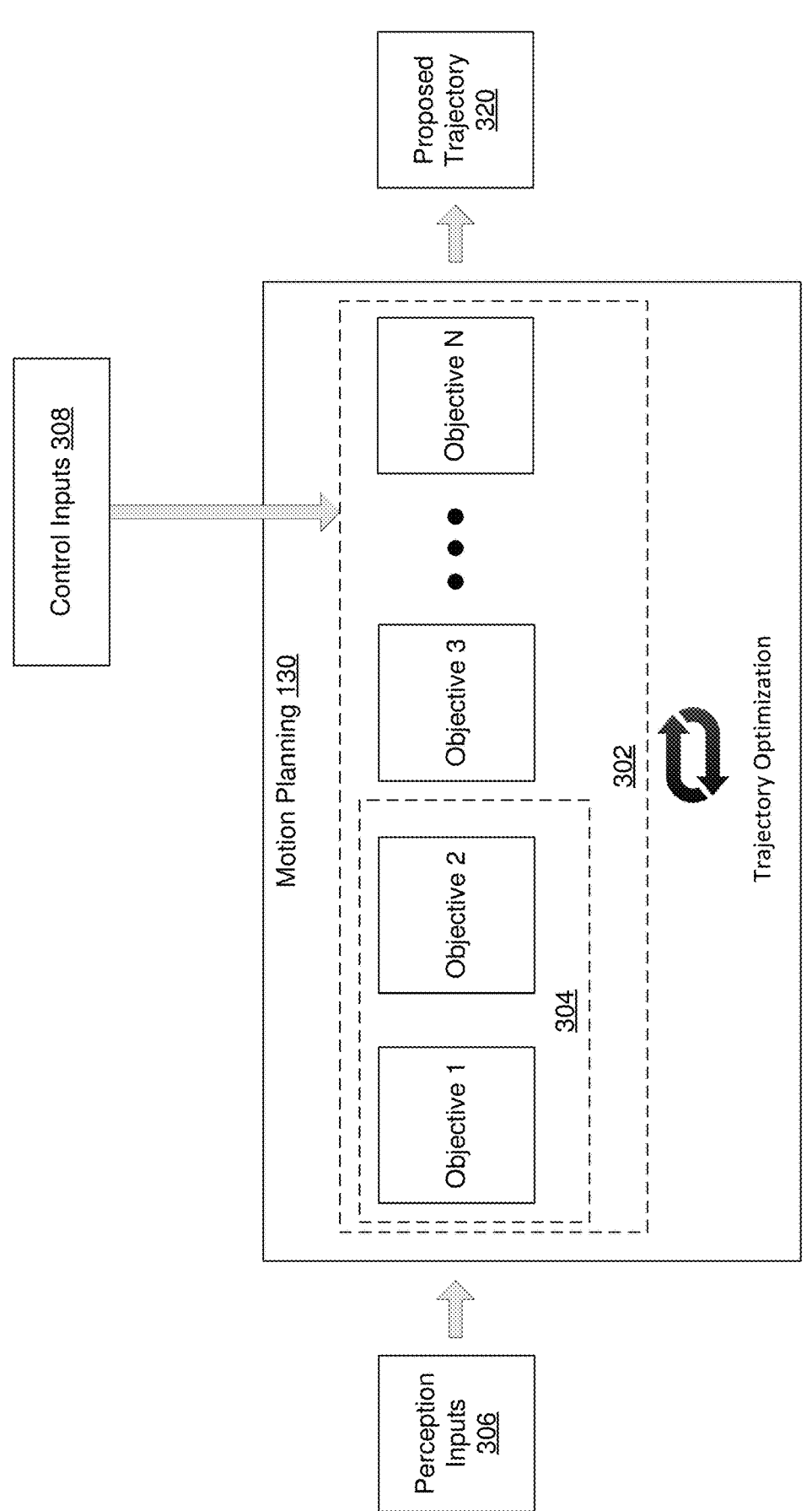
FIG. 3A shows a block diagram that illustrates objective-based motion planning by the navigation system of FIG. 2.

FIG. 3A shows a block diagram that illustrates an example system for objective-based motion planning. As shown in FIG. 3A, a motion planner 130 (e.g., as discussed with respect to FIG. 2) may generate and continually update a planned trajectory 320 based on a trajectory generation process involving one or more objectives (e.g., as previously described) and/or more perception inputs 306. The perception inputs 306 may include images received from one or more image capture devices 114/115, results of processing such images (e.g., disparity images, depth values, semantic data, etc.), sensor data from one or more other sensors 112 on board the UAV 100 or associated with other computing devices (e.g., mobile device 104) in communication with the UAV 100, and/or data generated by, or otherwise transmitted from, other systems on board the UAV 100. The one or more objectives 302 utilized in the motion planning process may include built-in objectives governing high-level behavior (e.g., avoiding collision with other objects, maneuvering within dynamic limitations, etc.), as well as objectives based on control inputs 308 (e.g., from users or other onboard systems). Each of the objectives 302 may be encoded as one or more equations for incorporation in one or more motion planning equations utilized by the motion planner 130 when generating a planned trajectory to satisfy the one or more objectives. The control inputs 308 may be in the form of control commands from a user or from other components of the navigation system 120 such as a tracking system 140. In some embodiments, such inputs are received in the form of calls to an application programming interface (API) associated with the navigation system 120. In some embodiments, the control inputs 308 may include predefined objectives that are generated by other components of the navigation system 120 such as tracking system 140.

Figure 3B:
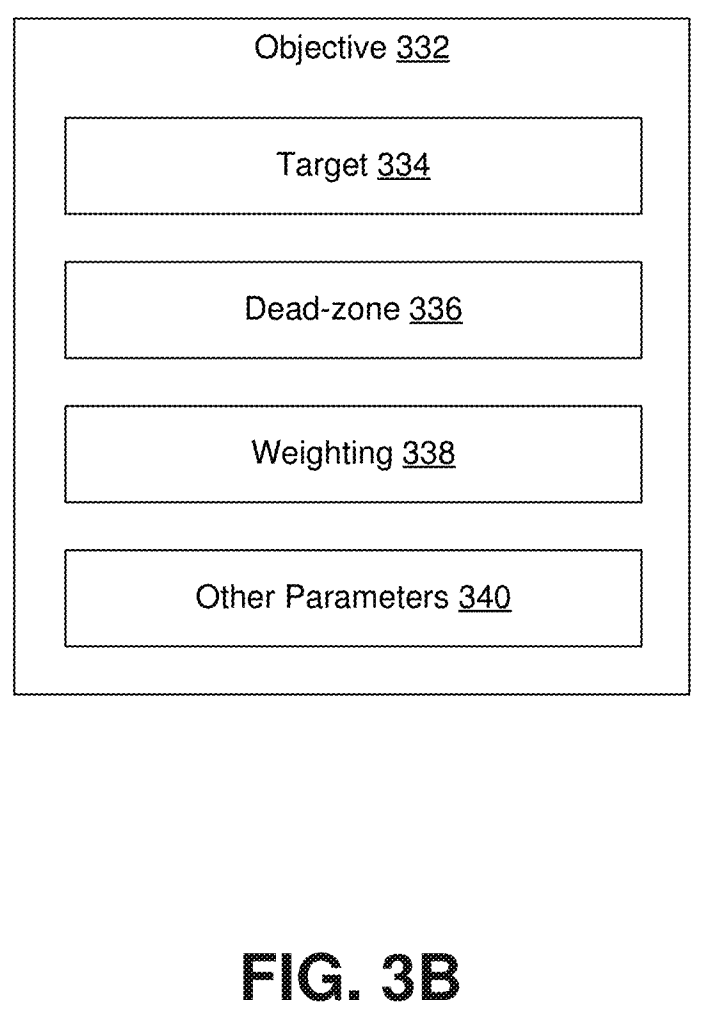

Each given objective of the set of one or more objectives 302 utilized in the motion planning process may include one or more defined parameterizations that are exposed through the API. For example, FIG. 3B shows an example objective 332 that includes a target 334, a dead-zone 336, a weighting factor 338, and other parameters 340.

The target 344 defines the goal of the particular objective that the motion planner 130 will attempt to satisfy when generating a planned trajectory 320. For example, the target 334 of a given objective may be to maintain line of sight with one or more detected objects or to fly to a particular position in the physical environment.

The dead-zone defines a region around the target 334 in which the motion planner 130 may not take action to correct. This dead-zone 336 may be thought of as a tolerance level for satisfying a given target 334. For example, a target of an example image-relative objective may be to maintain image capture of a tracked object such that the tracked object appears at a particular position in the image space of a captured image (e.g., at the center). To avoid continuous adjustments based on slight deviations from this target, a dead-zone is defined to allow for some tolerance. For example, a dead-zone can be defined in a y-direction and x-direction surrounding a target location in the image space. In other words, as long as the tracked object appears within an area of the image bounded by the target and respective dead-zones, the objective is considered satisfied.

The weighting factor 336 (also referred to as an "aggressiveness" factor) defines a relative level of impact the particular objective 332 will have on the overall trajectory generation process performed by the motion planner 130. Recall that a particular objective 332 may be one of several objectives 302 that may include competing targets. In an ideal scenario, the motion planner 130 will generate a planned trajectory 320 that perfectly satisfies all of the relevant objectives at any given moment. For example, the motion planner 130 may generate a planned trajectory that maneuvers the UAV 100 to a particular GPS coordinate while following a tracked object, capturing images of the tracked object, maintaining line of sight with the tracked object, and avoiding collisions with other objects. In practice, such an ideal scenario may be rare. Accordingly, the motion planner system 130 may need to favor one objective over another when the satisfaction of both is impossible or impractical (for any number of reasons). The weighting factors for each of the objectives 302 define how they will be considered by the motion planner 130.

In an example embodiment, a weighting factor is a numerical value on a scale of 0.0 to 1.0. A value of 0.0 for a particular objective may indicate that the motion planner 130 can completely ignore the objective (if necessary), while a value of 1.0 may indicate that the motion planner 130 will make a maximum effort to satisfy the objective while maintaining safe flight. A value of 0.0 may similarly be associated with an inactive objective and may be set to zero, for example, in response to toggling the objective from an active state to an inactive state. Low weighting factor values (e.g., 0.0-0.4) may be set for certain objectives that are based around subjective or aesthetic targets such as maintaining visual saliency in the captured images. Conversely, high weighting factor values (e.g., 0.5-1.0) may be set for more critical objectives such as avoiding a collision with another object.

In some embodiments, the weighting factor values 338 may remain static as a planned trajectory is continually updated while the UAV 100 is in flight. Alternatively, or in addition, weighting factors for certain objectives may dynamically change based on changing conditions, while the UAV 100 is in flight. For example, an objective to avoid an area associated with uncertain depth value calculations in captured images (e.g., due to low light conditions) may have a variable weighting factor that increases or decreases based on other perceived threats to the safe operation of the UAV 100. In some embodiments, an objective may be associated with multiple weighting factor values that change depending on how the objective is to be applied. For example, a collision avoidance objective may utilize a different weighting factor depending on the class of a detected object that is to be avoided. As an illustrative example, the system may be configured to more heavily favor avoiding a collision with a person or animal as opposed to avoiding a collision with a building or tree.

The UAV 100 shown in FIG. 1A and the associated navigation system 120 shown in FIG. 2 are examples provided for illustrative purposes. An aerial vehicle, in accordance with the present teachings, may include more or fewer components than are shown. Further, the example aerial vehicles described herein (including example UAVs 100, 400, 500, 600, 700, 900, 1000, 1100, 1200, 1500, 1600, 1700, 1900a, 1900b, 2000, 2100, and 2200) and associated navigation system 120 depicted in FIG. 2 may include or be part of one or more of the components of the example system 2300 described with respect to FIG. 23 and/or the example computer processing system 2400 described with respect to FIG. 24. For example, the aforementioned navigation system 120 and associated motion planner 130 and tracking system 140 may include or be part of the system 2300 and/or computer processing system 2400.

The example aerial vehicles and associated systems described herein are described in the context of an unmanned aerial vehicle such as the UAV 100 for illustrative simplicity; however, the introduced aerial vehicle configurations are not limited to unmanned vehicles. The introduced technique may similarly be applied to configure various types of manned aerial vehicles, such as a manned rotor craft (e.g., helicopters) or a manned fixed-wing aircraft (e.g., airplanes). For example, a manned aircraft may include an autonomous navigation system (similar to navigations systems 120) in addition to a manual control (direct or indirect) system. During flight, control of the craft may switch over from a manual control system in which an onboard pilot has direct or indirect control, to an automated control system to autonomously maneuver the craft without requiring any input from the onboard pilot or any other remote individual. Switchover from manual control to automated control may be executed in response to pilot input and/or automatically in response to a detected event such as a remote signal, environmental conditions, operational state of the aircraft, etc.

Arrangement of Image Capture Devices in Rotor Mounts

In some embodiments, one or more of the image capture devices (e.g., for navigation and/or subject capture) can be arranged proximate to the rotors of a UAV. Specifically, in some embodiments, one or more image capture devices may be arranged within and/or proximate to a structural mount associated with a rotor or a structural arm that connects a rotor mount to the body of the UAV. Arranging image capture devices within the rotor mounts (or rotor arms) of the UAV may provide several advantages, including freeing space within the body of the UAV (e.g., for other systems or batteries), reducing overall weight of the UAV (e.g., by consolidating support structures), and getting baseline between the image capture devices for stereo, trinocular, multi-view depth computation, etc.

Figure 4A:
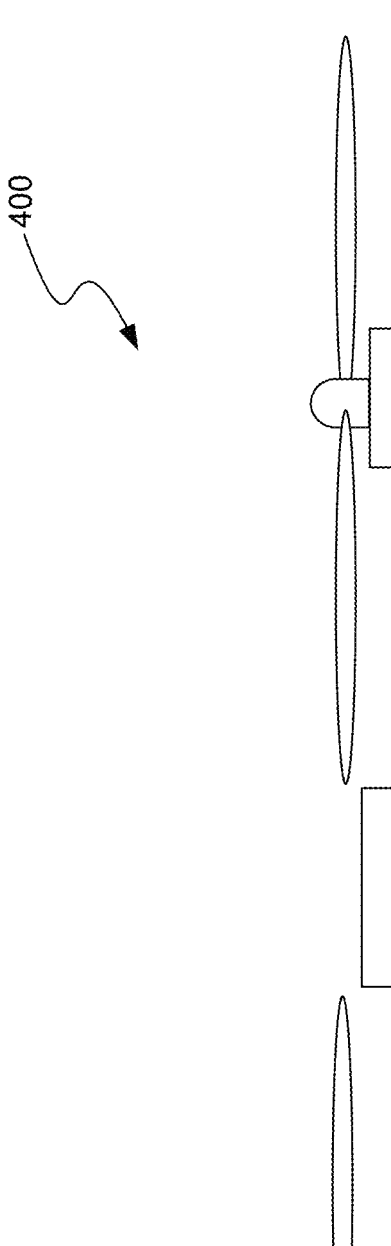
FIG. 4A shows a third example UAV.
Figure 4A:

FIG. 4A shows a side view of an example UAV 400 that includes rotor assemblies 413 that include integrated image capture devices. The example UAV 400 may be similar to UAV 100 described with respect to FIG. 1A, except for the placement of image capture devices. As shown in FIG. 4A, the example UAV 400 includes rotor assemblies 413 (with integrated downward-facing image capture devices) that are structurally coupled to a body 402 of the UAV via support arms 403. The image capture devices integrated into rotor assemblies 413 may be configured for navigation, subject capture, and/or general image capture. In some embodiments, the image capture devices are configured for navigation and may therefore be configured as "fisheye" cameras in order to provide broad image capture coverage in a given direction. In this context a "fisheye" camera generally refers to a camera with a relatively wide FOV (e.g., at least 180 degrees). Note, the dotted lines shown in FIG. 4A are shown to illustrate an example wide FOV of the image capture device associated with assemblies 413, but do not necessarily convey the actual FOV for all embodiments.

Figure 4B:
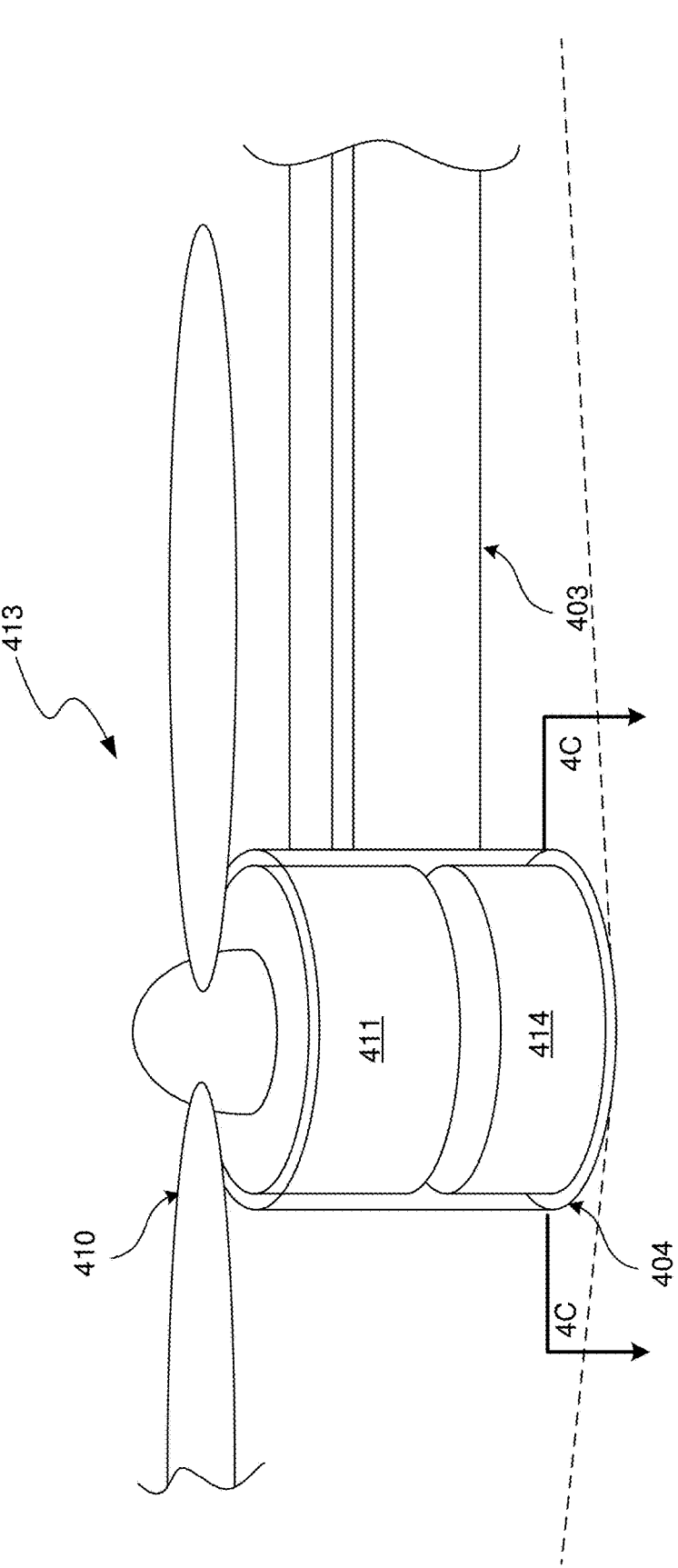
FIG. 4B shows a perspective view of a first example rotor assembly.

FIG. 4B shows a perspective detail view of a rotor assembly 413 with an integrated image capture device. As shown in FIG. 4B, the rotor assembly 413 includes a rotor housing 404 (i.e., a rotor nacelle) that surrounds an interior space within which a motor 411 and image capture device 414 are arranged. The motor 411 may be any type of motor capable of applying torque to rotor blades 410 in order to provide propulsion for the UAV 400. For example, in some embodiments, motor 411 may be an electric brushless motor, although other suitable motor types may be similarly implemented. The image capture device 414 may be any type of image capture device configured to capture images of the surrounding physical environment. In some embodiments, image capture device 414 is configured to capture images that are utilized by an autonomous navigation system 120, for example, similar to the image capture devices 114 described with respect to UAV 100. In such embodiments, the image capture device 414 may include a fisheye camera for capturing a relatively wide-angle FOV (e.g., at least 180 degrees), for example, as indicated by the dotted lines in FIG. 4B. Note, the dotted lines shown in FIG. 4B are shown to illustrate an example FOV of the image capture device 414, but do not necessarily convey the actual FOV for all embodiments. In some embodiments, images captured by the image capture device 414 may also be used for display to a user, for example, similar to image capture device 115 described with respect to UAV 100.

Figure 4C:
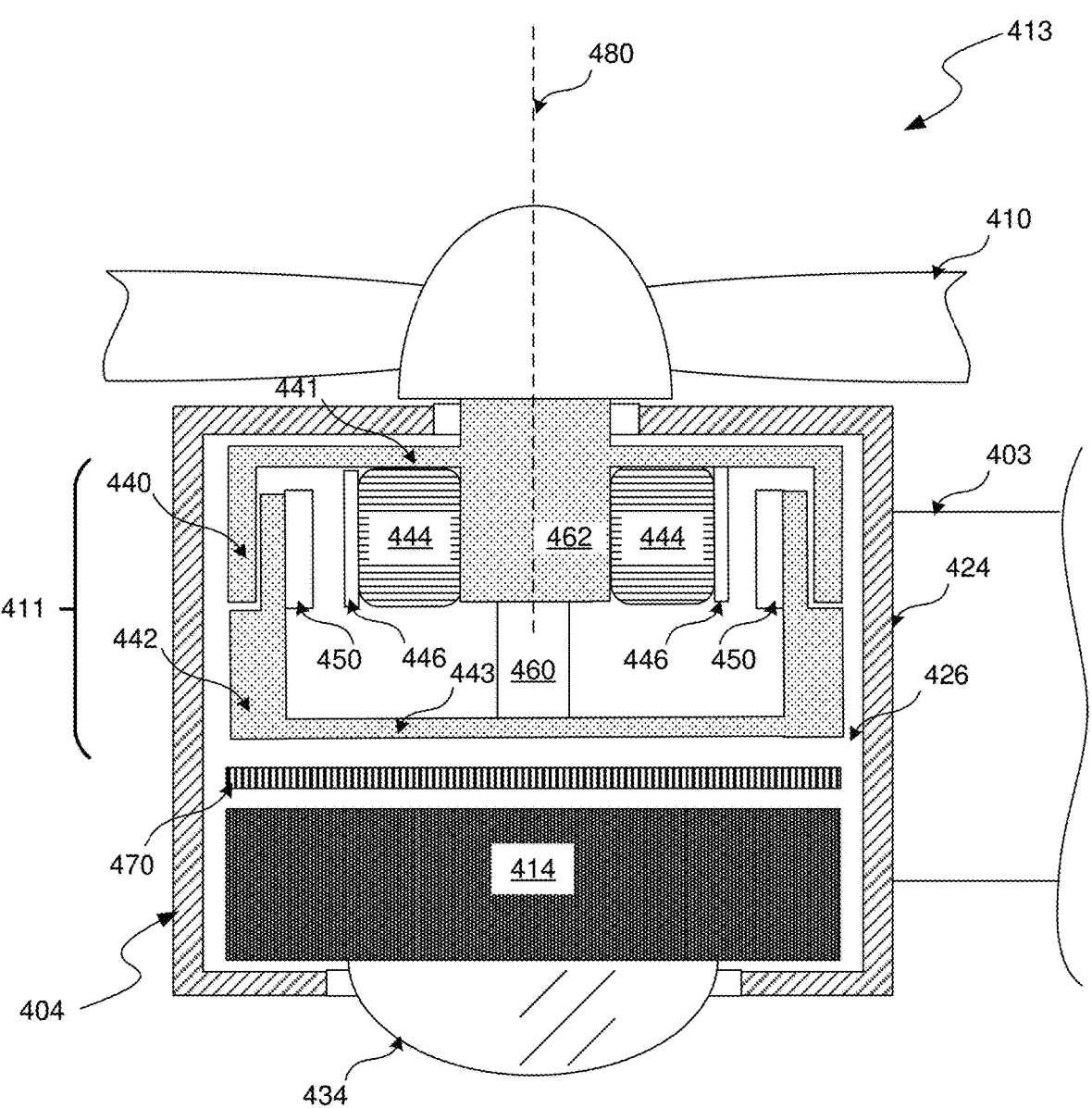
FIG. 4C shows a sectional view of the example rotor assembly of FIG. 4B.

FIG. 4C shows a sectional view of the rotor assembly 413 depicted in FIG. 4B. As shown in FIG. 4C, the rotor housing 404 may comprise one or more walls 424 that substantially enclose an interior space 426 of the rotor housing 404. The term "substantially enclose" shall be understood to mean that the walls 424 generally define an interior volume of space 426, but may include one or more openings, for example, through which a lens 434 of an image capture device 414 is exposed to the exterior of the rotor housing 404.

The walls 424 of the rotor housing 404 may be manufactured of any material or combination of materials that are suitably durable and lightweight for use in an aerial vehicle. For example, in some embodiments, the walls 424 can be made of plastic, metal (e.g., aluminum), carbon fiber, synthetic fiber, or some sort of composite material such as carbon fiber embedded in an epoxy resin. The actual materials used will depend on the performance requirements of a given embodiment. The walls 424 may be manufactured using any manufacturing process suited for the selected material. For example, in the case of plastic materials, the walls 424 may be manufactured using injection molding, extrusion molding, rotational molding, blow molding, 3D printing, milling, plastic welding, lamination, or any combination thereof. In the case of metal materials, the walls 424 may be manufactured using machining, stamping, casting, forming, metal injection molding, computer numeric control (CNC) machining, or any combination thereof. These are just example materials and manufacturing processes that are provided for illustrative purposes and are not to be construed as limiting.

The walls 424 of the rotor housing 404 may comprise a unitary structure or may represent multiple structural pieces that are affixed together, for example, using mechanical fasteners (e.g., clips, screws, bolts, etc.), adhesives (e.g., glue, tape, etc.), welding, or any other suitable process for affixing parts together. Further, as will be described, in some embodiments, the walls 424 of the rotor housing 404 of a rotor assembly 413 may be part of or otherwise integrate with walls forming other structural components of the aerial vehicle, such as a rotor arm 403 or the body 402. The rotor housing 404 is depicted in FIGS. 4B and 4C as substantially cylindrical in shape, which may conform with the usual shapes of the interior components such as motor 411 and image capture device 414; however, this is an example shape provided for illustrative purposes and is not to be construed as limiting. Other embodiments may include rotor housings of different shapes, for example, to accommodate interior components, for aerodynamic purposes, and/or aesthetic considerations.

As shown in FIG. 4C, the motor 411 and image capture device 414 are arranged within the interior space 426 of the rotor housing 404. Specifically, the motor 411 is arranged within the interior space 426 proximate to a first end (or "top side") of the rotor housing and the image capture device 414 is arranged within the interior space 426 proximate to a second end (or "bottom side") of the rotor housing 404 that is opposite the first end. Further, the motor 411 is oriented such that the attached rotor blades extend from the first end of the rotor housing 404. Conversely, the image capture device 414 is oriented such that light is received through an opening in the second end of the rotor housing 404. For example, image capture device 414 may include a lens 434 that extends from the second end of the housing 404 such that the image capture device 414 captures images of the physical environment below the rotor assembly 413, while in use. Note that the orientations of elements described with respect to the rotor assembly 413 depicted in FIG. 4C are relative and are provided as examples for illustrative purposes. As will be described, in some embodiments, a similar rotor assembly may be oriented in an opposite direction such that the rotor blades extend from the bottom and the image capture device captures light through an opening in the top of the rotor housing.

As previously mentioned, the motor 411 may be any type of motor capable of applying a torque to rotate the rotor blades 410. For illustrative purposes, the motor 411 is depicted in FIG. 4C in the form of a brushless "outrunner" motor; however, this shall not be construed as limiting. An "outrunner" motor can generally be understood as a type of brushless electric motor that spins an outer shell around its windings as opposed to just spinning a rotor axle. As shown in FIG. 4C, the example motor 411 includes a movable first motor assembly and a stationary second motor assembly that includes an axle 460 about which the movable first motor assembly rotates. The first motor assembly is referred to as "moveable" because it is attached to the rotor blades 410 and rotates about the axle 460 of the stationary second motor assembly, when in use, thereby rotating the rotor blades 410.

The movable first motor assembly includes walls 440, 441 that form a first motor housing. For example, the first motor housing may include a proximal end and a distal end arranged along an axis 480. The first motor housing includes a generally cylindrical side wall 440 that is arranged about axis 480 and an end wall (or "top wall") 441 intersecting axis 480 at the distal end of the first motor housing. The side wall 440 and end wall 441 define an interior space of the first motor housing with a generally circular opening at the proximal end of the first motor housing. Similarly, the second motor assembly includes walls 442, 443 that form a second motor housing. The second motor housing also has a proximal end and a distal end arranged along axis 480. The second motor housing includes a generally cylindrical side wall 442 that is arranged about axis 480 and an end wall (or "bottom wall") 443 intersecting axis 480 at the distal end of the second motor housing. The side wall 442 and end wall 443 define an interior space of the second motor housing with a generally circular opening at the proximal end of the second motor housing.

The first motor assembly further includes an axle bearing 462 coupled to the first motor housing, and a stator stack arranged around the axle bearing 462. In an embodiment, the stator stack includes multiple stator coils 444 and optionally multiple stator teeth 446 which can divide an induced electromagnet into multiple sections. Axle bearing 462 is intended to accommodate the previously mentioned axle 460 such that axle 460 is freely rotatable within axle bearing 462. Axle bearing 462 may be of any type suitable to allow for rotation of axle 460. For example, in an embodiment, axle bearing 462 is a plain bearing including a generally cylindrical hollow space within which the shaft of axle 460 can rotate. In some embodiments, axle bearing 462 includes rolling elements such as ball bearings arranged between generally cylindrical races. The stator coils 444 may be made of a conductive material (e.g., copper) through which an electric current can be run to induce the electromagnet of the stator stack.

The second motor assembly further includes the axle 460 that is affixed to the second motor housing and multiple magnets 450 that are affixed to an interior surface of the side walls 442 of the second motor housing. The fixed magnets 450 of the second motor assembly are affixed to the inner surface of side wall 442 and arranged such that that may cause the first motor assembly to rotate about axis 480 when a current is applied (and therefore an electromagnetic force induced) via the stator stack of the first motor assembly, thereby causing the attached rotor blades 410 to rotate.

In some situations, operation of the motor 410 may cause vibrations or electromagnetic interference that may interfere with or otherwise affect the operation of an image capture device 414 in close proximity. To counteract the effects of such vibration and/or electromagnetic interference, the rotor assembly 413 may include an isolator component or system 470.

For example, to isolate the image capture device 414 from vibration caused by the motor 410, the isolator system 470 may include one or more active and/or passive motion dampeners. The one or more motion dampeners may isolate the image capture device 414 from the vibrations of the motor 411 and/or the motion of the surrounding walls of the rotor housing 404 (i.e., caused by the motion of the UAV). Similarly, the one or more motion dampeners may isolate the walls of the rotor housing 404 from the vibrations of the motor 411 so that those vibrations are not transferred to the image capture device 414.

Alternatively, or in addition, to isolate the image capture device 414 from electromagnetic interference caused by the motor 411, the isolator system 470 may include electromagnetic shielding. Electromagnetic shielding may include one or more barriers made of conductive and/or magnetic materials. Specific material may include, for example, sheet metal, metal screen, metal mesh. In some embodiments, the electromagnetic shield of the isolator system 470 may be configured as a barrier wall between the motor 411 and the image capture device 414, for example, as shown in FIG. 4C. In other embodiments, the electromagnetic shield may be configured as a cage or container to enclose the image capture device 414 and/or motor 411.

Figure 4D:
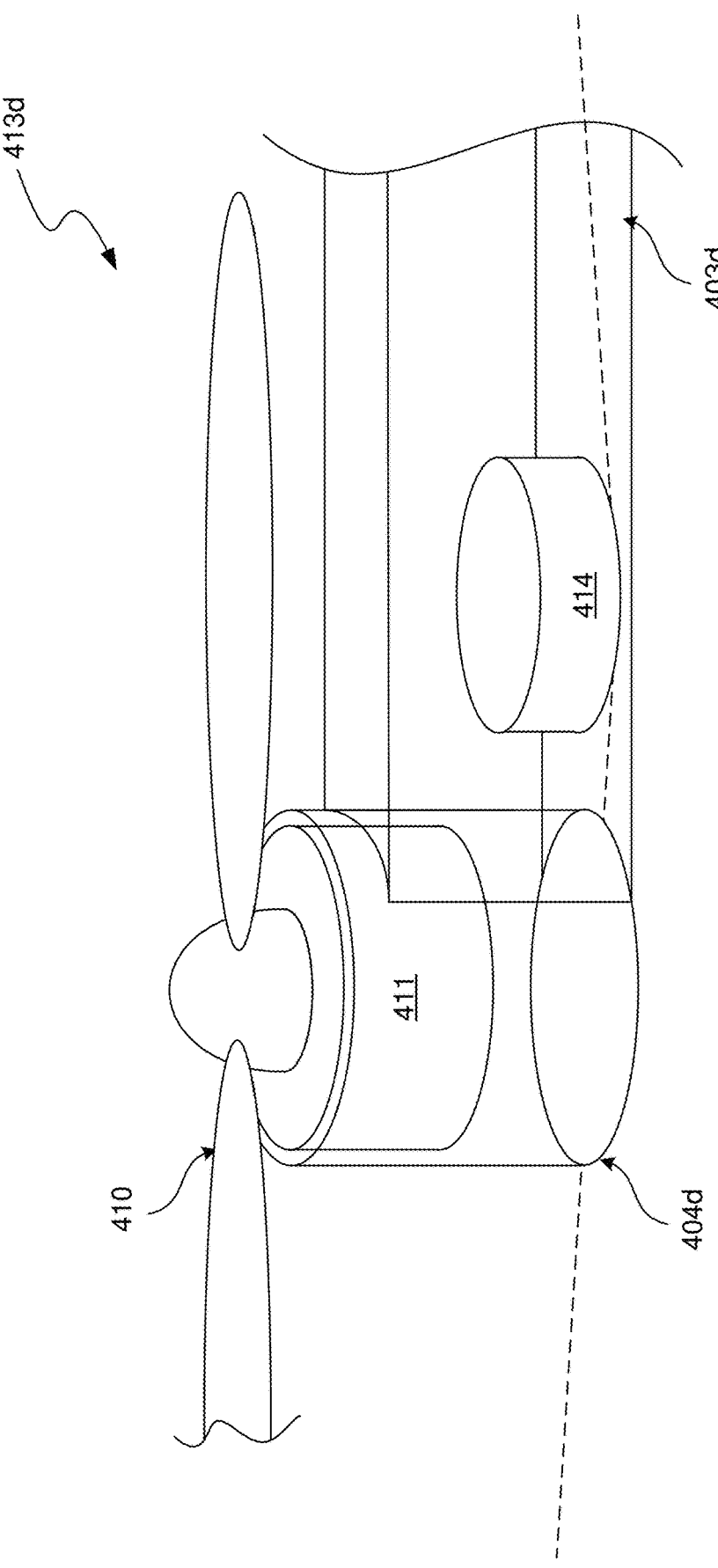
FIG. 4D shows a perspective view of a second example rotor assembly.

The image capture device 414 can also be arranged within any of the other structures extending from the central body of the UAV, such as any of one or more rotor support arms (e.g., arm 403 in FIG. 4B) or other structures unrelated to the rotors. FIG. 4D shows an alternative rotor assembly 413*d* that includes an image capture device 414 arranged within a rotor support arm 413*d* that structurally couples the motor 411 or rotor housing 404*d* to the body of the UAV. In other words, the image capture device 414 is arranged within the rotor support arm 403*d* at a point substantially between the motor 411 and the central body of the UAV. The term "substantially between" in this context means that the image capture device 414 is at a position generally between the motor 411 and the body of the UAV, but is not necessarily positioned along a shortest line between the motor 411 and the body of the UAV.

Figure 4E:
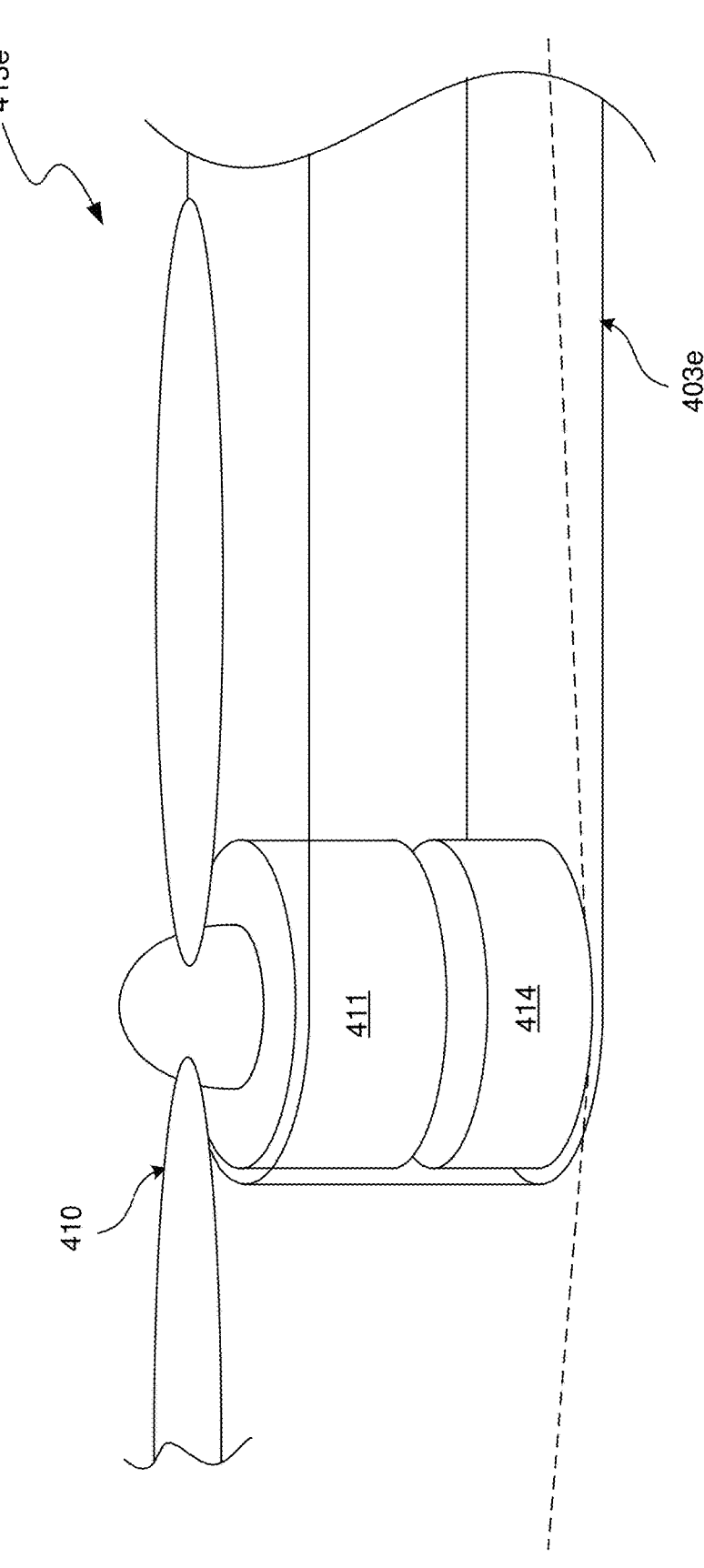
FIG. 4E shows a perspective view of a third example rotor assembly.

The image capture device 414 may be arranged at any point along a length of the support arm extending out from the body of the UAV. In some embodiments, the rotor housing may be substantially integrated as part of a support arm extending from the body of the UAV. For example, FIG. 4E shows another alternative rotor assembly 413*e* that includes an integrated support arm rotor housing 403*e* within which both the motor 411 and image capture device 414 are arranged.

Figure 4F:
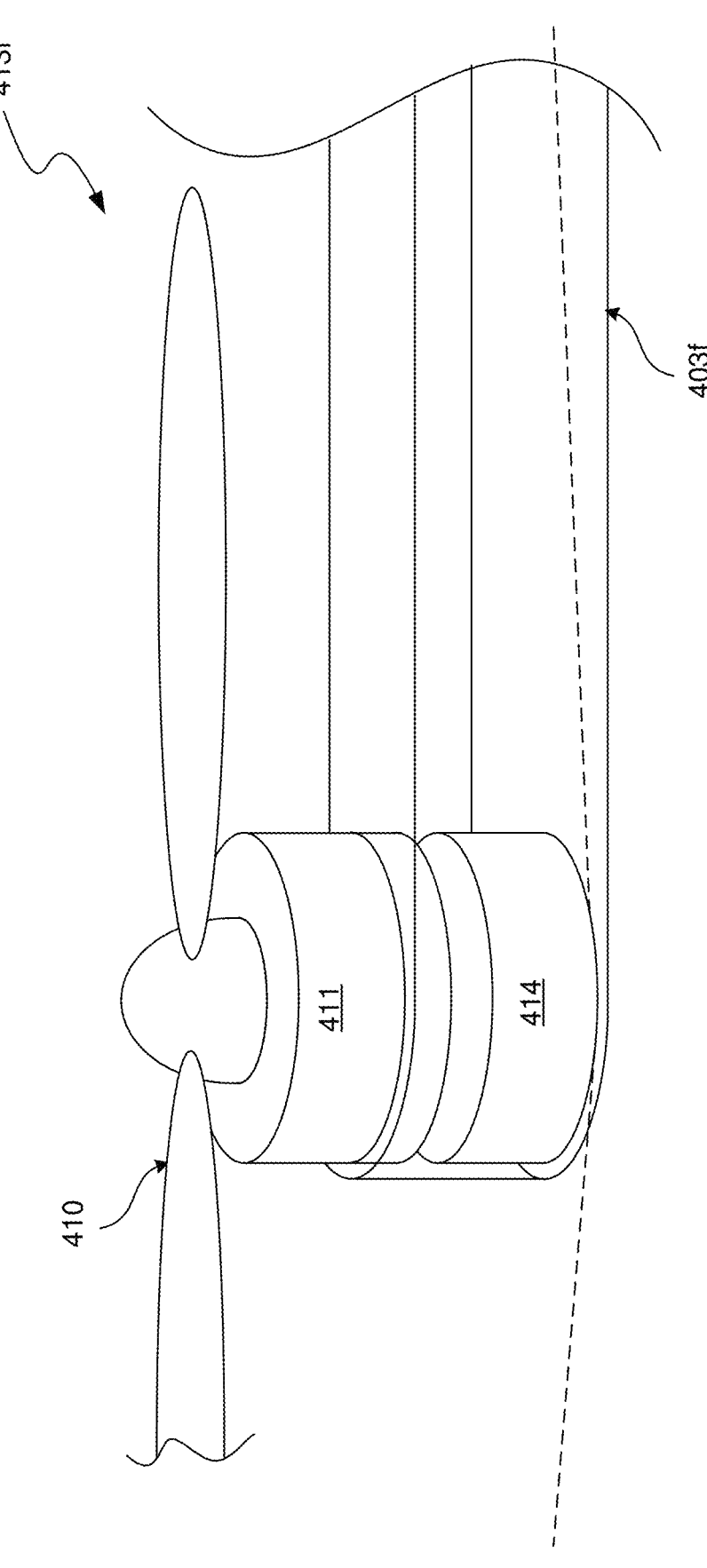
FIG. 4F shows a perspective view of a fourth example rotor assembly.

In some embodiments, the walls of the rotor housing and/or support arm may not fully or substantially enclose the motor 411 and/or image capture device. For example, in some embodiments, the individual housings of the image capture device 414 and/or motor 411 may be sufficient to protect internal components from the elements. FIG. 4F shows another alternative rotor assembly 413*f* that includes an integrated support arm rotor housing 403*f* with walls that do not fully or substantially enclose the motor 411. As shown in FIG. 4F, the walls of the integrated support arm rotor housing 403*f* substantially enclose the image capture device 414 but do not fully or substantially enclose the motor 411. Instead, the motor 411 is partially nested into an indentation on the support arm 403*f* or alternatively structurally coupled to a top surface of the support arm 403*f*. Such an embodiment may be possible where the motor 411 includes its own housing (e.g., the aforementioned side walls 440, 442 and end walls 441, 443 described with respect to FIG. 4C) and does not require the additional protection of the walls of support arm 403*f*. Although not depicted in FIG. 4F, in some embodiments, the walls of the support arm 403*f* may not fully or substantially enclose the image capture device 414 similar to the motor 411. For example, the image capture device 414 may include its own housing and may therefore not require the additional protection of the walls of support arm 403*f*.

For illustrative simplicity, embodiments of a UAV may be described herein with reference to just rotor assembly 413; however, such embodiments may similarly implement alternative rotor assemblies such as assemblies 413*d*, 413*e*, and 413*f*. Further, the various alternative rotor assemblies 413, 413*d*, 413*e*, and 413*f* are examples provided for illustrative purposes and shall not be construed as limiting. Other embodiments may combine certain features of the various rotor assemblies 413, 413*d*, 413*e*, and 413*f*. For example, another alternative rotor assembly (not depicted in the FIGS.) may include support arm and/or rotor housing walls that do not fully or substantially enclose the motor 411 and/or image capture device 414 (e.g., as depicted in FIG. 4F) and may arrange the image capture device 414 at a position substantially between the motor 411 and the body of the UAV (e.g., as depicted in FIG. 4E). Other configuration combinations may be similarly implemented.

Arrangement of Image Capture Devices in an Aerial Vehicle

The example UAV 100 depicted in FIG. 1A is described as including at least multiple stereoscopic image capture devices 114 arranged around a perimeter of the UAV 100.

For example, the UAV 100 may include four stereoscopic image capture devices at each of four corners of the UAV as well as an upward-facing stereoscopic image capture device and a downward-facing stereoscopic image capture device. Since each stereoscopic image capture device includes two cameras, this represents a total of twelve cameras. In general, an autonomous navigation system that relies heavily on captured images will tend to be more effective the more image capture devices are utilized to capture the images. However, increasing quantities of cameras on board a UAV can have a detrimental effect in other areas. For example, the added weight of the additional cameras can impact the maneuverability of the UAV and reduce flight time due to increased draw on batteries from the electrical motors to keep the heavier craft airborne. The additional cameras themselves will draw more power from the batteries, further reducing overall flight time. To reduce weight and power draw, fewer cameras (e.g., fewer than twelve) can be utilized in various arrangements on board the UAV, while still providing sufficient coverage of the surrounding environment to allow an autonomous navigation system to plan the motion of the UAV to satisfy certain behavioral objectives and to avoid obstacles. FIGS. 5A-12B illustrate several example arrangements of image capture devices on board a UAV.

Figure 5A:
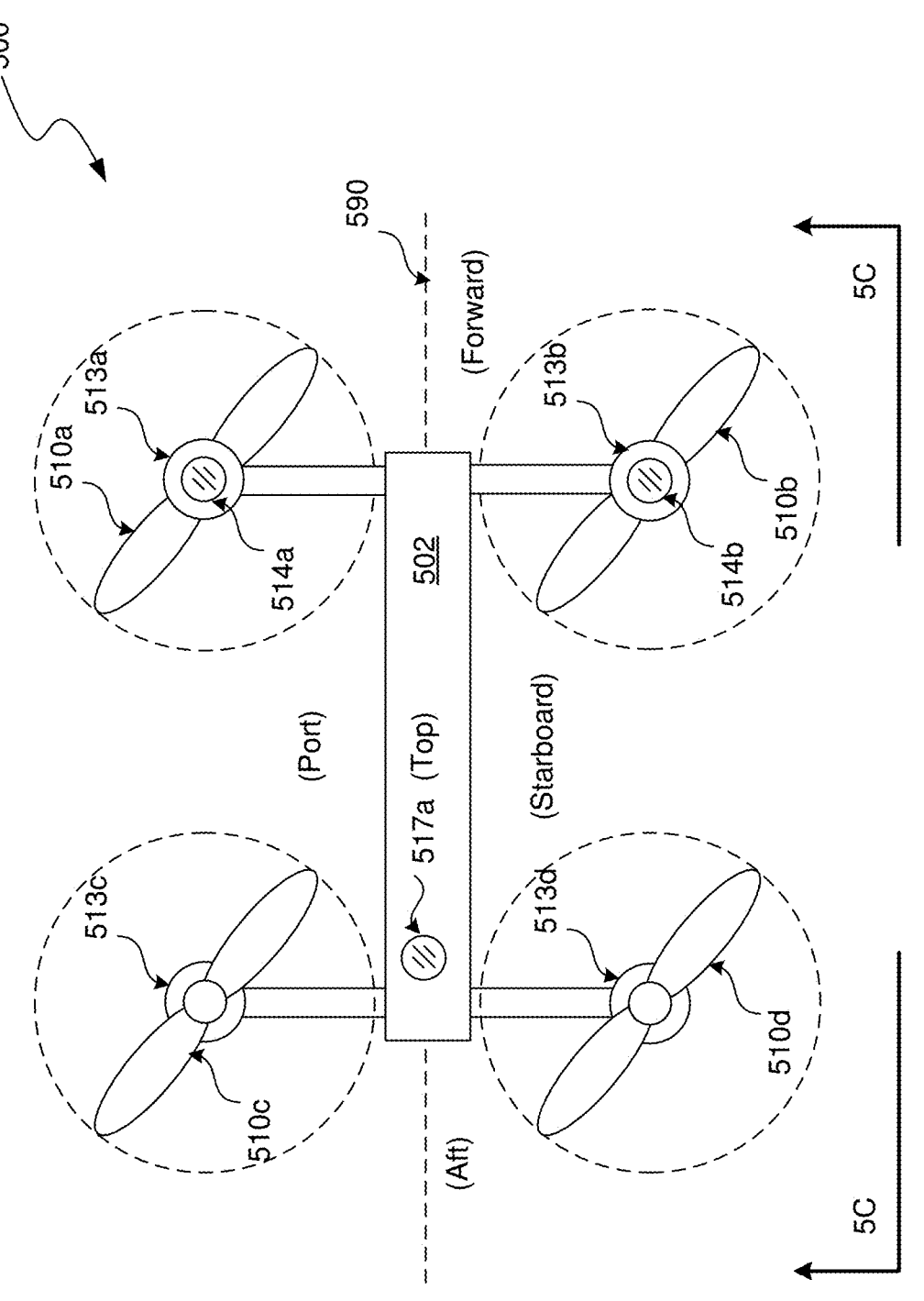
FIG. 5A shows a top view of a fourth example UAV.
Figure 5B:
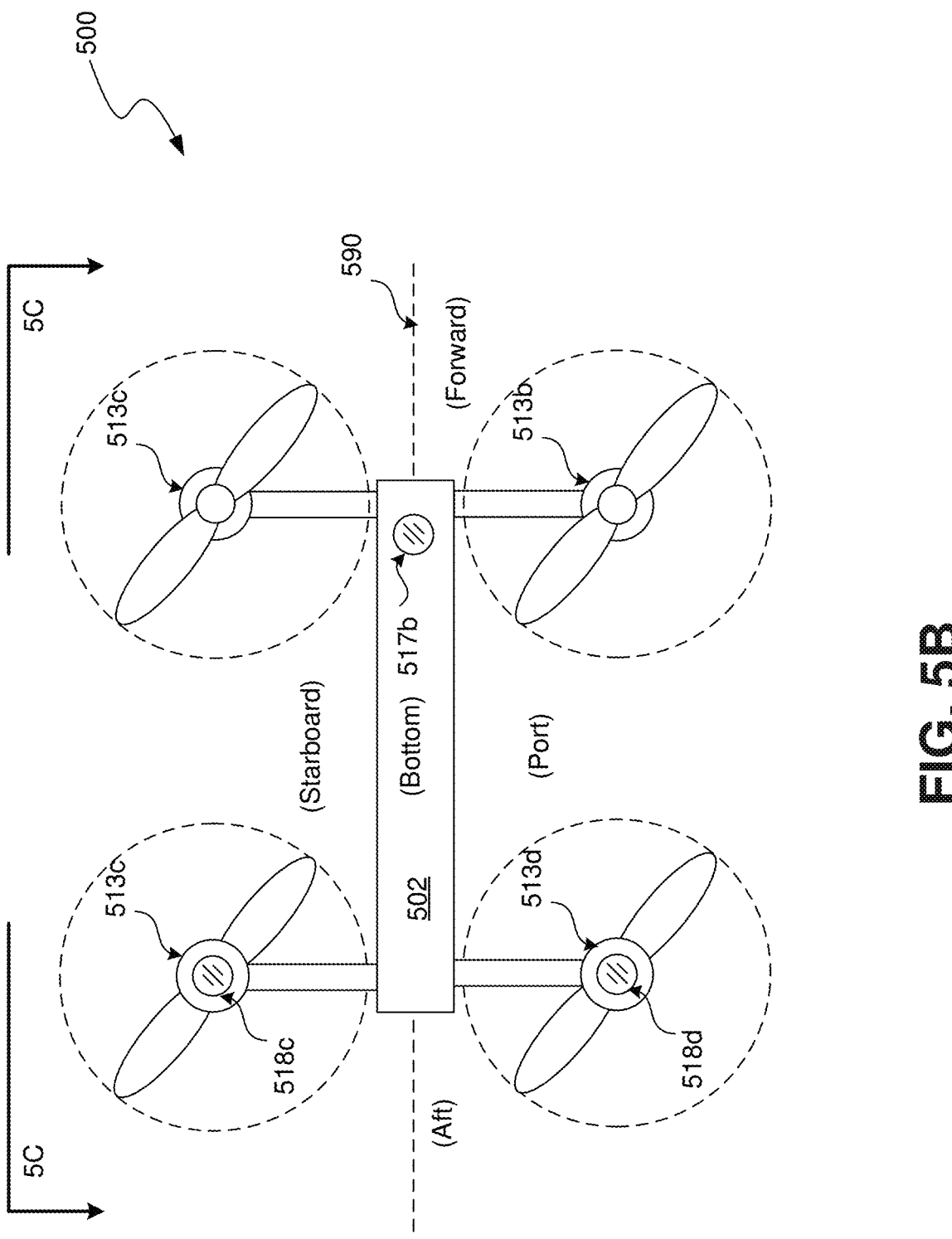
FIG. 5B shows a bottom view of the example UAV of FIG. 5A.
Figure 5C:
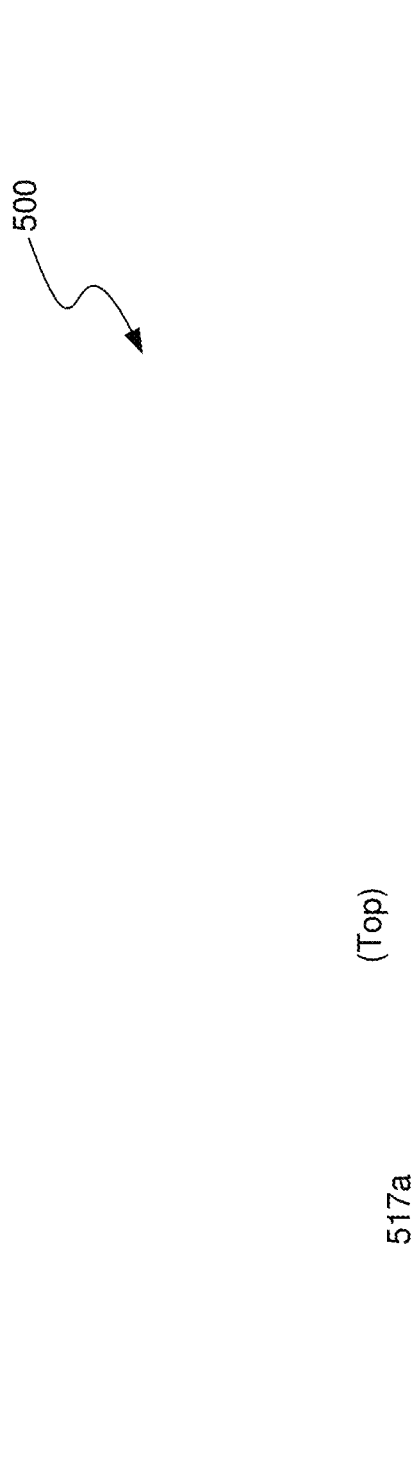
FIG. 5C shows a side view of the example UAV of FIG. 5A.
Figure 5C:
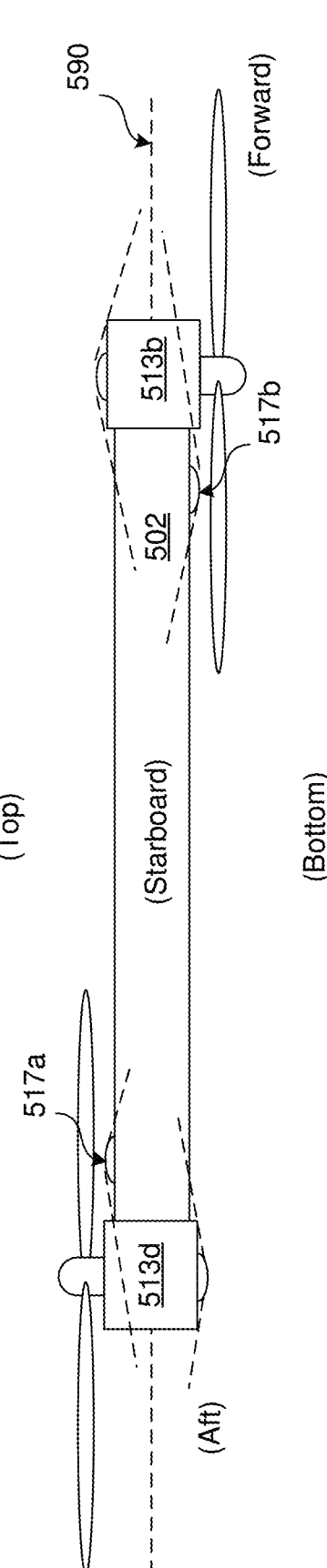

FIGS. 5A, 5C, and 5B show a top view, bottom view, and side view (respectively) of an example UAV 500. As shown in FIGS. 5A-5C, the example UAV 500 includes a body 502 and multiple rotor assemblies 513*a*, 513*b*, 513*c*, and 513*d*. Each of the rotor assemblies 513*a-d* may include an image capture device and powered rotor as described, for example, with respect to rotor assembly 413 in FIG. 4B or any of the alternative rotor assemblies in FIGS. 4D-4F. The UAV 500 also includes image capture devices 517*a-b* mounted to the body 502. Specifically, image capture device 517*a* is upward-facing and image capture device 517*b* is downward-facing.

Notably, the multiple image capture devices included in the rotor assemblies 513*a-d* and the body mounted image capture devices 517*a-b* are arranged such that the UAV 500 includes three upward-facing image capture devices and three downward-facing image capture devices. Specifically, the upward-facing image capture devices include image capture device 517*a* and the image capture devices of rotor assemblies 513*a* and 513*b*. Similarly, the downward-facing image capture devices include image capture device 517*b* and the image capture devices of rotor assemblies 513*c* and 513*d*. Note that rotor assemblies 513*a* and 513*b* may represent inverted arrangements of similar rotor assemblies 513*c* and 513*d*.

Each of the image capture devices of UAV 500 depicted in FIGS. 5A-5C may include a single camera with a relatively wide (e.g., greater than 100 degree) FOV. The upward and downward-facing image capture devices are arranged as two overlapping triangles. In other words, a first trio of upward-facing image capture devices is arranged as a first triangle providing upward-facing trinocular image capture (e.g., for accurate depth estimation) and a second trio of downward-facing image capture devices is arranged as a second triangle providing downward-facing trinocular image capture (e.g., for accurate depth estimation). In some embodiments, the trio of upward-facing image capture devices may be arranged to enable trinocular stereoscopic vision in multiple directions substantially above the UAV and the trio of downward-facing image capture devices may be arranged to enable trinocular stereoscopic vision in multiple directions substantially below the UAV. Further, at least some of the upward-facing image capture devices and downward-facing image capture devices may have overlapping fields of view if image capture devices with an FOV greater than 180 degrees are utilized. This arrangement, in which the upward and downward-facing cameras have overlapping FOV, allows for effective depth estimation up to a full 360 degrees around the UAV, reduces the total number of cameras from twelve (as in UAV 100) to six or fewer, and can be exploited to calibrate the upward and downward-facing image capture devices.

As shown in FIGS. 5A-5C, the body 502 extends along a longitudinal axis 590 from a first end (or "forward end") to a second end (or "aft end"). Further, the body 502 has a first side (or "port side") and a second side (or "starboard side"), where the first and second sides are opposite the longitudinal axis 590. Still further, the body 502 has a third side (or "top side") and a fourth side (or "bottom side") that is opposite the third side. These relative orientations associated with the body 502 are provided for illustrative purposes and are not to be construed as limiting. For example, although one end of the UAV 500 is labeled as a "forward end" this does not mean that the UAV 500 only travels forward in this direction.

In the example UAV 500 depicted in FIGS. 5A-5C, the body 502 is depicted as rectangular when viewed from above suggesting a cuboid structure, however it shall be understood that body 502 may have any shape of any dimension. In general, central body 502 may include walls that enclose an interior body space (not shown). For example, the area of central body 502 that is viewable in FIG. 5A may be a top wall that is generally located along the top side of the body 502. In this example, a first set of rotor assemblies 513a and 513c are arranged on one side (e.g., the port side) of the body 502 and are coupled to a first side wall (not shown) of central body 502. Similarly, a second set of rotor assemblies 513b and 513d are arranged on the opposite side (e.g., the starboard side) of the body 502 and are coupled to a second side wall (not shown) of the body 502. Further, the body 502 may include a first end wall (not shown but located proximate to the forward end of the body 502) and a second end wall opposite the first end wall (also not shown, but located proximate to the aft end of the body 502). As depicted in FIG. 5C, the various rotor assemblies 513a-d may be aligned substantially along a horizontal plane (e.g., that intersects longitudinal axis 590) relative to the body 502. The interior space of the body 502 may accommodate, for example, the image capture devices 517a-b as well as other components such as an onboard battery, other sensor devices (e.g., an IMU), computer processing components associated with an autonomous navigation system, payload storage, etc.

Similar to the rotor assemblies, the walls forming the body 502 of the UAV 500 may be manufactured of any material or combination of materials that are suitably durable and lightweight for use in an aerial vehicle. For example, in some embodiments, the walls of body 502 can be made of plastic, metal (e.g., aluminum), carbon fiber, synthetic fiber, or some sort of composite material such as carbon fiber embedded in an epoxy resin. The actual materials used will depend on the performance requirements of the UAV 500. The walls of the body of the UAV 500 may be manufactured using any manufacturing process suited for the selected material. For example, in the case of plastic materials, the walls may be manufactured using injection molding, extrusion molding, rotational molding, blow molding, 3D printing, milling, plastic welding, lamination, or any combination thereof. In the case of metal materials, the walls may be manufactured using machining, stamping, casting, forming, metal injection molding, CNC machining, or any combination thereof. These are just example materials and manufacturing processes that are provided for illustrative purposes and are not to be construed as limiting.

As previously mentioned, to enable for trinocular image capture above and below the UAV 502, the rotor assemblies 513a-d with integrated image capture devices and body mounted image capture devices 517a-b are arranged such that the UAV 500 includes three upward-facing image capture devices and three downward-facing image capture devices.

In the example UAV 500, a first rotor assembly 513a extends from the port side of the body 502 and a second rotor assembly 513b extends from the starboard side. The first and second rotor assemblies 513a and 513b are substantially aligned with each other on opposite sides of the body 502 and are located proximate to the forward end of the body 502. Notably, the first and second rotor assemblies are oriented such that associated image capture devices are on a top side and the associated rotors are on a bottom side. Specifically, the first rotor assembly 513a includes a first image capture device 514a that is arranged on a top side of the first rotor assembly 513a and a first rotor 510a that is arranged on a bottom side of the first rotor assembly 513a. Similarly, the second rotor assembly 513b includes a second image capture device 514b that is arranged on a top side of the second rotor assembly 513b and a second rotor 510b that is arranged on a bottom side of the second rotor assembly 513b.

A third rotor assembly 513c extends from the port side of the body 502 and a fourth rotor assembly 513d extends from the starboard side. The third and fourth rotor assemblies 513c and 513d are substantially aligned with each other on opposite sides of the body 502 and are located proximate to the aft end of the body 502. Notably, the third and fourth rotor assemblies are oriented such that associated image capture devices are on a bottom side and the associated rotors are on a top side. Specifically, the third rotor assembly 513c includes a third image capture device 514c that is arranged on a bottom side of the third rotor assembly 513c and a third rotor 510c that is arranged on a top side of the third rotor assembly 513c. Similarly, the fourth rotor assembly 513d includes a fourth image capture device 514d that is arranged on a bottom side of the fourth rotor assembly 513d and a fourth rotor 510d that is arranged on a top side of the fourth rotor assembly 513d.

The fifth image capture device (i.e., image capture device 517a) is arranged along a top surface of body 502 proximate to the aft end and is substantially aligned with the longitudinal axis 590 of the UAV 500 as shown in FIGS. 5A-5C. Similarly, a sixth image capture device (i.e., image capture device 517b) is arranged along a bottom surface of body 502 proximate to the forward end and is substantially aligned with the longitudinal axis 590.

The first and second image capture devices 514a-b together with the fifth image capture device 517a form a first triangle of upward-facing image capture devices that enable trinocular image capture in a plurality of directions above the UAV 500. Similarly, the third and fourth image capture devices 514c-d, together with the sixth image capture device 517b, form a second triangle of downward-facing image capture devices that enable trinocular image capture in a plurality of directions below the UAV 500.

In some embodiments, a gimbaled image capture device can be coupled to a UAV to allow for capturing images of a subject in the physical environment. For example, FIGS.

6A and 6B show a top view and side view (respectively) of an example UAV 600 that is similar to UAV 500, except that it includes a gimbaled image capture device 615. The gimbaled image capture device 615 may be similar to image capture device 115 described with respect to UAV 100 in that it includes one or more cameras (e.g., high resolution cameras) configured for capturing images of the surrounding physical environment for later display and in that the cameras are coupled to the body 602 of the UAV 600 via one or more mechanical gimbals. The one or more mechanical gimbals of the gimbaled image capture device 615 enable changes in orientation of the one or more cameras about one or more axes relative to the body 602. In some embodiments, the image capture device 615 may include a hybrid digital-mechanical gimbal system as previously described.

Otherwise, similar to UAV 500, example UAV 600 includes three upward-facing image capture devices (image capture device 617*a* mounted to body 602 and the integrated image capture devices of rotor assemblies 613*a* and 613*b*) and three downward-facing image capture devices (image capture device 617*b* and the integrated image capture devices of rotor assemblies 613*c* and 613*d*). In this example, the three upward-facing image capture devices and three downward-facing image capture devices may be utilized for visual navigation, while the gimbaled image capture device 615 is utilized to capture images of the surrounding physical environment for later display.

Figure 6A:
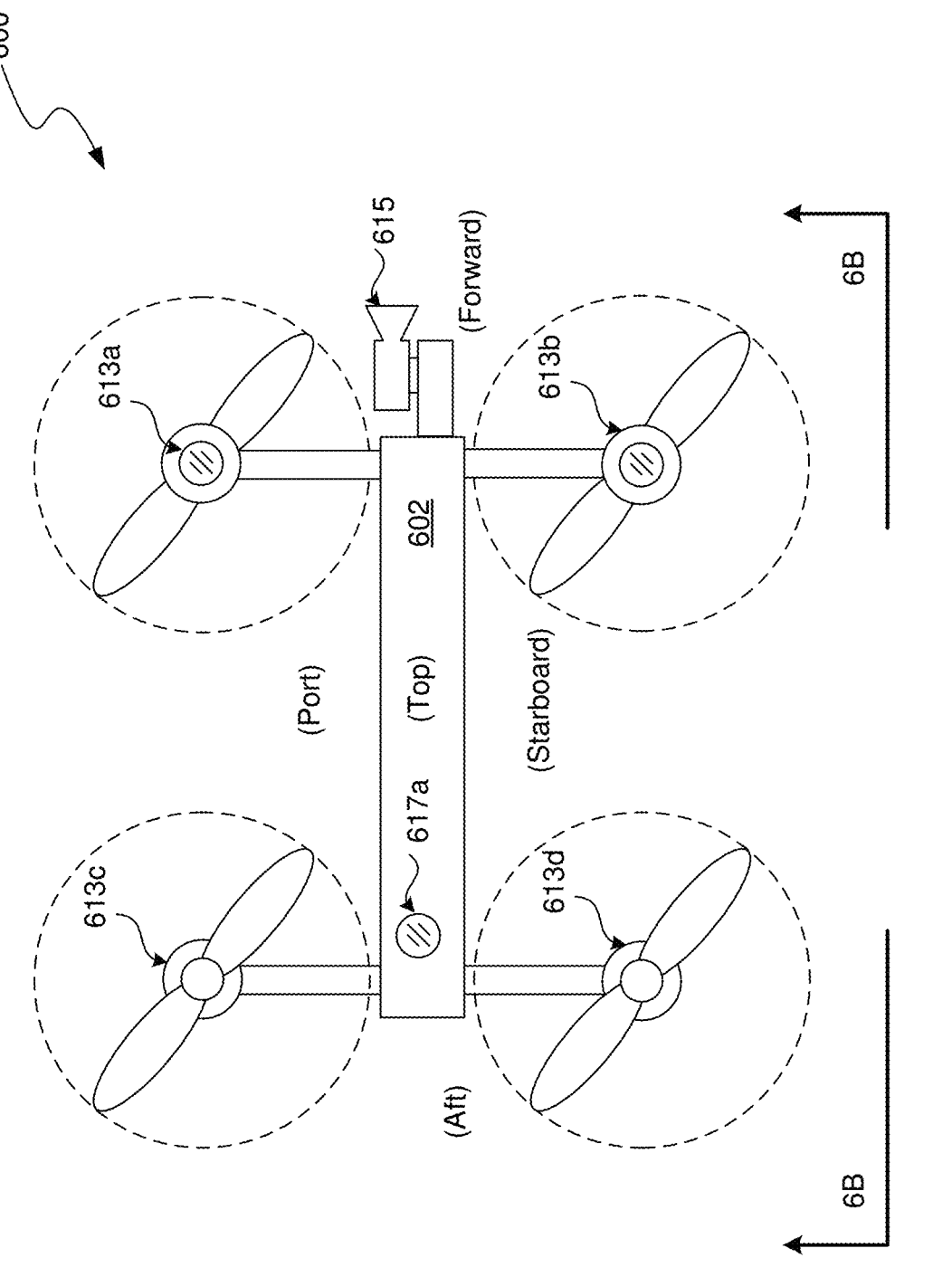
FIG. 6A shows a top view of a fifth example UAV.
Figure 6B:
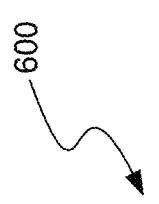
FIG. 6B shows a side view of the example UAV of FIG. 6A.
Figure 6B:
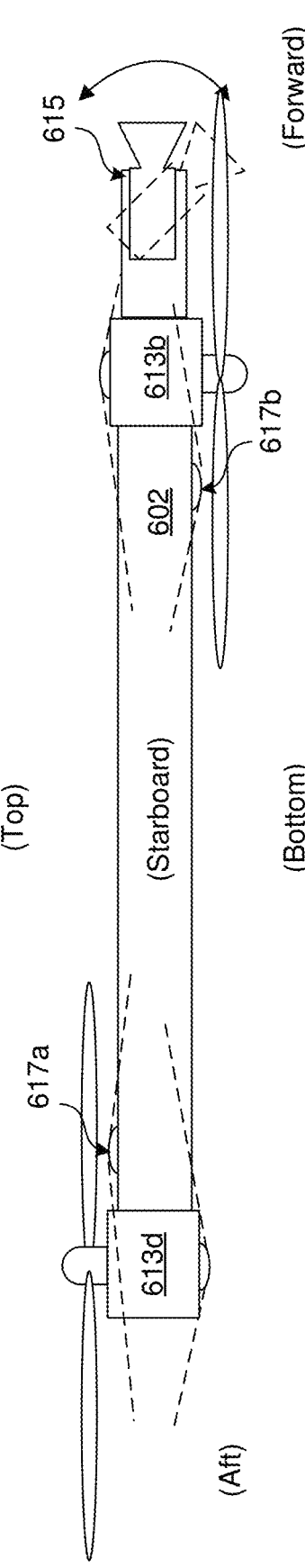

Notably, the gimbaled image capture device 615 is depicted in FIGS. 6A-6B as coupled to a first end wall of the body 602 of the UAV 600. In other words, the gimbaled image capture device 615 coupled to the body 602 proximate to the forward end of the body 602. This is an example arrangement provided for illustrative purposes and is not to be construed as limiting. In other embodiments, the gimbaled image capture device 615 may be arranged at a different location on the body of the UAV. However, the example arrangement depicted in FIGS. 6A-6B is advantageous in several respects. First, coupling the gimbaled image capture device 615 to an end wall of the body 602 instead of a bottom wall of the body 602 results in a narrower side profile for the UAV 600, for example, as illustrated in FIG. 6B. This narrower profile allows for easier storage and transport and may help to avoid obstacles in the physical environment. Second, coupling the gimbaled image capture device 615 to an end wall of the body 602, instead of a bottom wall of the body 602, allows the UAV 600 to land on the ground without damaging the gimbaled image capture device 615 and without the need for extraneous landing gear that adds weight and may affect flight dynamics. Third, coupling the gimbaled image capture device 615 to an end wall of the body 602 instead of a bottom wall of the body 602 keeps the gimbaled image capture device substantially out of the fields of view of the upward-facing and downward-facing image capture devices that are used for visual navigation (i.e., image capture devices 617*a*-*b* and the image capture devices associated with rotor assemblies 613*a*-*d*). Placing the gimbaled image capture device 615 along a bottom wall of the body 602 may obfuscate image capture by at least the downward-facing image capture device 617*b*.

Figure 7A:
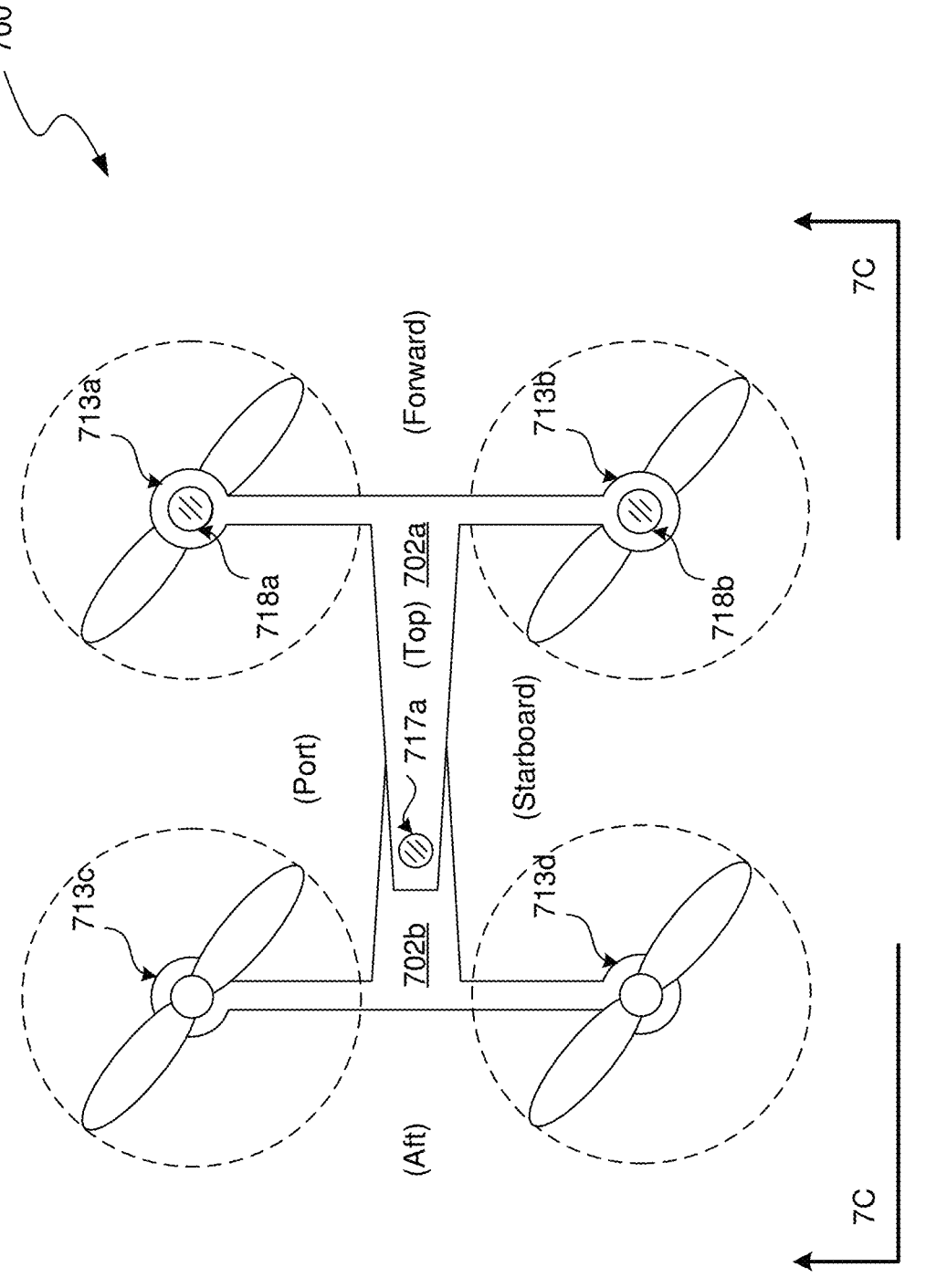
FIG. 7A shows a top view of a sixth example UAV.
Figure 7B:
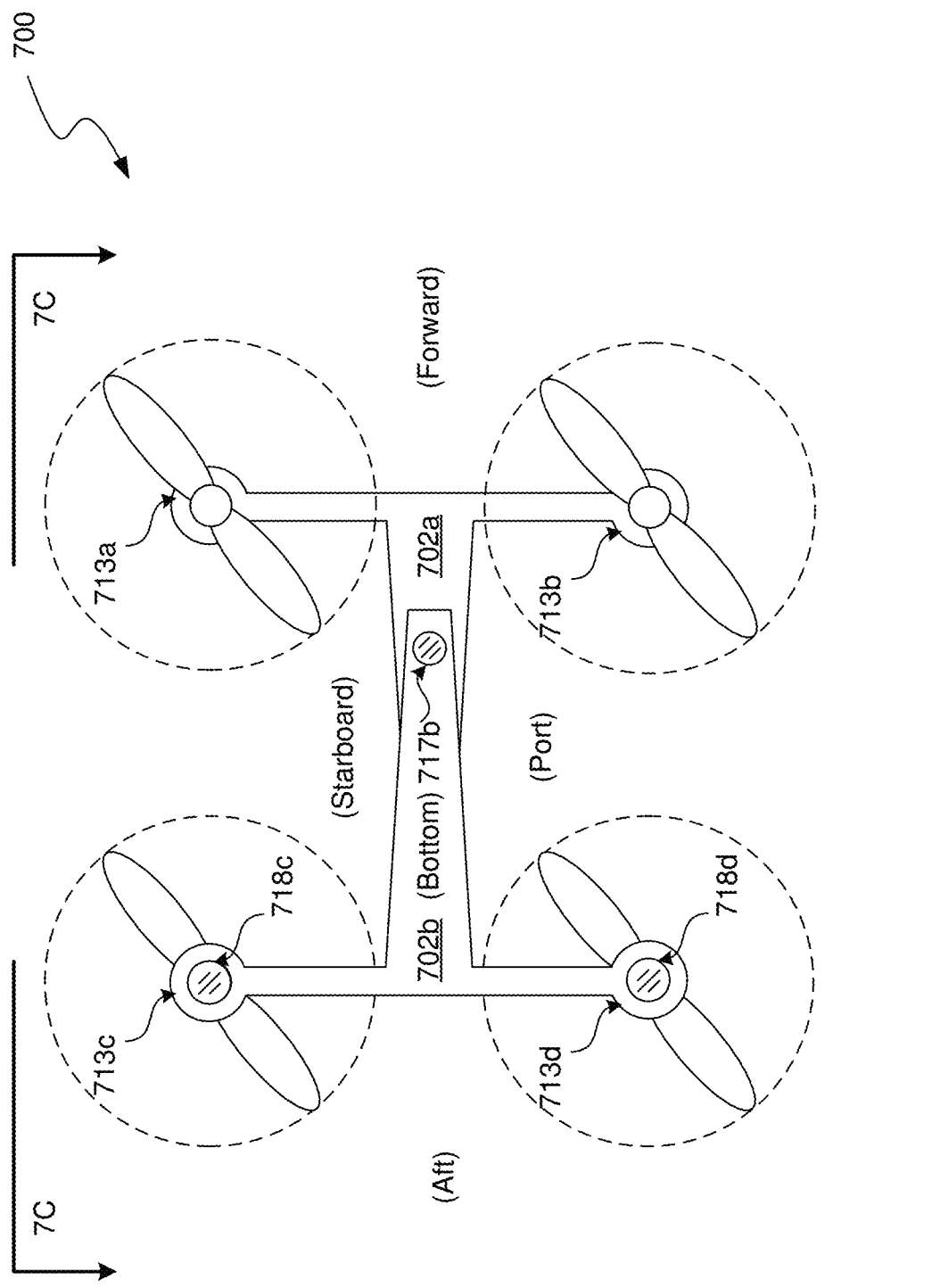
FIG. 7B shows a bottom view of the example UAV of FIG. 7A.
Figure 7C:
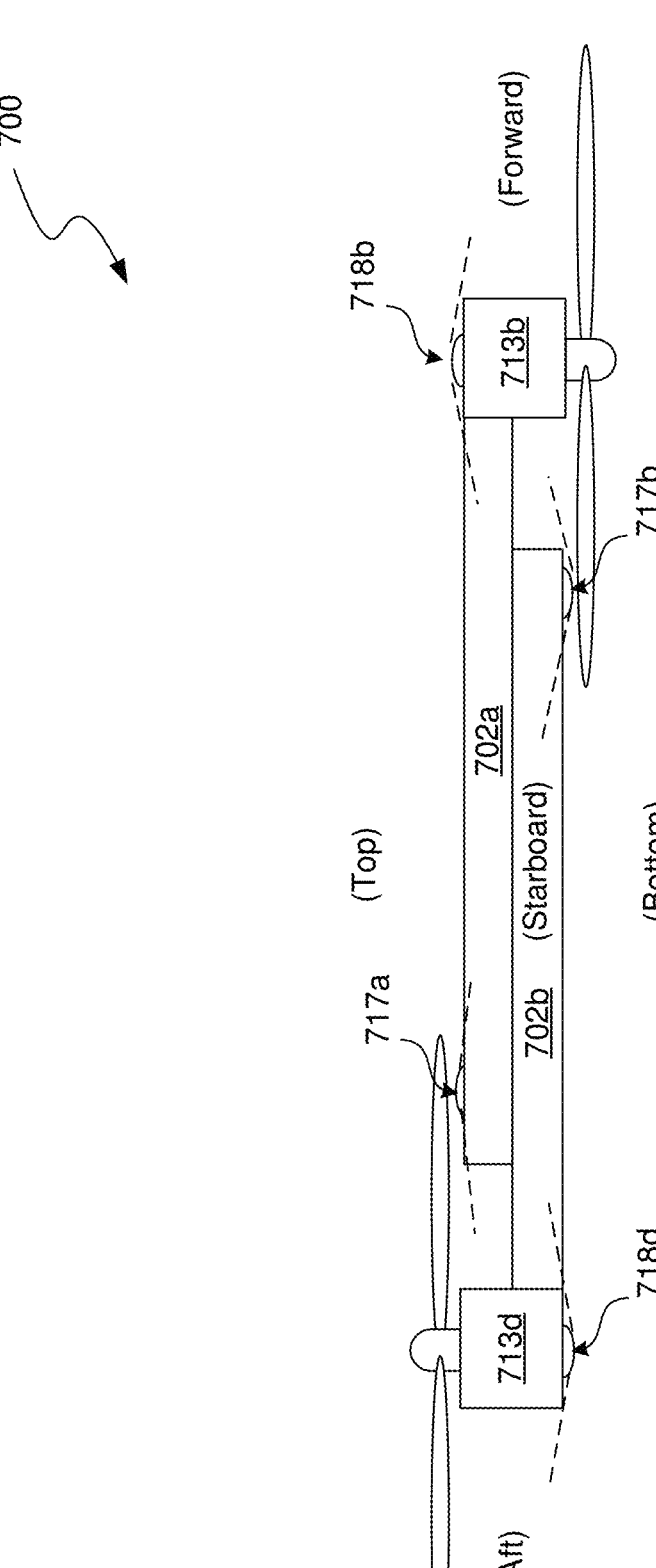
FIG. 7C shows a side view of the example UAV of FIG. 7A.

As previously mentioned, the body and rotor assemblies may be arranged differently in other embodiments. FIGS. 7A, 7B, and 7C show a top view, bottom view, and side view (respectively) of an example UAV 700 that includes a first body component 702*a* that includes multiple upward-facing image capture devices 717*a*, 718*a*, and 718*b*, and a second body component 702*b* that includes multiple downward-facing image capture devices 717*b*, 718*c*, and 718*d*.

Specifically, the first body component 702*a* includes or is otherwise coupled to rotor assemblies 713*a* and 713*b*, and the second body component 702*b* includes or is otherwise coupled to rotor assemblies 713*c* and 713*d*. In other words, the multiple upward-facing image capture devices include image capture devices 718*a* and 718*b* that are arranged on top surfaces of rotor assemblies 713*a* and 713*b* (respectively), and another upward-facing image capture device 717*a* that is arranged on a top surface of the first body component 702*a* substantially along a central axis of the UAV 700 proximate to the aft end of the UAV 700. In the example depicted in FIGS. 7A-7C, these multiple upward-facing image capture devices associated with the first body component 702*a* form a first triangle of image capture devices that are arranged to enable trinocular image capture in multiple directions substantially above the UAV 700, while in flight.

Similarly, the multiple downward-facing image capture devices include image capture devices 718*c* and 718*d* that are arranged on bottom surfaces of rotor assemblies 713*c* and 713*d* (respectively) and another downward-facing image capture device 717*b* that is arranged on a bottom surface of the second body component 702*b* substantially along the central axis of the UAV 700 proximate to the forward end of the UAV 700. In the example depicted in FIGS. 7A-7C, these multiple downward-facing image capture devices associated with the second body component 702*b* form a second triangle of image capture devices that overlap with the first triangle and that are arranged to enable trinocular image capture in multiple directions substantially below the UAV 700, while in flight.

In some embodiments, to simplify manufacture and parts replacement, the first body component (including rotor assemblies 713*a*-*b*) may be substantially similar (in dimension and/or shape) to the second body component 702*b* (including rotor assemblies 713*c*-*d*) and may be coupled to each other in an overlapping and opposing manner, for example, as more clearly illustrated in FIG. 7C. As shown in FIG. 7C, the first body component 702*a* includes upward-facing image capture devices and downward-facing rotors and is coupled to a substantially similar second body component 702*b* that is arranged upside-down relative to the first body component 702*a* so as to include downward-facing image capture devices and upward-facing rotors.

The body components 702*a*-*b* may be manufactured using any of the materials or manufacturing processes described with respect to body 502 of example UAV 500. In some embodiments, the body components 702*a*-*b* may collectively represent a unitary body. In other words, the two body components 702*a* and 702*b* may represent a single part that is formed of a single piece of material despite the separate component callouts in FIGS. 7A-7C. Alternatively, in some embodiments, the two body components 702*a* and 702*b* may be formed separately and affixed together, for example, using mechanical fasteners (e.g., clips, screws, bolts, etc.), adhesives (e.g., glue, tape, etc.), welding, or any other suitable process for affixing parts together.

Further, although not depicted in FIGS. 7A-7C, in some embodiments, a UAV similar to UAV 700 may be configured to include a gimbaled image capture device affixed to one end of the UAV 700, for example, as depicted in FIGS. 6A and 6B. For example, a gimbaled image capture device may be affixed to an end wall of either the first body component 702*a* or the second body component 702*b*.

Figure 8A:
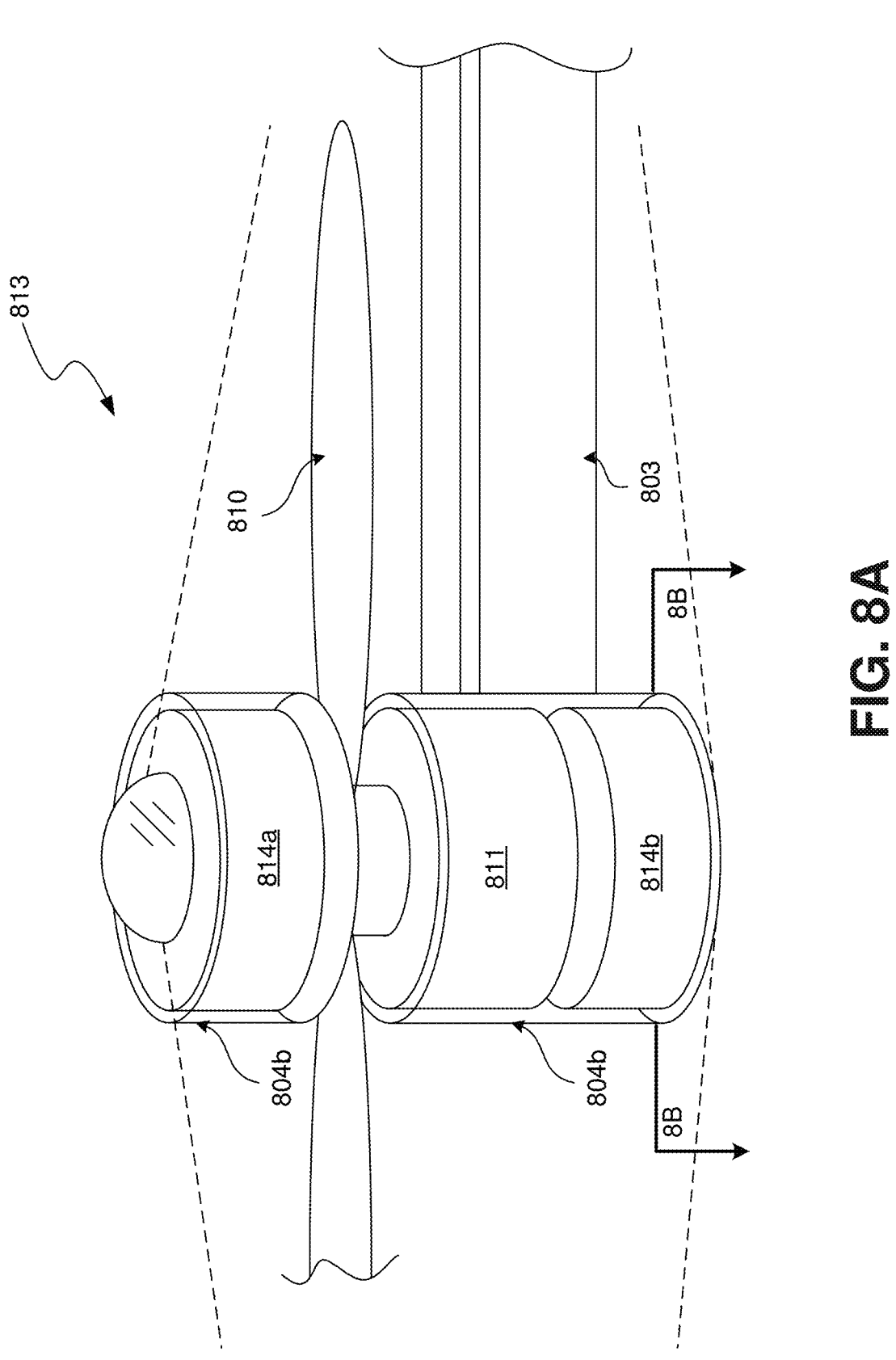
FIG. 8A shows a perspective view of a fifth example rotor assembly.

In some embodiments, more than one camera can be integrated into a given rotor assembly. FIG. 8A shows a perspective detail view of an example rotor assembly 813 that is similar to rotor assembly 413 depicted in FIG. 4B, except that it includes both an upward-facing camera and downward-facing camera. As shown in FIG. 8A, the example rotor assembly 813 includes a first housing component 804*a* and a second housing component 804*b* on opposite sides of the plane of rotation of the powered rotor 810. Both housing components 804*a-b* include walls that substantially surround an interior space within which components such as a motor 811, a first image capture device 814*a*, and second image capture device 814*b* are arranged. Specifically, in the example rotor assembly 813 depicted in FIG. 8A, an upward-facing image capture device 814*a* is arranged within the interior space of the first housing component 804*a* and both a motor 811 and downward-facing image capture device 814*b* are arranged within the interior space of the second housing component 804*b*. The example rotor assembly 813 may be coupled to the body of a UAV via a support arm 803.

Figure 8B:
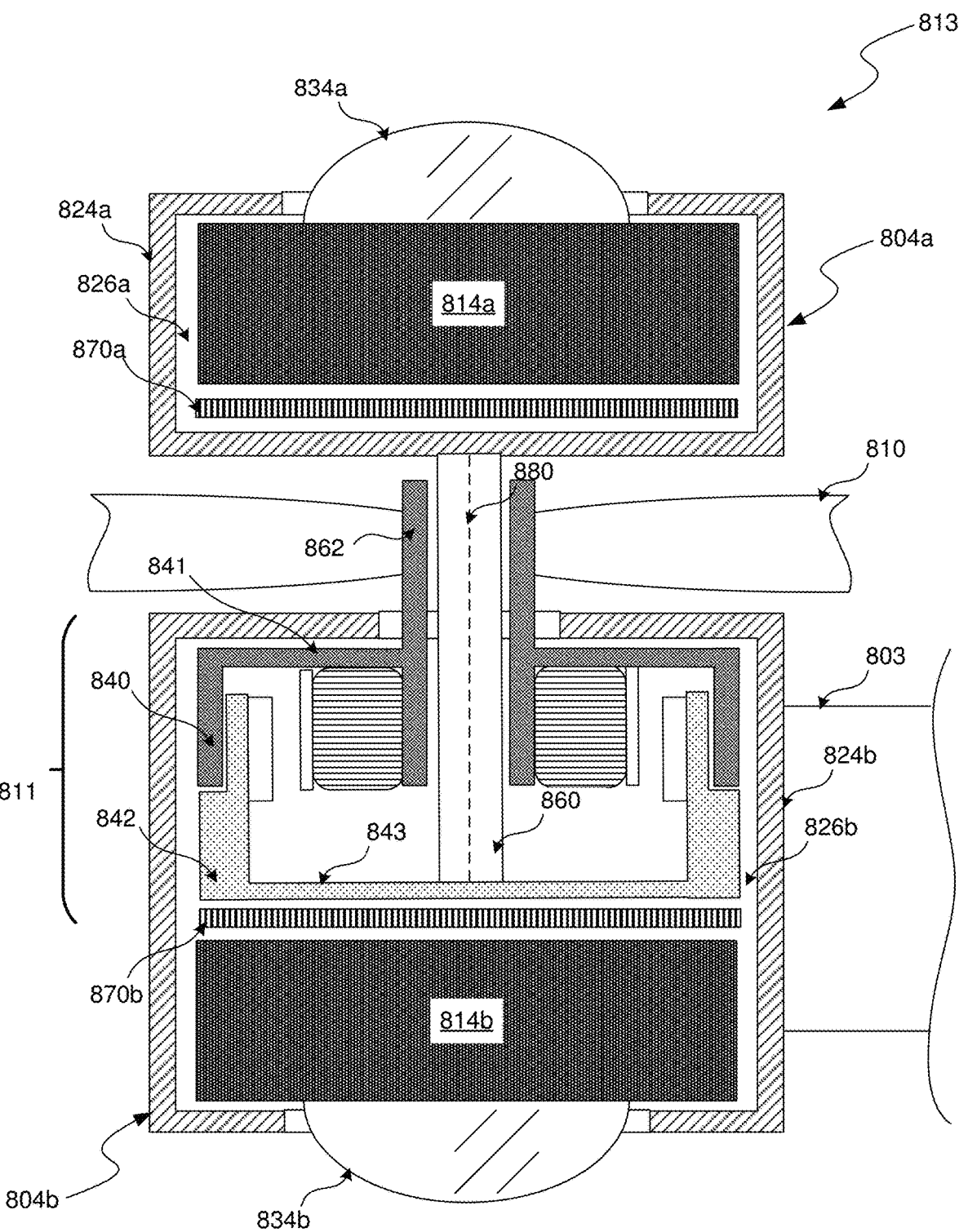
FIG. 8B shows a sectional view of the example rotor assembly of FIG. 8A.

FIG. 8B shows a sectional view of the rotor assembly 813 depicted in FIG. 8A. As shown in FIG. 8B, the first housing component 804*a* may comprise one or more walls 824*a* that substantially enclose a first interior space 826*a*. Similarly, the second housing component 804*b* may comprise one or more walls 824*b* that substantially enclose a second interior space 826*b*. The walls 824*a-b* of housing components 804*a-b* may be manufactured of any suitable material using any suitable manufacturing process similar to walls 424 of rotor assembly 413. Further, although the housing components 804*a-b* are depicted in FIGS. 8A-8B as substantially cylindrical in shape, this is an example shape provided for illustrative purposes and is not to be construed as limiting. Other embodiments may include rotor housing components of different shapes, for example, to accommodate interior components, for aerodynamic purposes, and/or aesthetic considerations.

A first image capture device 814*a* is arranged within the first interior space 826*a* of the first housing component 804*a*. Specifically, the first image capture device 814*a* is arranged within the first interior space 826*a* proximate to a first end (or "top side") of the first housing component 804*a* and oriented such that light is received through an opening in the top side of the first housing component 804*a*. For example, the first image capture device 814*a* may include a lens 834*a* that extends from the top side of the first housing component 804*a* such that the first image capture device 814*a* captures images of the physical environment above the rotor assembly 813, while in use. In other words, the first image capture device 814*a* is an upward-facing image capture device.

The motor 811 and a second image capture device 814*b* are arranged within the second interior space 826*b* of the second housing component 804*b*. Specifically, the motor 811 is arranged within the second interior space 826*b* proximate to the top side of the second housing component 804*b* and the second image capture device 814*b* is arranged within the second interior space 826*b* proximate to a second end (or "bottom side") of the second housing component 804*b* that is opposite the first end. Further, the motor 811 is oriented such that the attached rotor blades 810 extend from the top side of the second housing component 804*b*. Conversely, the second image capture device 814*b* is oriented such that light is received through an opening in the bottom side of the second housing component 804*b*. For example, the second image capture device 814*b* may include a lens 834*b* that extends from the bottom side of the second housing component 804*b* such that the second image capture device 814*b* captures images of the physical environment below the rotor assembly 813, while in use. In other words, the second image capture device 814*b* is a downward-facing image capture device. Note that the orientations of elements described with respect to the rotor assembly 813 depicted in FIG. 8B are relative and are provided as examples for illustrative purposes. In some embodiments, a similar rotor assembly may be oriented in an opposite direction.

For illustrative purposes, the motor 811 is depicted in FIG. 8B in the form of a brushless "outrunner" motor similar to motor 411 described with respect to rotor assembly 413. However, as with motor 411, motor 811 may be any type of motor capable of applying a torque to rotate the rotor blades 810. In the example depicted in FIG. 8B, motor 811 includes a movable first motor assembly and a stationary second motor assembly that includes an axle 860 about which the movable first motor assembly rotates. The first motor assembly is referred to as "moveable" because it is attached to the rotor blades 810 and rotates about the axle 860 of the stationary second motor assembly, when in use, thereby rotating the rotor blades 810.

The movable first motor assembly of motor 811 includes walls 840, 841 that form a first motor housing similar to walls 440, 441 of motor 411. Similarly, the second motor assembly includes walls 842, 843 that form a second motor housing similar to walls 442, 443 of motor 411.

The first motor assembly of motor 811 further includes an axle bearing 862 coupled to the first motor housing, and a stator stack arranged around the axle bearing 862. Note that the components of the stator stack of motor 811 are not specifically called out in FIG. 8B but may include the same or similar components as the stator stack for motor 411. Axle bearing 862 is intended to accommodate the previously mentioned axle 860 such that axle 860 is freely rotatable within axle bearing 862. Axle bearing 862 may be of any type suitable to allow for rotation of axle 860. For example, in an embodiment, axle bearing 862 is a plain bearing including a generally cylindrical hollow space within which the shaft of axle 860 can rotate. In some embodiments, axle bearing 862 includes rolling elements such as ball bearings arranged between generally cylindrical races.

Notably, the axle bearing 862 is hollow along axis 880 such that the first housing component 804*a* can be affixed to the rest of the rotor assembly 813 above the plane of rotation of rotors 810. In other words, axle 860, to which the first housing component 804*a* is affixed, remains stationary while the first motor assembly of motor 811 (i.e., including walls 840, 841) rotates about axis 880 to rotate rotors 810 that are affixed to the axle bearing 862. In some embodiments, the axle 860 may have a hollow construction to enable wires (e.g., for power and/or data transfer) to pass through to connect first image capture device 814*a* to processing components on board the UAV.

As with the example rotor assembly 413 described with respect to FIGS. 4B-4C, rotor assembly 813 may also include one or more isolator components or systems to isolate the image capture devices 814*a-b* from effects of the operation of motor 811, such as vibration and electromagnetic interference. Specifically, the example rotor assembly 813 includes a first isolator system 870*a* to isolate the first image capture device 814*a* from vibration and/or electromagnetic interference cause by the motor 811. The example rotor assembly 813 also includes a second isolator system 870*b* to isolate the second image capture device 814*b* from vibration and/or electromagnetic interference cause by the motor 811. Isolator systems 870*a-b* may include any one or more of the isolator components described with respect to isolator system 470 such as active/passive motion dampeners and/or electromagnetic shielding.

Figure 9A:
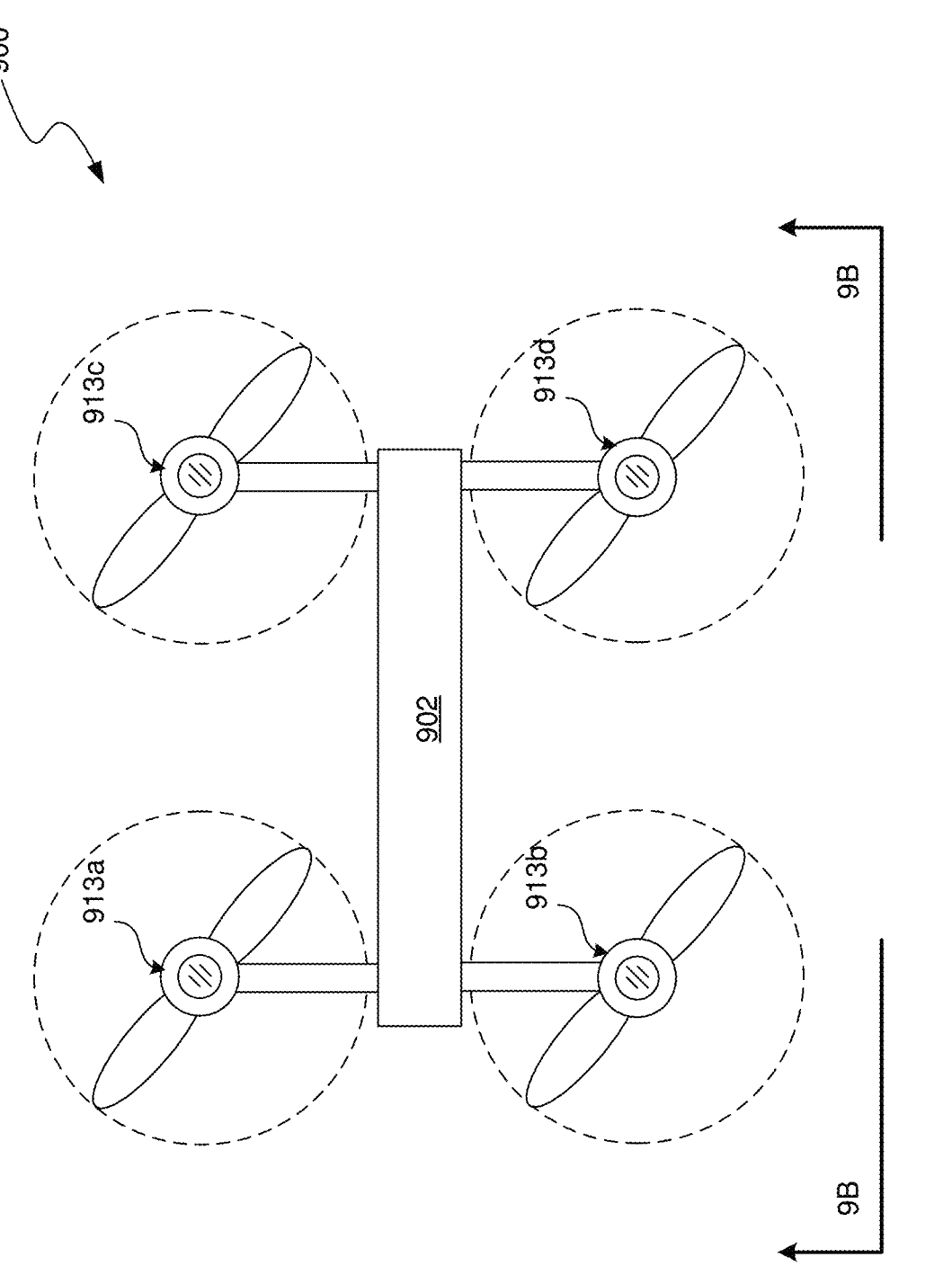
FIG. 9A shows a top view of a seventh example UAV.
Figure 9B:
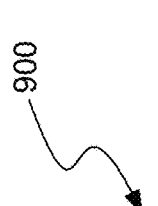
FIG. 9B shows a side view of the example UAV of FIG. 9A.
Figure 9B:
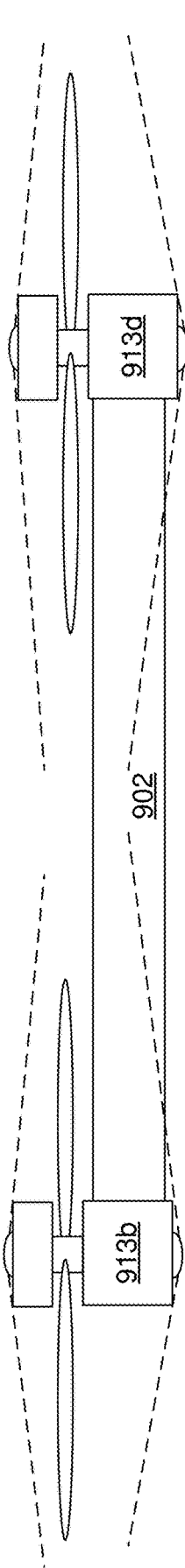

FIGS. 9A and 9B show a top view and side view (respectively) of an example UAV 900 that includes multiple rotor assemblies 913a-d that are similar to the rotor assembly 813 depicted in FIGS. 8A-8B. As shown in FIGS. 9A-9B, each of the rotor assemblies 913a-d of the example UAV 900 include an upward-facing image capture device and a downward-facing image capture device. Accordingly, the example UAV 900 includes four upward-facing cameras and four downward-facing cameras for a total of eight cameras. By placing the cameras in the rotor assemblies 913a-c, additional space is freed up in the body 902 of the UAV 900. Note that the example UAV 900 depicted in FIGS. 9A-9B includes four total rotor assemblies 913a-d, each with an upward-facing and downward-facing image capture device; however, this is not to be construed as limiting. For example, an alternative embodiment (not shown) may include only three rotor assemblies 913a-c, which would still provide three total upward-facing image capture devices and three downward-facing image capture devices for trinocular vision in both directions.

Figure 10A:
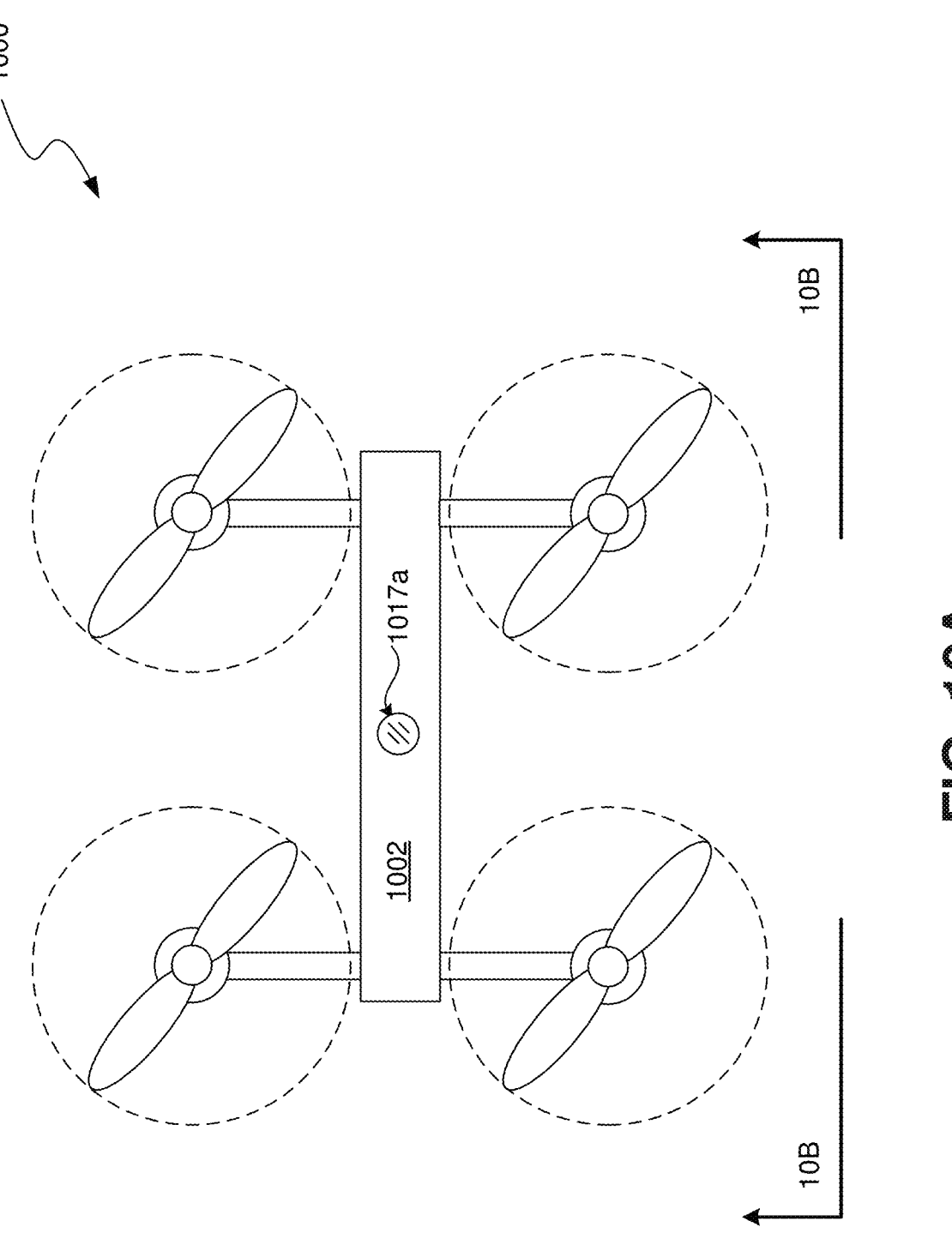
FIG. 10A shows a top view of an eighth example UAV.
Figure 10B:
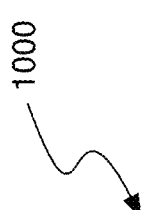
FIG. 10B shows a side view of the example UAV of FIG. 10A.
Figure 10B:
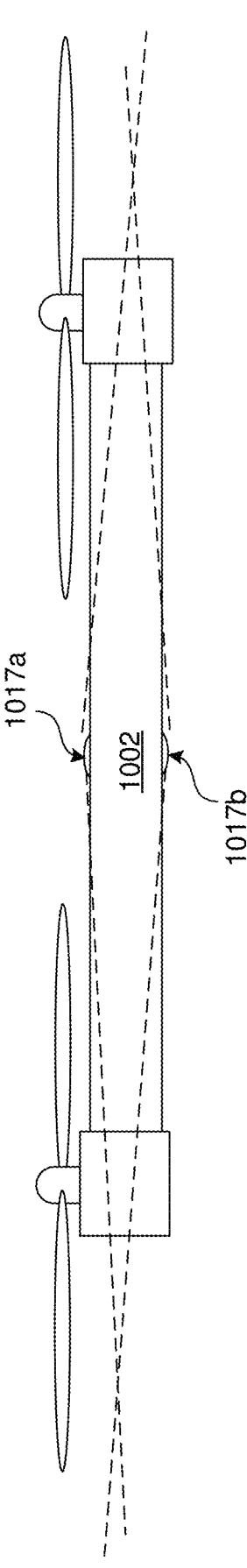

In some embodiments, as few as two image capture devices may be utilized to facilitate autonomous visual navigation. FIGS. 10A and 10B show a top view and side view (respectively) of an example UAV 1000 that includes only two image capture devices, an upward-facing image capture device 1017a and downward-facing image capture device 1017b, both mounted to the body 1002 of UAV 1000. Although not stereoscopic, the upward-facing and downward-facing image capture devices 1017a-b may be utilized to gather depth estimations, for example, by processing multiple images captured when the UAV 1000 is at different positions and/or orientations.

Figure 10C:
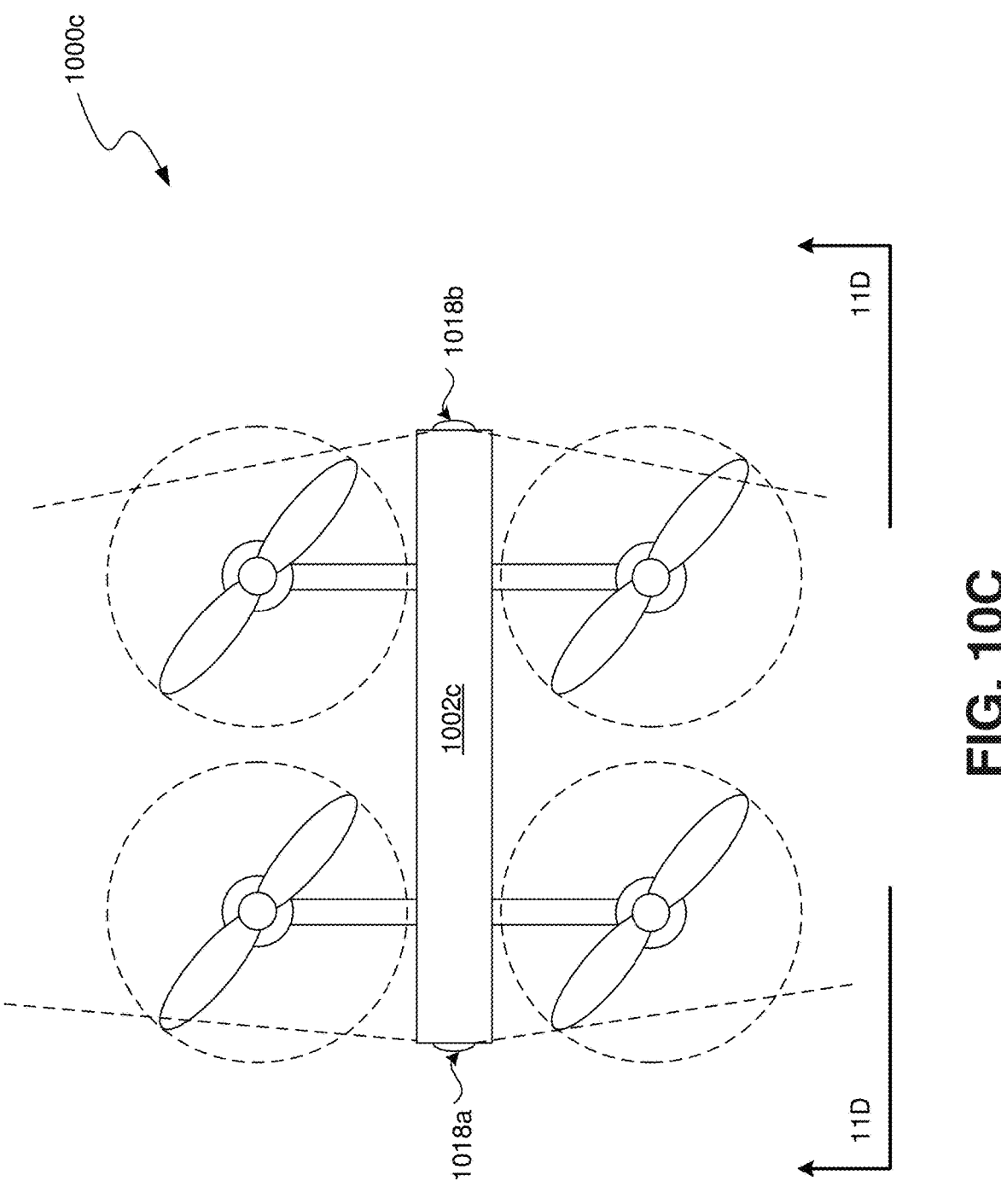
FIG. 10C shows a top view of a ninth example UAV.
Figure 10D:
FIG. 10D shows a side view of the example UAV of FIG. 10C.

In some embodiments, image capture devices may instead be coupled to the body of a UAV at opposing ends and oriented to capture images in front of and behind the UAV. FIGS. 10C-10D show a top view and side view (respectively) of an example UAV 1000c that includes two total image capture devices, a front-facing image capture device 1018a and a back facing image capture device 1018b, both mounted to opposing ends of the body 1002c of the UAV 1000c.

Figure 11A:
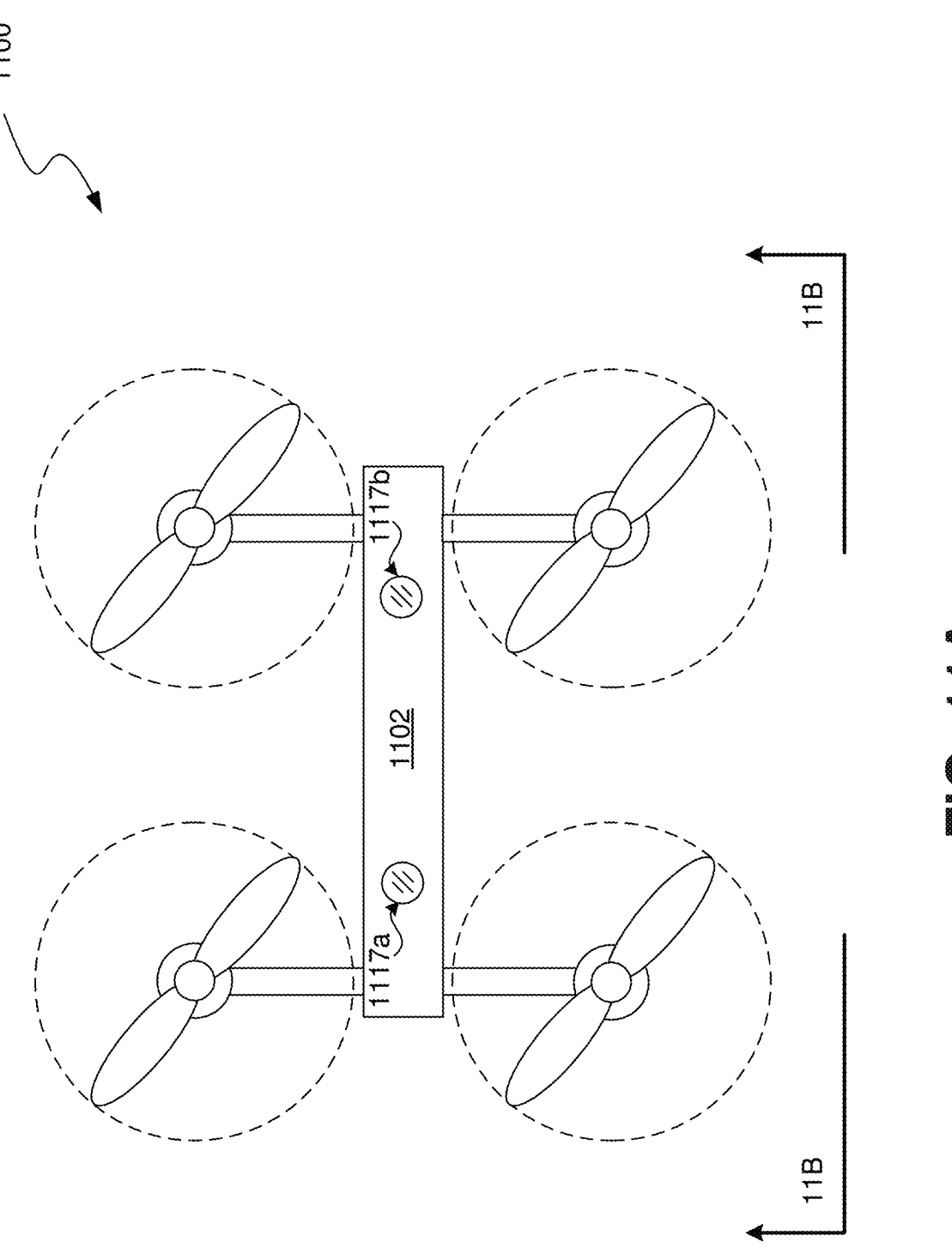
FIG. 11A shows a top view of a tenth example UAV.
Figure 11B:
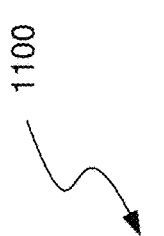
FIG. 11B shows a side view of the example UAV of FIG. 11A.
Figure 11B:
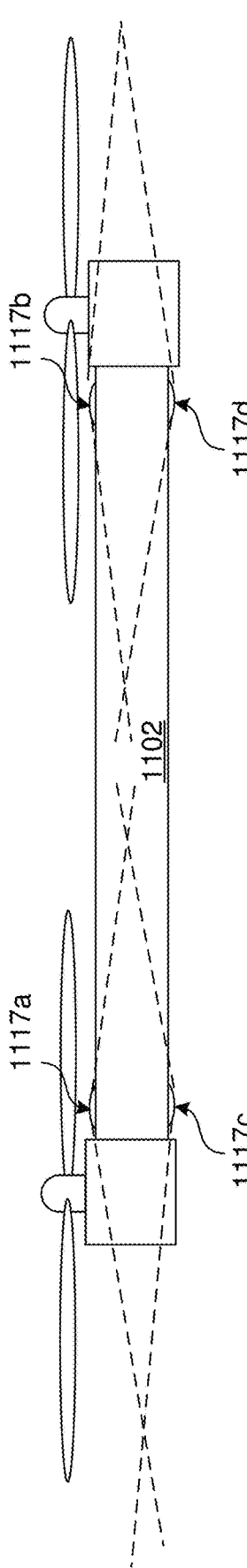

Adding additional image capture devices may improve depth estimation accuracy. FIGS. 11A-11B show a top view and side view (respectively) of an example UAV 1100 that is similar to UAV 1000 except that it includes two upward-facing image capture devices 1117a-b and two downward-facing image capture devices 1117c-d, all mounted to the body 1102 of UAV 1100. UAV 1100a would be capable of stereoscopic image capture above and below the UAV 1100.

Figure 12A:
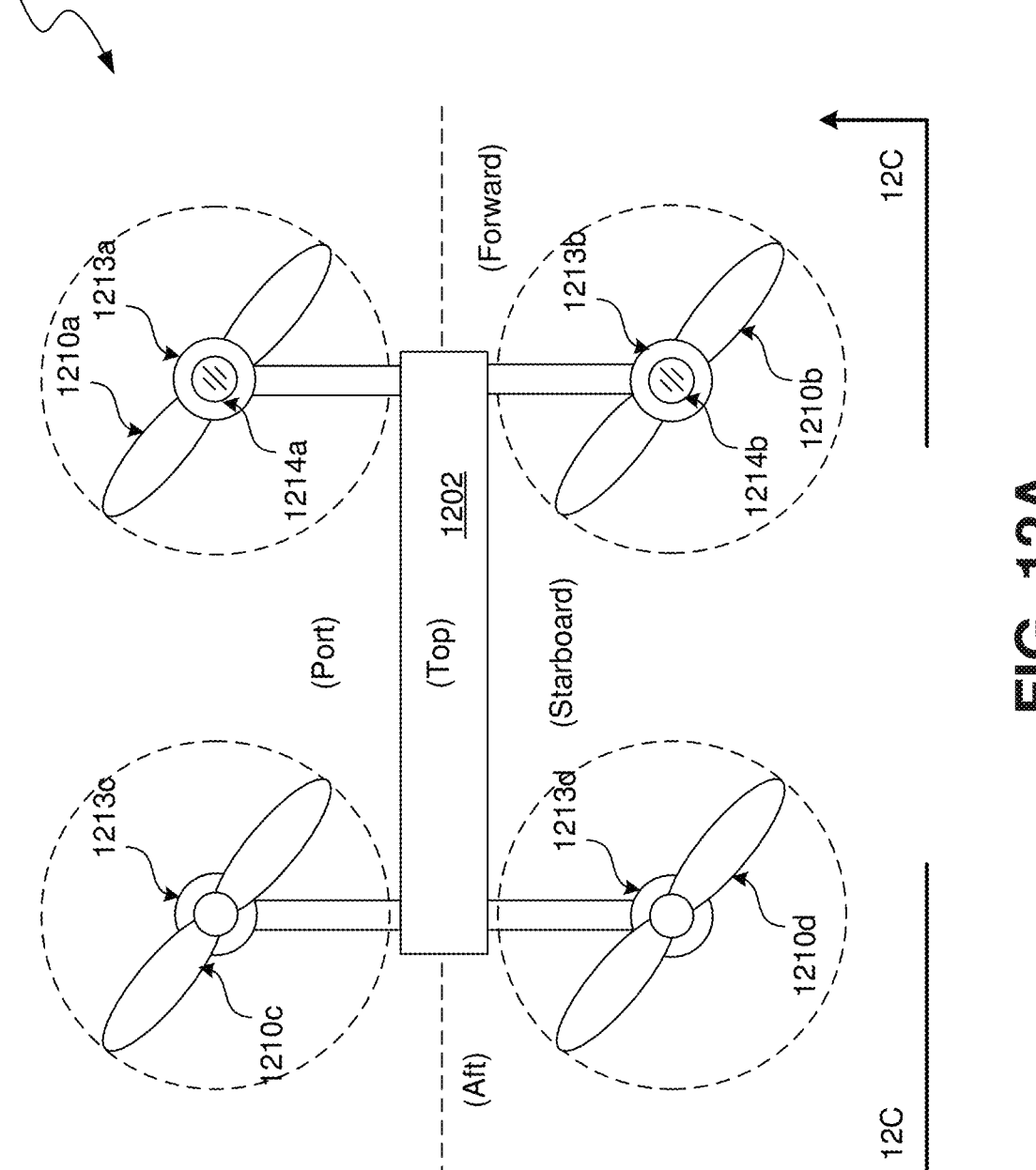
FIG. 12A shows a top view of an eleventh example UAV.
Figure 12B:
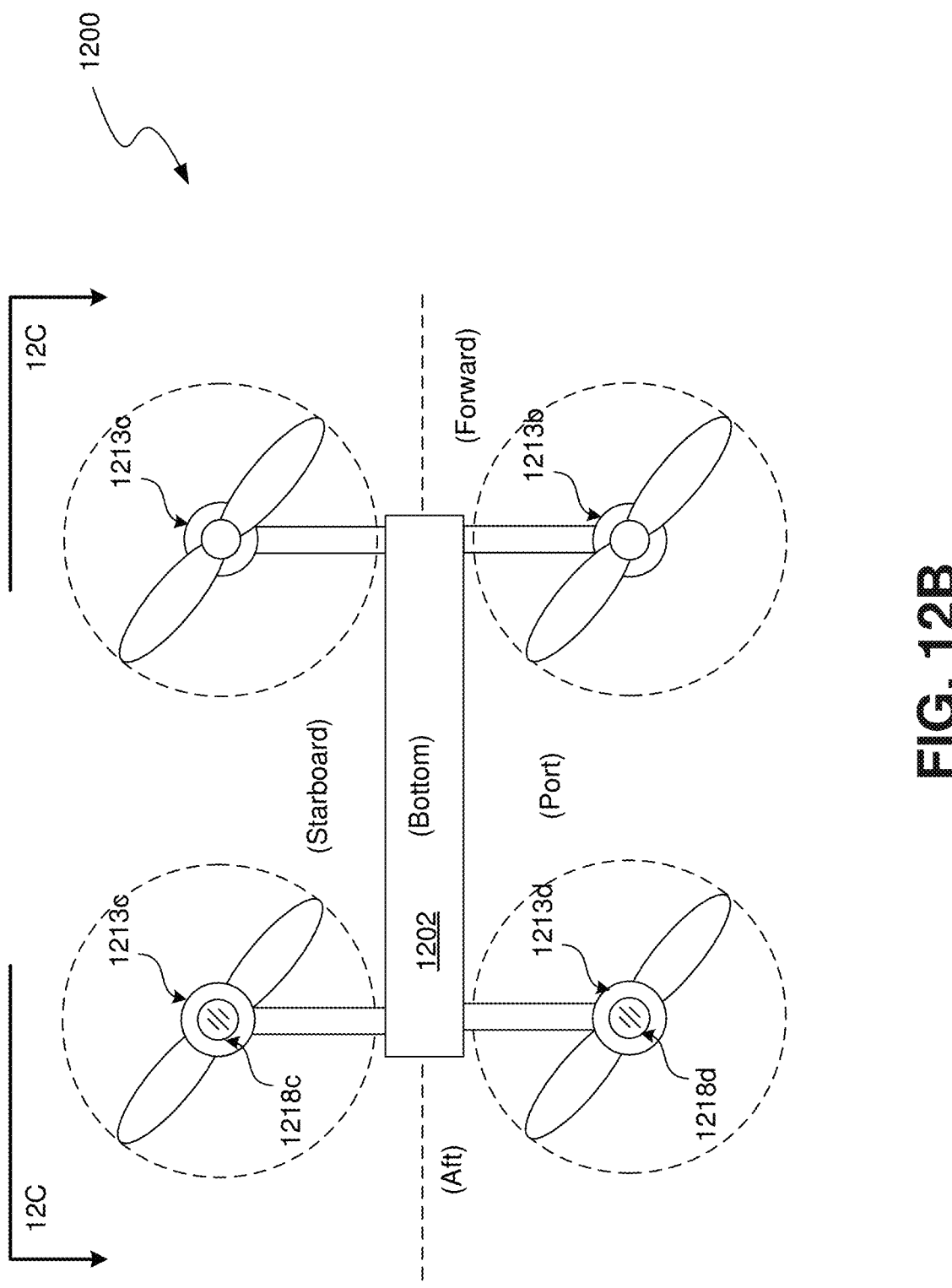
FIG. 12B shows a bottom view of the example UAV of FIG. 12A.
Figure 12C:
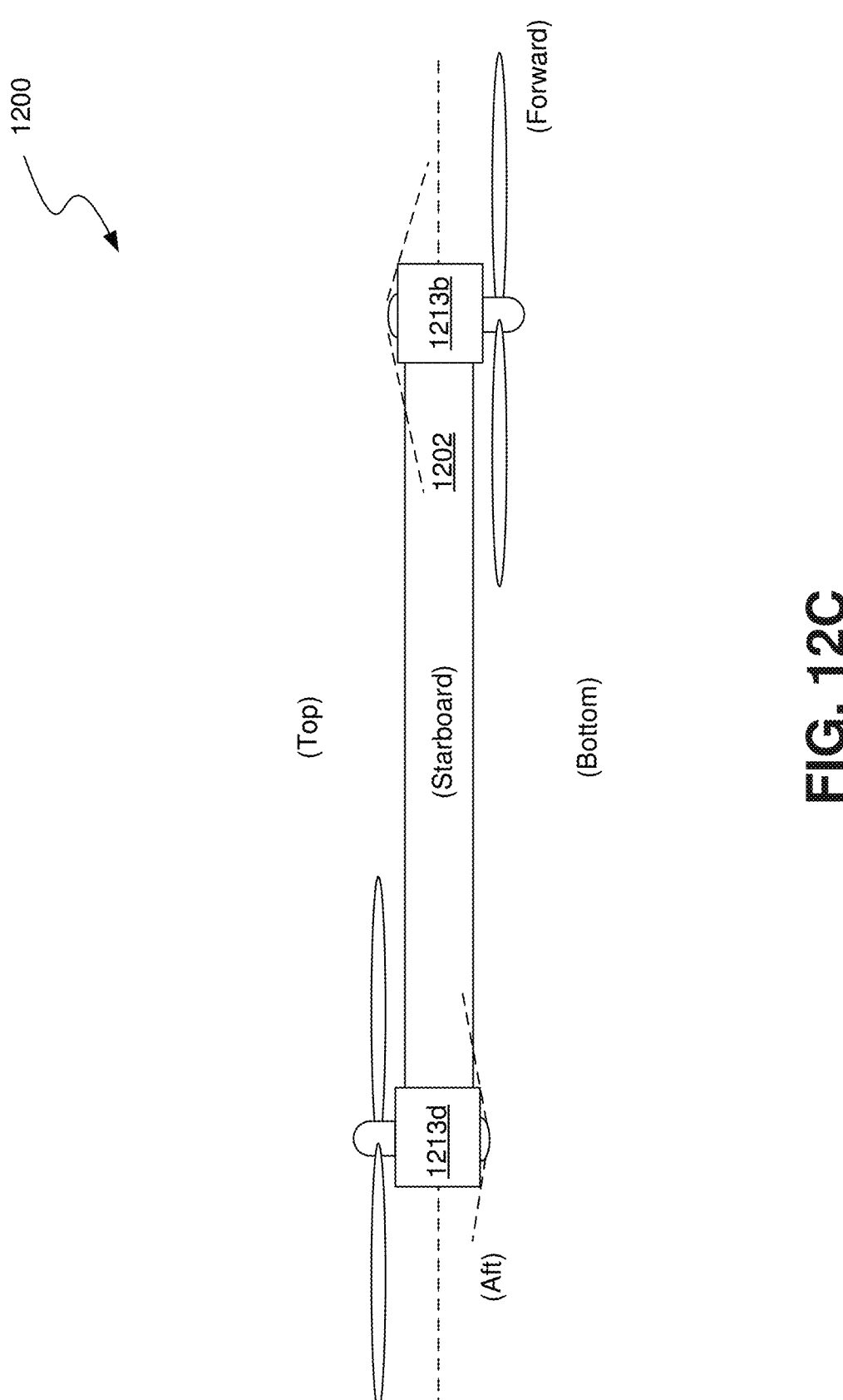
FIG. 12C shows a side view of the example UAV of FIG. 12A.

In some embodiments, the two upward-facing image capture devices and two downward-facing image capture devices may be arranged in or on rotor assemblies instead of in a central body to free up space in the central body. For example, FIGS. 12A, 12B, and 12C show a top view, bottom view, and side view (respectively) of an example UAV 1200 that is similar to the UAV 500 depicted in FIGS. 5A-5C expect that it does not include body-mounted image capture devices similar to image capture devices 517a-b of UAV 500. As shown in FIGS. 12A-12C, the example UAV 1200 includes a body 1202 and multiple rotor assemblies 1213a, 1213b, 1213c, and 1213d. Each of the rotor assemblies 1213a-d may include an image capture device and powered rotor as described, for example, with respect to rotor assembly 413 in FIG. 4B or any of the alternative rotor assemblies in FIGS. 4D-4F.

In the example UAV 1200, a first rotor assembly 1213a extends from the port side of the body 1202 and a second rotor assembly 1213b extends from the starboard side. The first and second rotor assemblies 1213a and 1213b are substantially aligned with each other on opposite sides of the body 1202 and are located proximate to the forward end of the body 1202. Notably, the first and second rotor assemblies are oriented such that associated image capture devices are on a top side and the associated rotors are on a bottom side. Specifically, the first rotor assembly 1213a includes a first image capture device 1214a that is arranged on a top side of the first rotor assembly 513a and a first rotor 1210a that is arranged on a bottom side of the first rotor assembly 1213a. Similarly, the second rotor assembly 1213b includes a second image capture device 1214b that is arranged on a top side of the second rotor assembly 1213b and a second rotor 1210b that is arranged on a bottom side of the second rotor assembly 1213b.

A third rotor assembly 1213c extends from the port side of the body 1202 and a fourth rotor assembly 213d extends from the starboard side. The third and fourth rotor assemblies 1213c and 1213d are substantially aligned with each other on opposite sides of the body 1202 and are located proximate to the aft end of the body 1202. Notably, the third and fourth rotor assemblies are oriented such that associated image capture devices are on a bottom side and the associated rotors are on a top side. Specifically, the third rotor assembly 1213c includes a third image capture device 514c that is arranged on a bottom side of the third rotor assembly 1213c and a third rotor 1210c that is arranged on a top side of the third rotor assembly 1213c. Similarly, the fourth rotor assembly 1213d includes a fourth image capture device 1214d that is arranged on a bottom side of the fourth rotor assembly 1213d and a fourth rotor 1210d that is arranged on a top side of the fourth rotor assembly 1213d.

In some embodiments, a UAV with only two upward-facing and two-downward facing image capture device (e.g., UAVs 1100 and 1200) may be configured to still achieve stereoscopic capture in multiple directions by, for example, adjusting the angles of the various image capture devices. For example, with reference to UAV 1200, the first image capture device 1214a may be arranged at an angle towards the third rotor assembly 1213c and the third image capture device 1214c may be arranged at an angle towards the first rotor assembly 1213a. Although the first image capture device 1214a and the third image capture device 1213c point in substantially opposite directions (i.e., upwards and downwards), a slight angle towards each other may be sufficient to provide a stereo baseline between the two.

FIGS. 5A-12C depict several example embodiments of UAVs with varying arrangements of image capture devices. These embodiments are provided for illustrative purposes and are not to be construed as limiting. Other embodiments may include more or fewer image capture devices than are depicted, may arrange the image capture devices differently, may include more or fewer rotor assemblies, may arrange the rotor assemblies differently, may combine one or more features of the depicted embodiments, etc.

Protective Structure for Image Capture Devices

Figure 13:
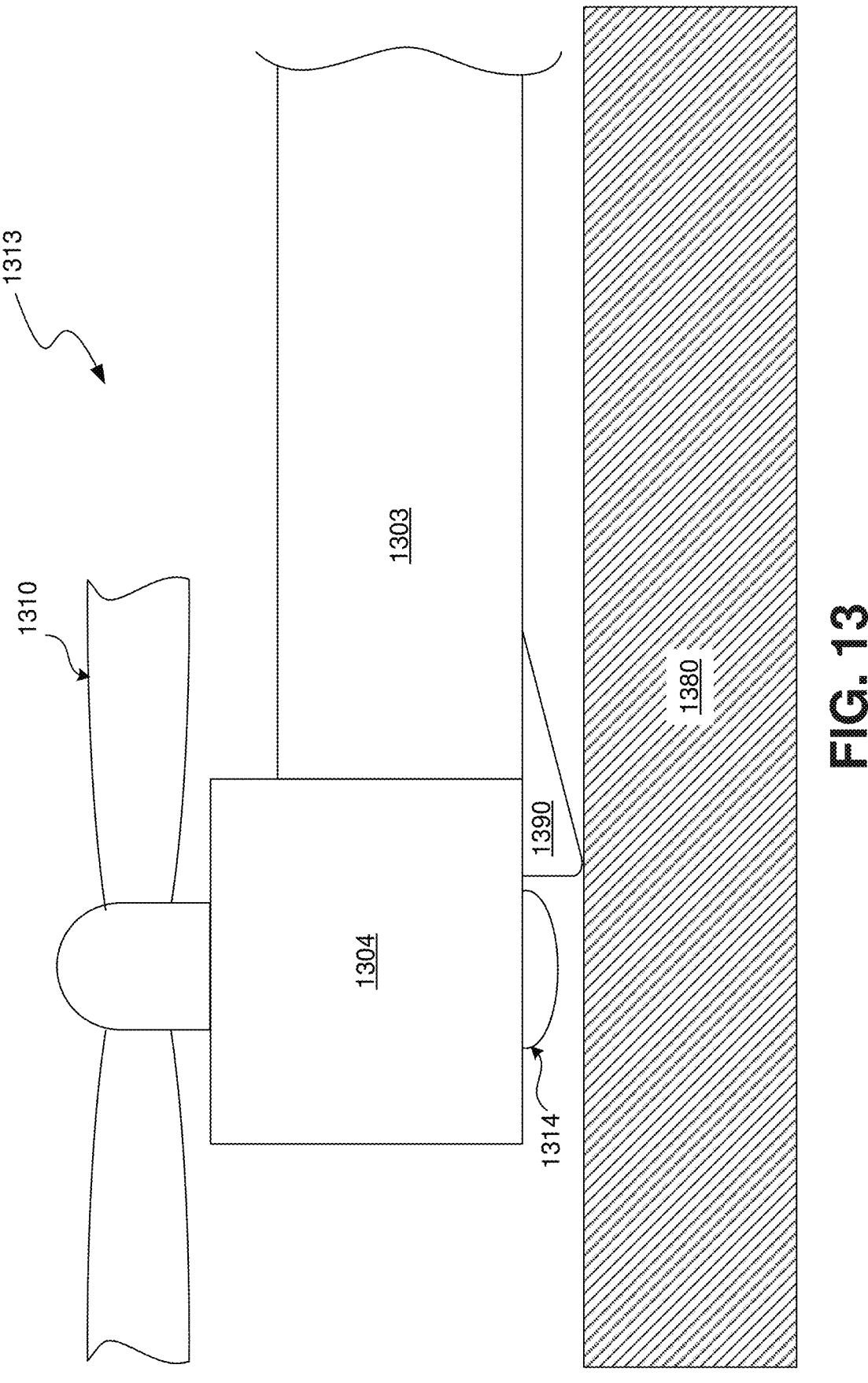
FIG. 13 shows a detail view of an example protective structural element for an image capture device.

Arranging the image capture devices as shown in any one or more of the example UAVs of FIGS. 5A-12C can expose the image capture devices to damage due to contact with the ground when the UAV lands, or contact with other objects while the UAV is in flight. To protect the image capture device from damage, a protective element can be added to offset the image capture device from any surface such as the ground. FIG. 13 shows a side view of an example assembly 1313 that includes such a protective element. Specifically, the example assembly 1313 includes an arm 1303 and rotor housing 1304 that houses a rotor 1310 and a downward-facing image capture device 1314, for example, similar to the rotor assembly 413 described with respect to FIGS. 4A-4B. The example assembly further includes a protective structural element 1390 that is arranged along a surface of the UAV, for example, along a surface of housing 1304 and/or arm 1303 in proximity to the image capture device 1314 such that an outer surface of the image capture device 1314 (e.g., a lens) does not contact a surface 1380 (e.g., the ground) when the UAV contacts the surface 1380.

The protective structural element 1390 is depicted in FIG. 13 as having a wedge or fin shape; however, this is an example provided for illustrative purposes and is not to be construed as limiting. The size and shape of the protective structural element will depend on the specifics of the aircraft such as the weight, size, type of image capture devices, etc. Further, similar protective structural element can be arranged in proximity to other image capture devices that are not on the underside of the vehicle. For example, a similar protective element may be arranged on a top surface of a rotor assembly or a body of a UAV to protect an upward facing image capture device.

The protective structural element 1390 may be manufactured of any material or combination of materials that are suitably durable and lightweight for use in an aerial vehicle. For example, in some embodiments, the protective structural element 1390 can be made of plastic, metal (e.g., aluminum), carbon fiber, synthetic fiber, or some sort of composite material such as carbon fiber embedded in an epoxy resin. The actual materials used will depend on the performance requirements of a given embodiment. The protective structural element 1390 may be manufactured using any manufacturing process suited for the selected material. For example, in the case of plastic materials, the protective structural element 1390 may be manufactured using injection molding, extrusion molding, rotational molding, blow molding, 3D printing, milling, plastic welding, lamination, or any combination thereof. In the case of metal materials, the protective structural element 1390 may be manufactured using machining, stamping, casting, forming, metal injection molding, CNC machining, or any combination thereof. These are just example materials and manufacturing processes that are provided for illustrative purposes and are not to be construed as limiting.

In some embodiments, the protective structural element 1390 may represent a portion of an exterior surface of a UAV. For example, the walls of any of the rotor housing 1304 and/or the rotor arm 1303 may be manufactured to include a portion that extends, for example, as depicted in FIG. 13. Alternatively, in some embodiments, the protective structural element 1390 may be manufactured as a separate part and affixed to an exterior surface of a UAV, for example, using mechanical fasteners (e.g., clips, screws, bolts, etc.), adhesives (e.g., glue, tape, etc.), welding, or any other suitable process for affixing parts together.

In some embodiments, a protective structural element similar to element 1390 may be arranged proximate to each of one or more image capture devices of a UAV. This may include upward-facing image capture devices to protect such device from contact with the ground, for example, if the UAV lands upside down, or from contact with other surfaces above the UAV, such as a ceiling or the underside of a bridge. In some embodiments, the protective structural element 1390 may represent a part of a bezel or frame that is installed flush with a surface associated with the UAV and around a lens of an image capture device.

Removable Rotor Blades

The propellers on certain UAVs (e.g., quadcopter drones) are often considered to be consumable because they are the most likely part of the aircraft to be damaged in the event of a collision with another object. Accordingly, manufacturers of such UAVs typically design the propellers to be user replaceable in the field, without the need of any kind of tools and with a minimum of effort. There are currently two widely used methods of attaching propellers to drones that meet this need. The first is by using a separate, easy to hand-tighten, propeller nut that threads onto the propeller shaft or equivalent structure, pinching the propeller in place. This method has the downside of needing a small separate part (i.e., the propeller nut), that if lost, renders the UAV unusable, and has a tendency to spontaneously loosen and come off when subjected to rotational and vibrational loads. Such a propeller nut also requires frequent re-tightening or exotic, left-handed threads. The second method uses a bayonet lock to attach a propeller directly to a motor. Since this method relies on a spring to keep the propeller seated in its locked position, the propeller cannot be relied upon to undergo any loading that would push back against this spring, and so cannot be used in a pusher configuration or for three-dimensional flight, where the propeller is run in both directions for maximum maneuverability. An improved technique for removable rotor blades is described below to address these challenges.

Figure 14A:
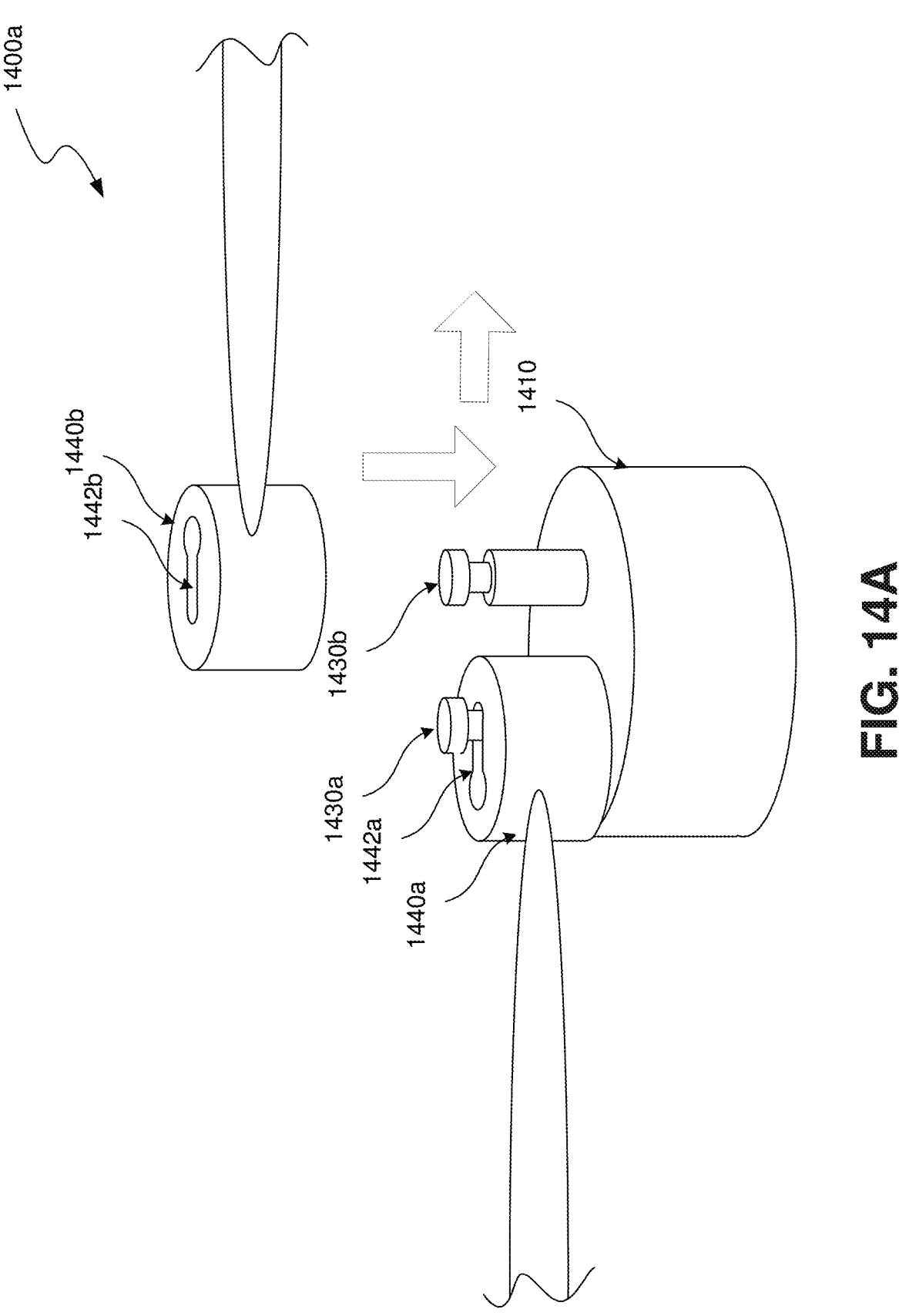
FIG. 14A shows a perspective view of an example rotor assembly with removable rotor blades.

FIG. 14A shows an example rotor assembly 1400a that includes removable rotor blades. As shown in FIG. 14A, the rotor assembly includes a motor 1410 (e.g., an electric motor) that spins, when powered. Coupled to the spinning portion of the motor 1410 are one or more pins 1430a-b. The one or more pins 1430a-b are configured to detachably couple to removable rotor blades 1440a-b. For example, as shown in FIG. 14A, each removable rotor blade 1440a-b may include a keyhole shaped slot 1442a-b (respectively) through an attachment portion of the rotor blade 1440a-b. Removable rotor blade 1440a is shown in an installed position, while removable rotor blade 1440b is shown in a removed position. Notably, the keyhole shaped slots 1442a-b and corresponding pins 1430a-b may be configured such that the blades 1440a-b are easy to remove and replace without any tools. As indicated by the arrows in FIG. 14A, each rotor blade 1440a-b can be secured in place by bringing the widest portion of the keyhole slot 1442a-b down over the head of the pin 1430a-b and then pulling laterally to lock the removable blade 1440a-b in place. The keyhole shaped slots 1442a-b and corresponding pins 1430a-b may be further configured such that, when in use, a centrifugal force effect caused by the rotation of the motor 1410 helps to keep the rotor blades 1440a-b secured in place.

In some embodiments, the pins 1430a-b may be shaped and/or sized differently based on the type and/or arrangement of the motor 1410 to force proper installation by the user. For example, as previously described (e.g., with respect to UAV 500 in FIGS. 5A-5B), in some embodiments, a UAV may include one or more inverted rotors (e.g., to direct an integrated camera upward). In such embodiments, the pins on the inverted (i.e., downward-facing) motors may be shaped and/or sided differently than the pins on the upward-facing motors so as to force a user to install the proper rotor blades (e.g., clockwise vs. counterclockwise blades) on each motor.

Figure 14B:
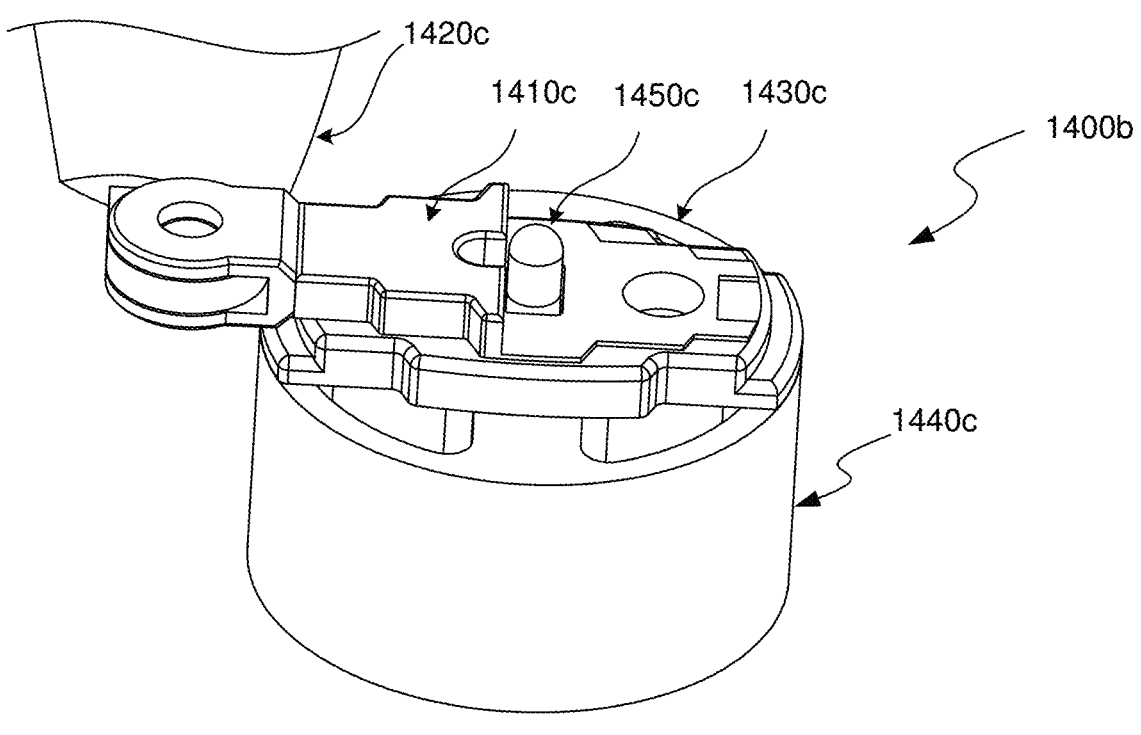
FIG. 14B shows a perspective view of another example rotor assembly with removable rotor blades.
Figure 14C:
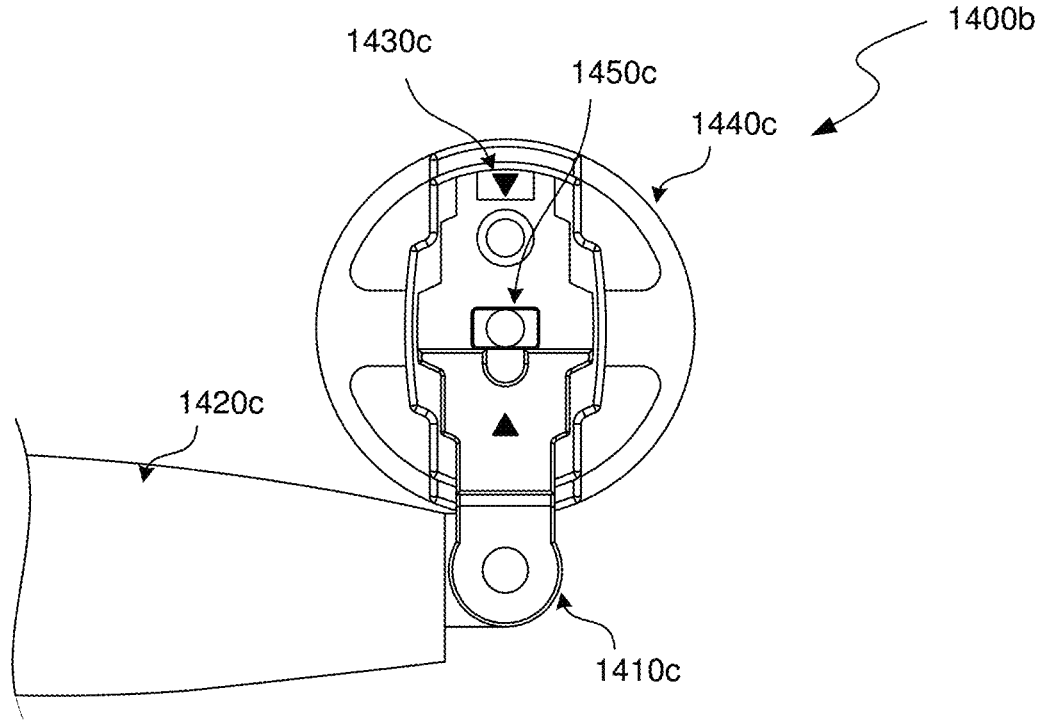
FIG. 14C shows a top view of the example rotor assembly of FIG. 14B.

The keyhole/pin attachment mechanism depicted in FIG. 14A is just an example provided for illustrative purposes. Other non-screw attachment mechanisms may similarly be implemented. For example, FIGS. 14B and 14C show a perspective view and top view (respectively) of another example rotor assembly 1400b that includes removable rotor blades. In the example rotor assembly 1400b depicted in FIGS. 14B and 14C, locking features 1410c on the inner-most ends of individual propeller blades 1420c are lowered axially into a central mounting socket 1430c and are then pulled radially outward to lock them into place. In this locked position the propeller blades 1420c are accurately and rigidly located by a small taper-angle interface with the central mounting socket 1430c. This radially engaged con-nection ensures that the blades 1420c are properly seated in the socket as soon as the motor 1440c spins up, and the centrifugal loading forces imposed on the blades 1420c helps to secure the blades correctly in position. Once prop-erly seated, the blades 1420c are prevented from coming loose by a small spring driven member 1450c in the middle of the central socket 1430c that pops up and does not allow the blades 1420c to move far enough radially inward to disengage from the tabs that form the part of the socket 1430c that holds the blades 1420c in place. To remove a propeller blade 1420c (e.g., in the event that it is damaged and needs to be replaced), the user can press down on this spring driven member 1450c to lower it out of the way, and then push the blade 1420c radially inward until it disengages and can then be lifted axially out of the socket 1430c.

The techniques for removable propeller attachments depicted in FIGS. 14A-14C allow for the replacement of individual propeller blades instead of replacing an entire propeller assembly. The blades are held securely against loading in any direction and so can be used in pull-propeller, push-propeller, and three-dimensional flight configurations. Since the security of the mounting technique only increases as the propeller spins up, there is no risk of the propeller becoming loose over time as there is with a propeller nut arrangement. The number of blades that can be secured by this method is only limited by the size of the central socket. In some embodiments, folding propellers can be imple-mented by integrating a pivot joint into the propeller blade next to the innermost locking features.

Removable Battery Pack as a Launch Handle

In some embodiments, an autonomous UAV can be con-figured to launch and land from a user's hand. Such opera-tion may require a prominent feature such as a handle on the UAV so that a person can easily grip the UAV during launch or landing. However, a prominent handle for launch and landing may negatively impact the transportability of the UAV. Instead, such a handle can be configured as a detach-able component of the UAV. Further, in some embodiments, the detachable handle component can be configured to house a removable battery pack for powering the UAV.

Figures 15A, 15B:
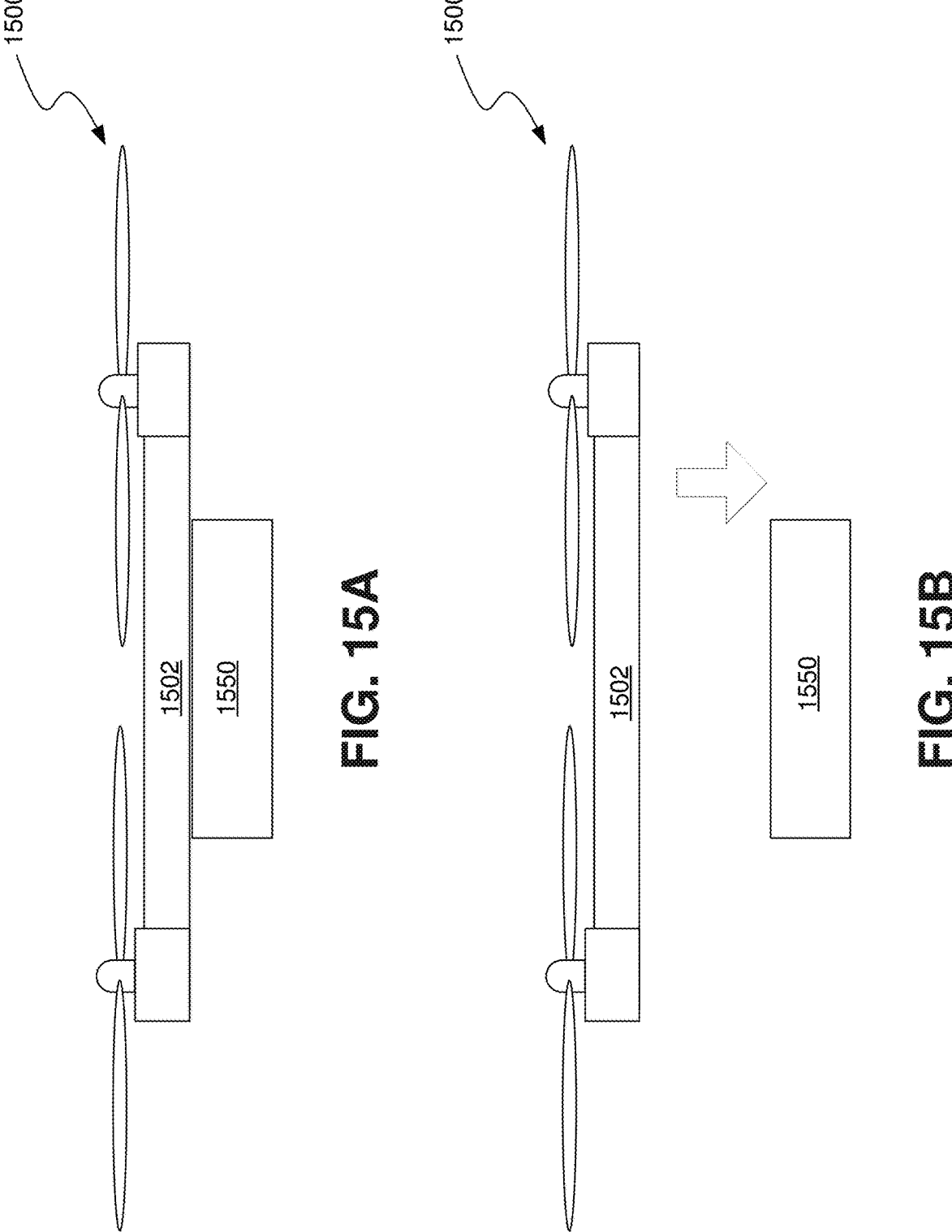
FIG. 15A shows a side view of an example UAV with a removable battery.
FIG. 15B shows a side view of the example UAV of FIG. 15A with the battery removed.

FIG. 15A shows a side view of an example UAV 1500 that includes a removable battery pack that is configured to be utilized as a handle for launching from, and landing into, the hand of a user. Specifically, FIG. 15A shows a battery pack 1550 configured to detachably couple to a portion (e.g., the underside) of the body 1502 of the UAV 1500. FIG. 15B shows the battery pack 1550 separated from the body 1502 of the UAV 1500. Notably, the body 1502 of the UAV 1500 may have a low (i.e., thin) profile such that when the battery pack 1550 is detached, the UAV 1500 can be easily stored or transported.

Figure 15C:
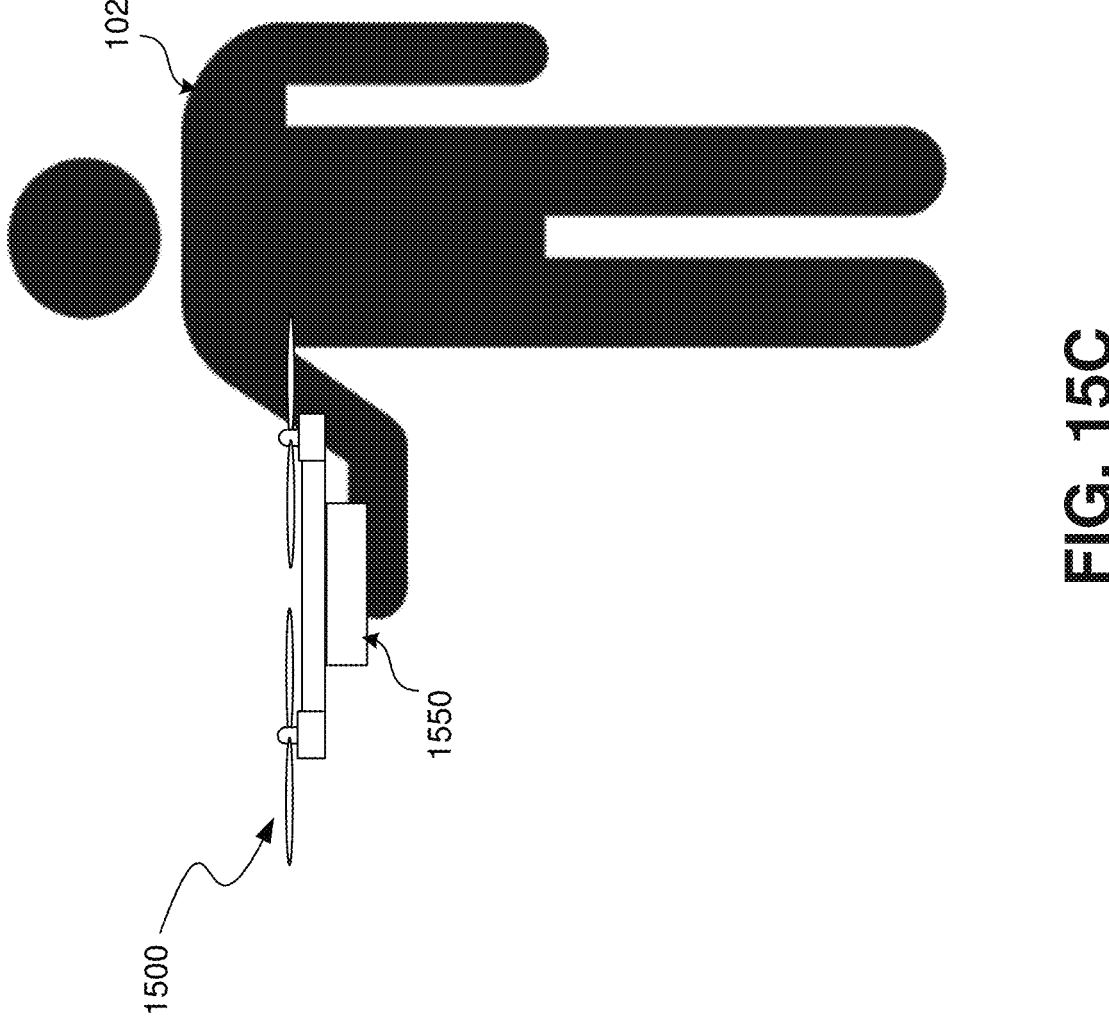
FIG. 15C shows a view of a user holding the example UAV of FIG. 15A.

FIG. 15C shows how a user 102 may hold the UAV 1500 by gripping the battery pack component 1550 during launch and landing of the UAV 1500. Note that the battery pack component 1550 is depicted in FIGS. 15A-15C as having a rectangular shape; however, this is for illustrative simplicity. The battery pack component 1550 may be shaped differ-ently, for example, to accommodate both ergonomic and aerodynamic considerations. In some embodiments, a hous-ing of the battery pack component 1550 may include tex-tured surface elements to help a user grip the UAV 1500 during launch and landing.

In some embodiments, the removable battery pack com-ponent 1550 can be detachably coupled (both structurally and electrically) to the body 1502 of the UAV 1500 using one or more magnetic contacts/couplings. In addition to facilitating easy attaching and detaching of the battery pack 1550, a magnetic coupling also has the added benefit of allowing the battery pack 1550 to self-eject if the UAV 1500 runs into an obstacle while in flight. Allowing the battery pack 1550 (likely one of the more massive components on board the UAV) to eject upon impact may help to absorb some of the energy of the impact, thereby avoiding extensive damage to the body 1502 of the UAV 1500.

Figure 15D:
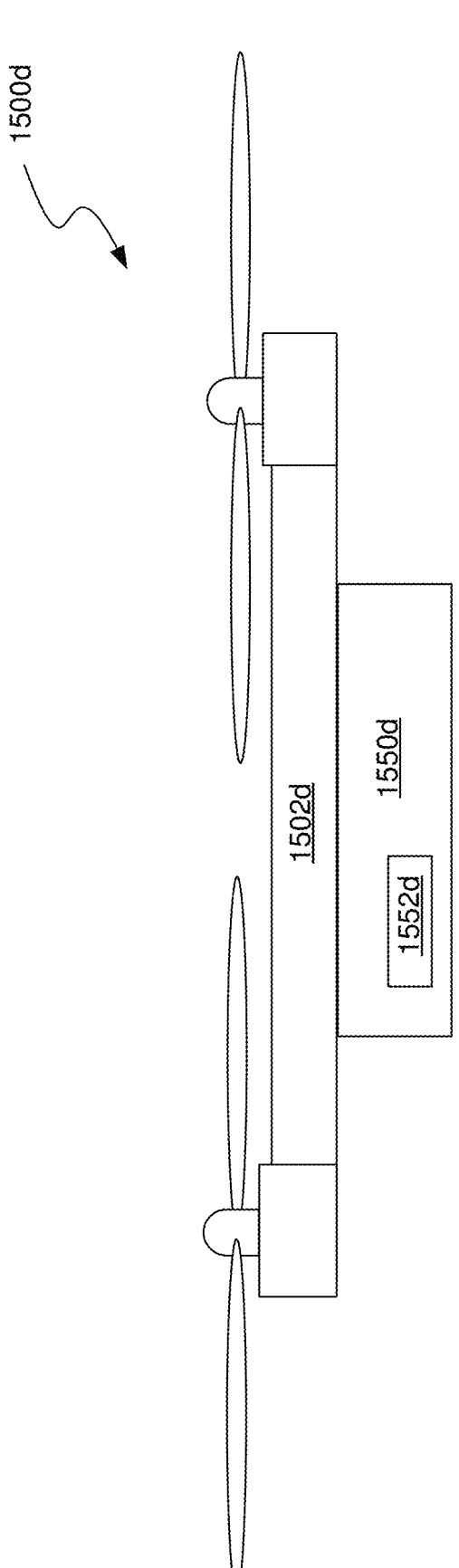
FIG. 15D shows a side view of an example UAV with a removable battery that includes a user interface component.

In some embodiments, a removable battery pack 1550 may include user interface features, for example, to allow a user to provide a control input to the UAV. In such embodi-ments, the user interface features (e.g., in the form of an input device) may be communicatively coupled to an inter-nal control system (e.g., navigation system 120) of the UAV, for example, via the detachable magnetic contacts. FIG. 15D shows a side view of an example UAV 1500d similar to UAV 1500, but with a user interface component on the battery pack. As shown in FIG. 15D, a removable battery pack component 1550d includes a user interface component 1552d and is detachably coupled to the underside of the body 1502d of the UAV 1500d. In some embodiments, the user interface component 1552d may comprise a single launch button, which when pressed by a user causes the UAV 1500d to launch and enter autonomous flight. Other embodiments may include more complex user interface features, such as additional input devices to set certain flight parameters/constraints (e.g., flight mode, follow distance, altitude, etc.). In some embodiments, the user interface component 1500d may comprise a touch screen display through which various contextual user interfaces can be displayed.

Gimbal Fastener

Figure 16A:
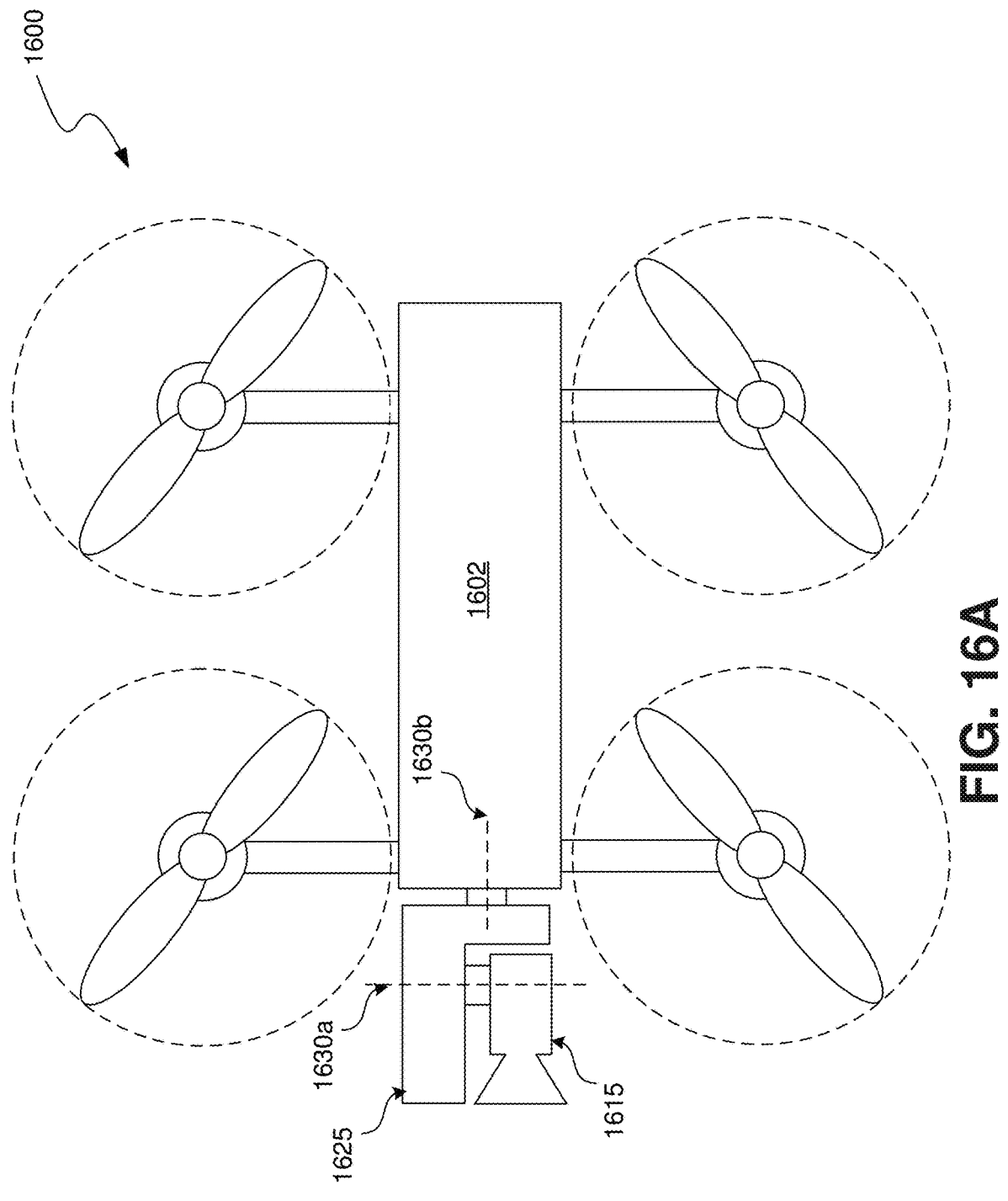
FIG. 16A shows a top view of an example UAV with a gimbaled image capture device.

As previously discussed, a UAV may include a gimbaled image capture device (e.g., image capture device 115) con-figured for capturing images (including video) for later viewing. The gimbaled image capture device may be coupled to the body of the UAV via a gimbal mechanism that allows the image capture device to change position and/or orientation relative to the body of the UAV, for example, for image stabilization and/or subject tracking. FIG. 16A shows a top view of an example UAV 1600 that includes a gimbaled image capture device 1615 coupled to the body 1602 via a gimbal mechanism with two mechanical degrees of freedom. Specifically, the gimbal mechanism 1625 pro-vides for rotation of the image capture device 1615 about axis 1630a and axis 1630b, for example, through the use of electronic servo motors.

Figure 16C:
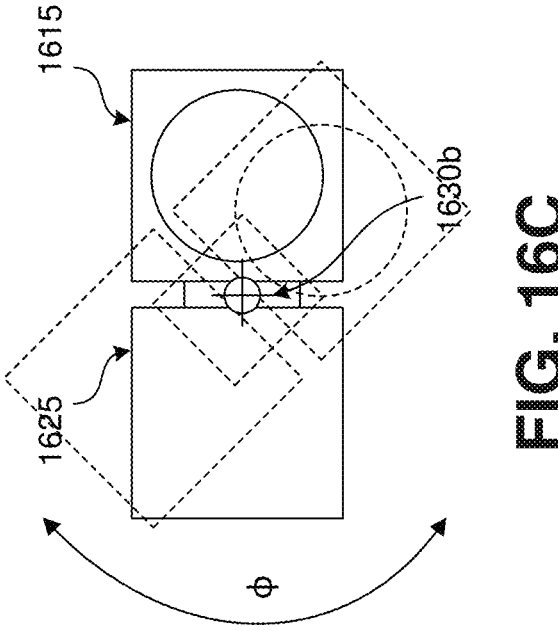
FIG. 16C shows a front view of the gimbaled image capture device of the UAV of FIG. 16A.
Figure 16B:
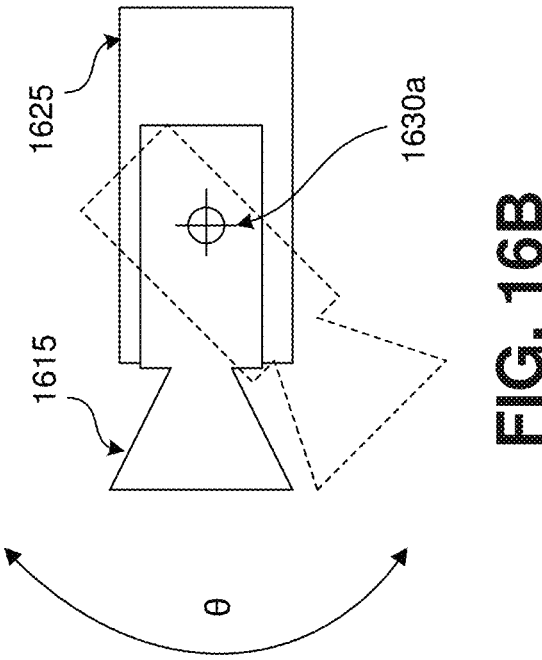
FIG. 16B shows a side view of the gimbaled image capture device of the UAV of FIG. 16A.

FIG. 16B shows a side view of the image capture device 1615 and gimbal mechanism 1625 assembly that illustrates rotation about axis 1630a. Similarly, FIG. 16C shows a front view of the image capture device 1615 and gimbal mechanism 1625 assembly that illustrates rotation about axis 1630*b*. During use, the gimbal mechanism 1625 is operable to rotate about the two axes within certain constraints. For example, when powered, the angle θ of rotation of the gimbal mechanism 1625 about axis 1630*a* may be limited to plus or minus 45 degrees. Similarly, when powered, the angle φ of rotation of the gimbal mechanism 1625 about axis 1630*b* may be limited to plus or minus 45 degrees.

When not powered (i.e., when the UAV is off), the servo motors of the gimbal mechanism 1625 do not operate, thereby allowing the gimbal mechanism 1625 to freely rotate about the axes 1630*a-b*. Such freedom of motion may be problematic during storage or transport, as it may lead to damage of the attached image capture device 1615, the gimbal mechanism 1625, and/or the body 1602 of the UAV 1600. A gimbal locking mechanism can be implemented to secure the gimbal mechanism 1625 (and connected camera 1615) in place when the UAV is powered off.

Figure 16D:
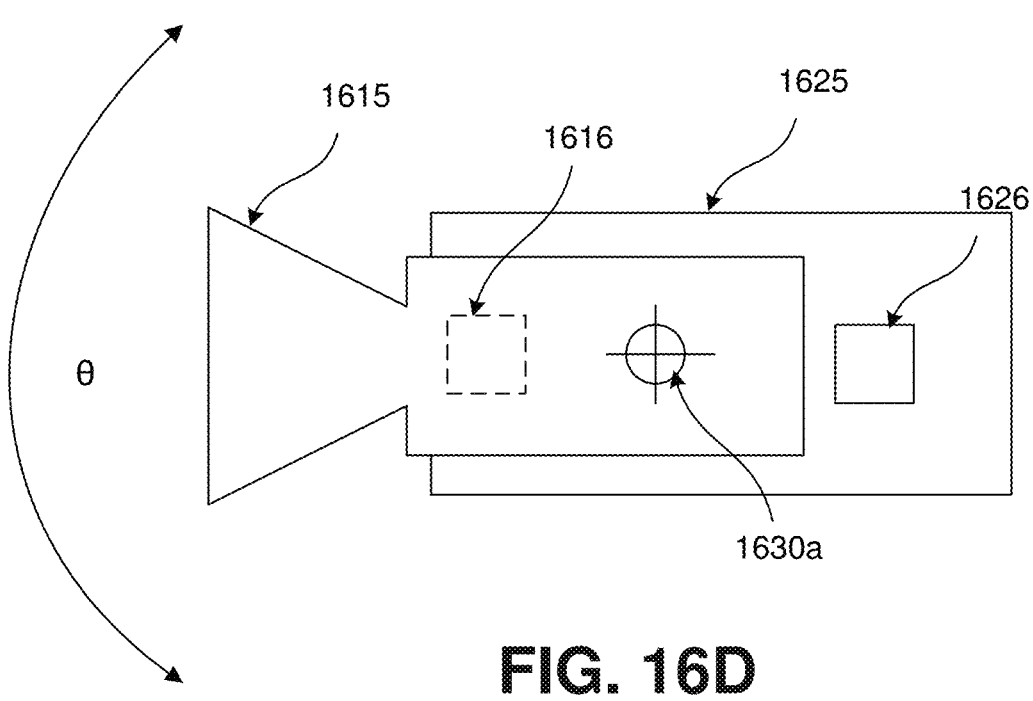
FIG. 16D shows a side view of the gimbaled image capture device of the UAV of FIG. 16A in an unlocked position.
Figure 16E:
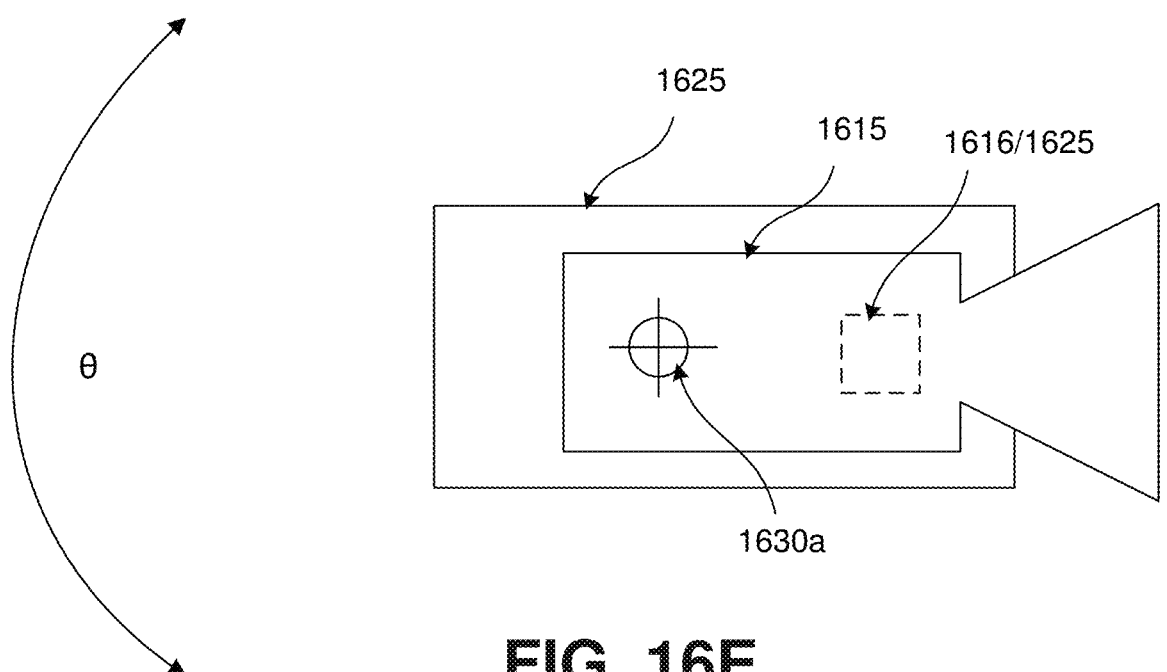
FIG. 16E shows a side view of the gimbaled image capture device of the UAV of FIG. 16A in a locked position.

FIGS. 16D and 16E illustrate the operation of a locking mechanism that can be utilized to secure the gimbal 1625 and associated image capture device 1615 in place when the UAV 1600 is powered off. Specifically, FIG. 16D shows a side view (e.g., similar to FIG. 16B) of the image capture device 1615 and gimbal 1625 assembly. The assembly further includes a first locking component 1616 attached to the image capture device 1615 (specifically the opposite side of image capture device 1615 as indicated by the broken line) and a second locking component 1626 attached to the gimbal 1625. The first locking component 1616 and second locking component 1625 are arranged to interact with each other when the image capture device 1625 is rotated past the typical range of motion (e.g., plus or minus 45 degrees). For example, as shown in FIG. 16E, the first locking component 1616 and second locking component 1625 are arranged to interact with each other when the image capture device 1615 is rotated about axis 1630*a* approximately 180 degrees to face backwards.

The first locking component 1616 and second locking component 1625 may comprise, for example, opposing mechanical clips, opposing magnets, or any other types of elements configured to detachably couple to each other to prevent rotation of the image capture device 1615 about axis 1630*a* relative to the gimbal 1625 when the UAV 1600 is not powered.

Although not depicted in the figures, similar locking components can be utilized to prevent rotation about axis 1630*b*, or any other motion by the image capture device 1615 not depicted in the figures.

In some embodiments, a UAV may be configured with an auto-stowing feature that causes the motors of the gimbal mechanism 1625 to automatically actuate to rotate the attached image capture device 1615 into a locking position, for example, prior to powering down, in response to an environmental condition (e.g., high winds), in response to a system status (e.g., low battery or tracking/calibration errors), or in response to user input to secure the gimbal.

Fixed-Wing Configurations

Figure 17:
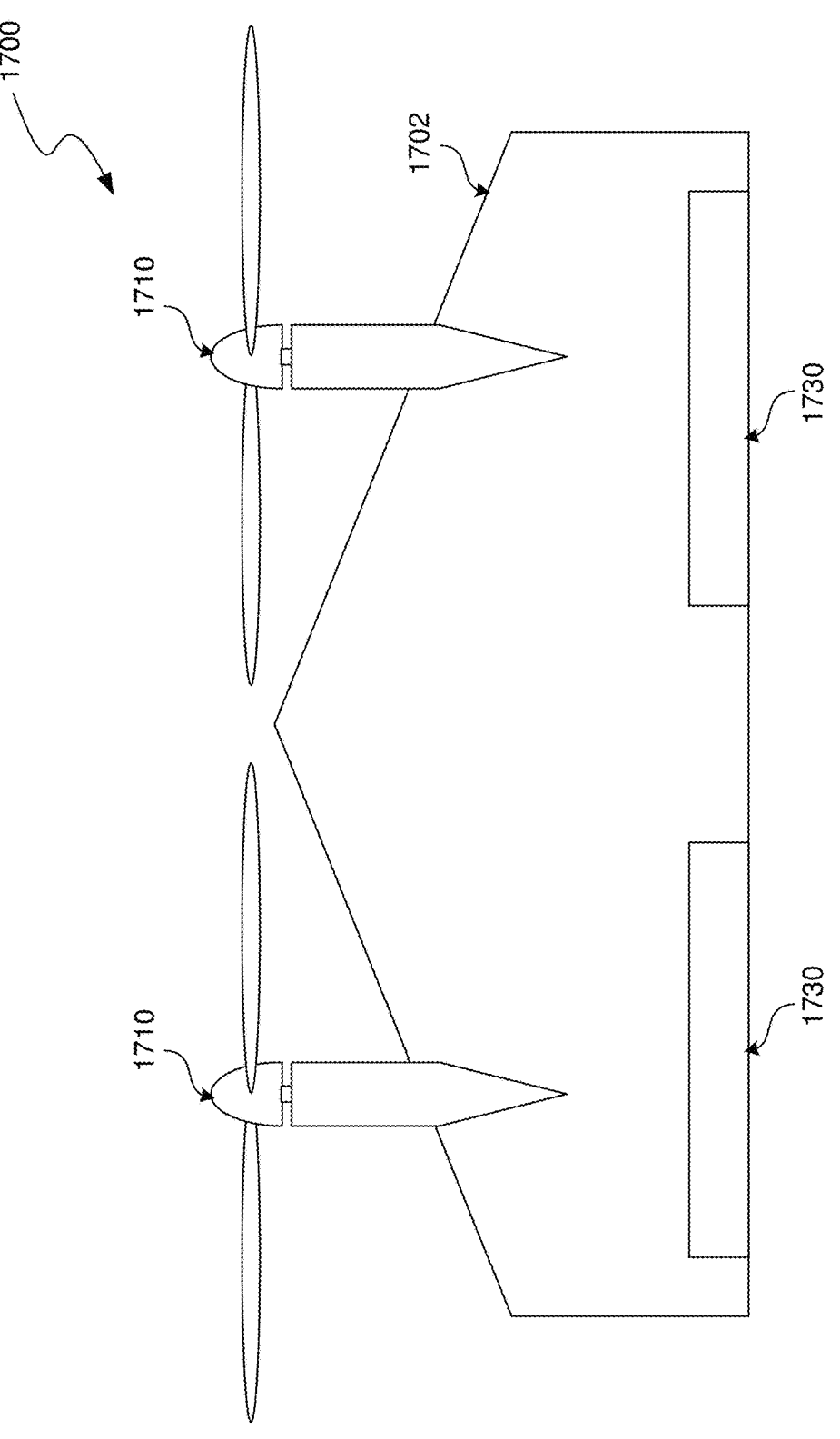
FIG. 17 shows a top view of a first example fixed-wing UAV.

In some embodiments, an autonomous UAV may be configured as a fixed-wing aircraft. FIG. 17 shows a top view of an example UAV 1700 that includes fixed flight surfaces 1702. The example UAV 1700 shown in FIG. 17 is depicted in a "flying wing" configuration in which the body and flight surfaces (i.e., wings) are integrated. Other embodiments may include a distinct body (i.e., fuselage) and distinct flight surfaces (e.g., wings, tails, stabilizers, etc.). The example UAV 1700 also includes a propulsion system which comprises two powered rotors 1710 mounted to the fixed flight surface 1702. Other embodiments may include more or fewer rotors, other types of engines (e.g., jet engines) instead of rotors, and/or may arrange the engines differently. The example UAV 1700 also includes control surfaces 1730 associated with the fixed flight surfaces. Control surfaces 1730 can include, for example, ailerons, flaps, slats, rudders, elevators, spoilers, etc. The control surfaces 1730 of example UAV 1700 depicted in FIG. 17 comprise two tailing control surfaces in the fixed flight surface 1702 that when actuated, may operate as a combination of any of the aforementioned types of control surfaces.

Figure 18:
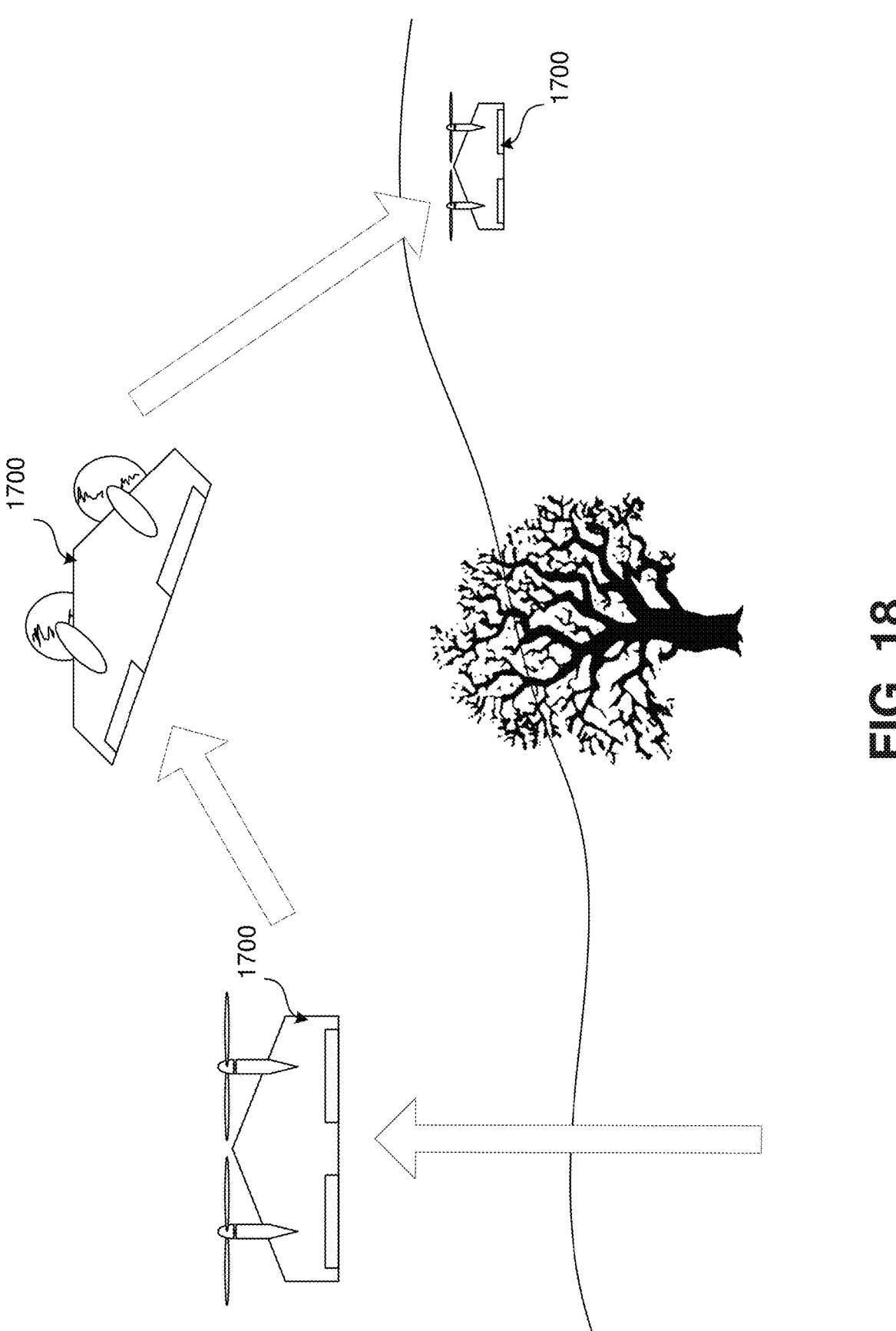
FIG. 18 shows a diagram of an example flight profile of the example fixed-wing UAV of FIG. 17.

FIG. 18 shows a basic flight profile of an example UAV 1700 configured for vertical takeoff and landing (VTOL). As shown in FIG. 18, the UAV 1700 may launch vertically. During launch, lift is provided primarily by the rotors. As the UAV 1700 builds speed, it gradually transitions to horizontal flight, where lift is provided primarily by the fixed flight surfaces. When landing, the example UAV 1700 again transitions to a vertical orientation, where lift is provided primarily by the rotors. In some embodiments, the UAV 1700 may include variable pitch rotors and/or rotor blades that are adjusted during periods of transition between vertical takeoff/landing and normal flight.

Figure 19A:
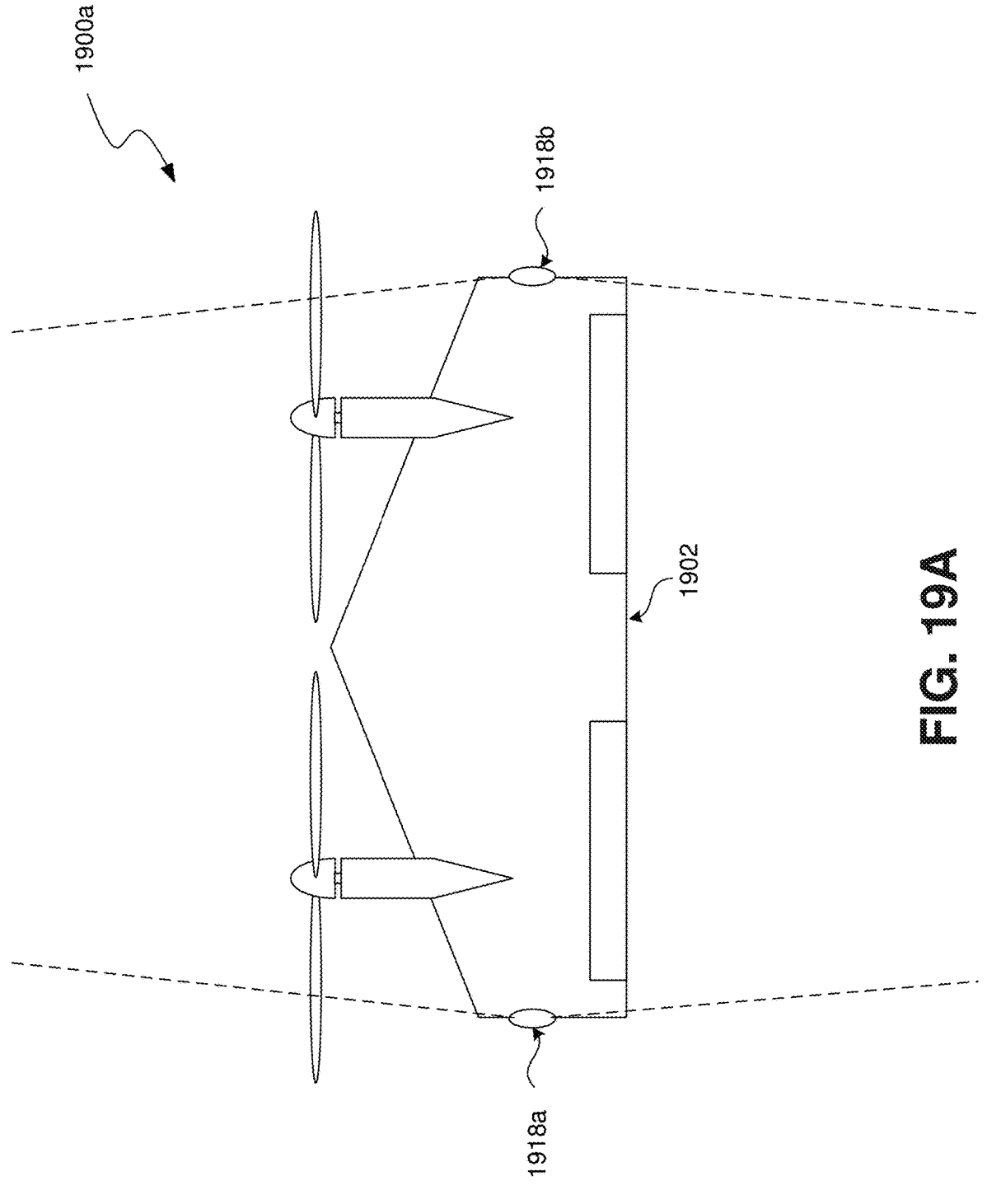
FIG. 19A shows a top view of second example fixed-wing UAV.

A fixed-wing UAV can include an autonomous visual navigation system similar to the visual navigation system 120 depicted in FIG. 2. Similar to UAV 100, a fixed-wing UAV may include one or more navigation cameras for visual navigation, as well as one or more subject cameras for capturing images of the surrounding physical environment. FIG. 19A shows an example fixed-wing UAV 1900*a* similar to UAV 1700 depicted in FIG. 17. As shown in FIG. 19A, the example UAV 1900*a* includes two image capture devices 1918*a-b* on opposing ends of the fixed flight surface 1902. Similar to the image capture devices described with respect to FIGS. 4A-11B, image capture devices 1918*a-b* may be configured to capture a wide (e.g., at least 180 degree) FOV.

Figure 19B:
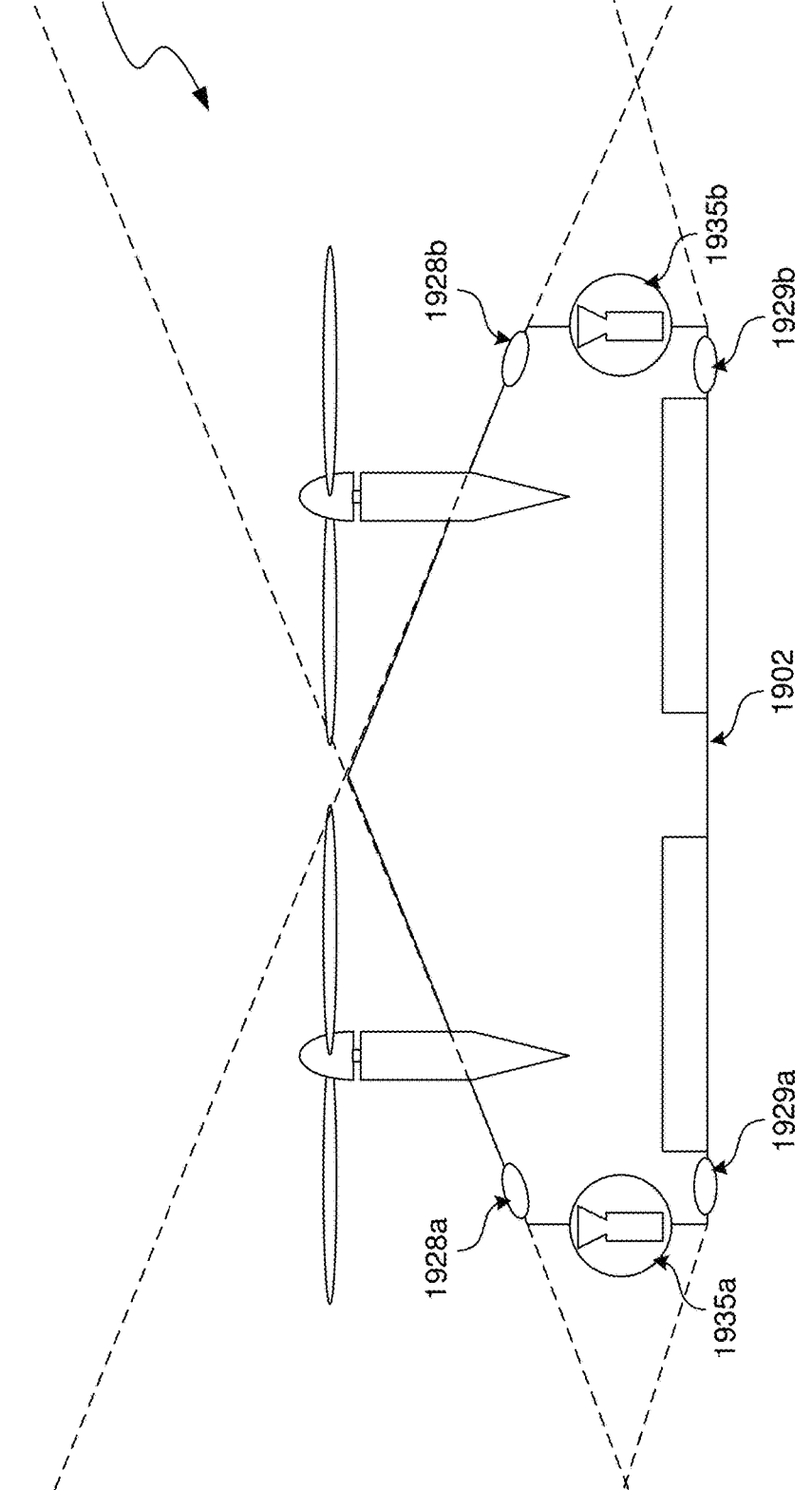
FIG. 19B shows a top view of a third example fixed-wing UAV.

The UAV 1900*a* depicted in FIG. 19A is an example provided for illustrative purposes. Other embodiments may arrange the image capture devices differently. For example, FIG. 19B shows an example UAV 1900*b* that is similar to UAV 1900*a*, but with a different arrangement of image capture devices. Specifically, as shown in FIG. 19B, example UAV 1900*b* includes four image capture devices that are arranged generally at four corners of the fixed-wing flight surface 902. For example, a first image capture device 1928 is located at a leading edge of the left wing, a second image capture device 1929*a* is located at a trailing edge of the left wing, a third image capture device 1928*b* is located at a leading edge of the right wing, and a fourth image capture device 1929*b* is located at a trailing edge of the right wing. In some embodiments, the UAV may also include gimbaled image capture devices (e.g., similar to image capture device 115). FIG. 19B depicts a first gimbaled image capture device 1935*a* located at the tip of the left wing and a second gimbaled image capture device 1935*b* located at a tip of the right wing. Note that the two gimbaled image capture devices are depicted conceptually and may not represent the actual orientation of such devices in certain embodiments. Further, although only two gimbaled image capture devices are depicted, a person having ordinary skill will recognize that more or fewer than two may be implemented. In some embodiments, the two gimbaled image capture devices are used for different purposes. For example, one might be configured to capture visible light, while the other might be configured to capture light at other wavelengths (e.g., infrared light).

Figures 20A, 20B:
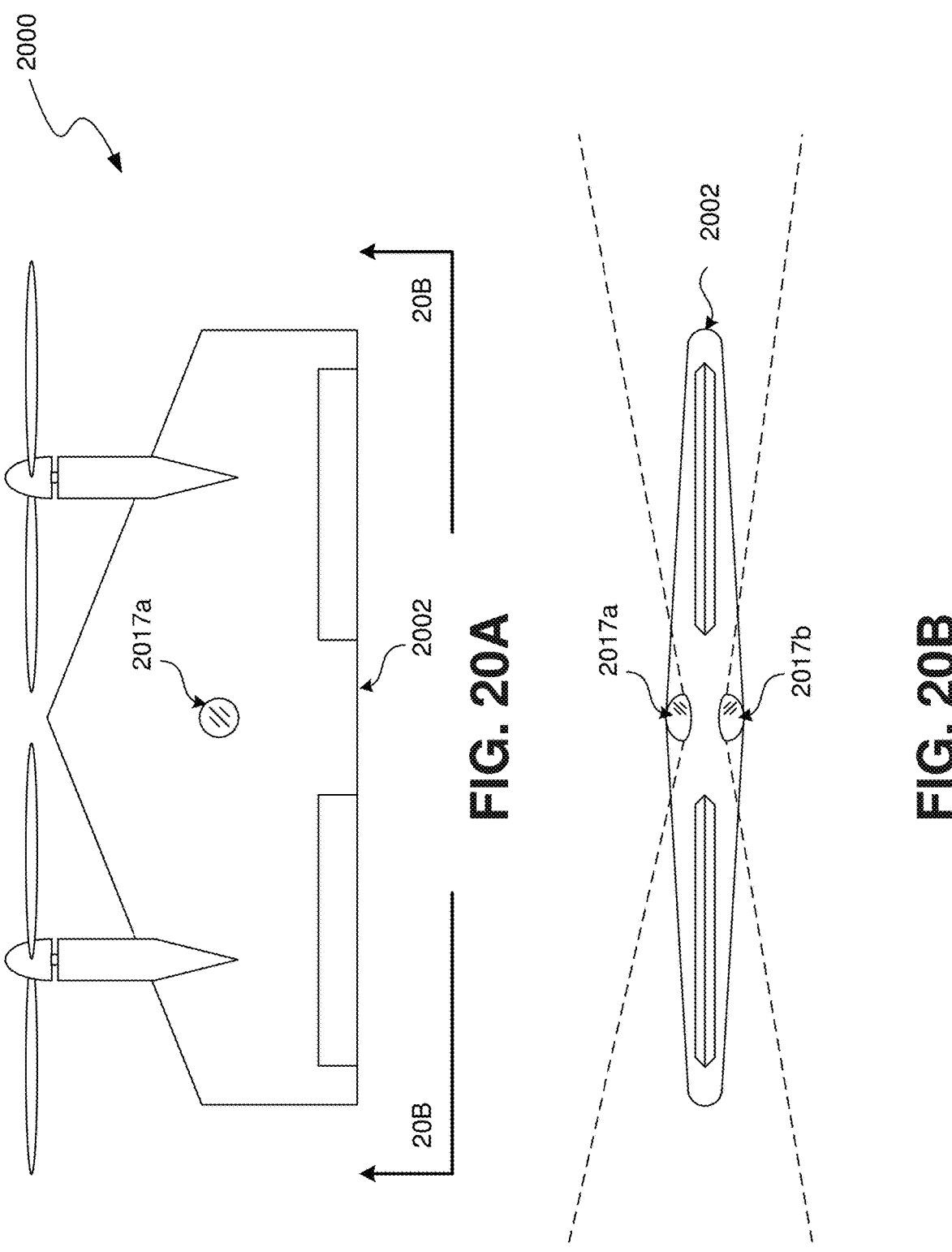
FIG. 20A shows a top view of a fourth example fixed-wing UAV.
FIG. 20B shows a rear view of the example UAV of FIG. 20A.

FIGS. 20A-20B show a top view and side view (respectively) of another example UAV 2000 that includes an upwards facing image capture device 2017*a* and a downwards facing image capture device 2017*b*, both on the fixed flight surface 2002. Such an arrangement may be utilized to provide better perception above and below the UAV during flight. Other embodiments may include more image capture devices than are depicted in FIGS. 17 and 20A-20B. For example, a UAV (not shown) may include both the side image capture devices 1718*a*-*b* and upward/downward-facing image capture devices 2017*a*-*b*. Further a fixed-wing UAV may also include a gimbaled image capture device, for example, similar to image capture device 115 that is coupled to the body of the UAV 2000.

Figure 21A:
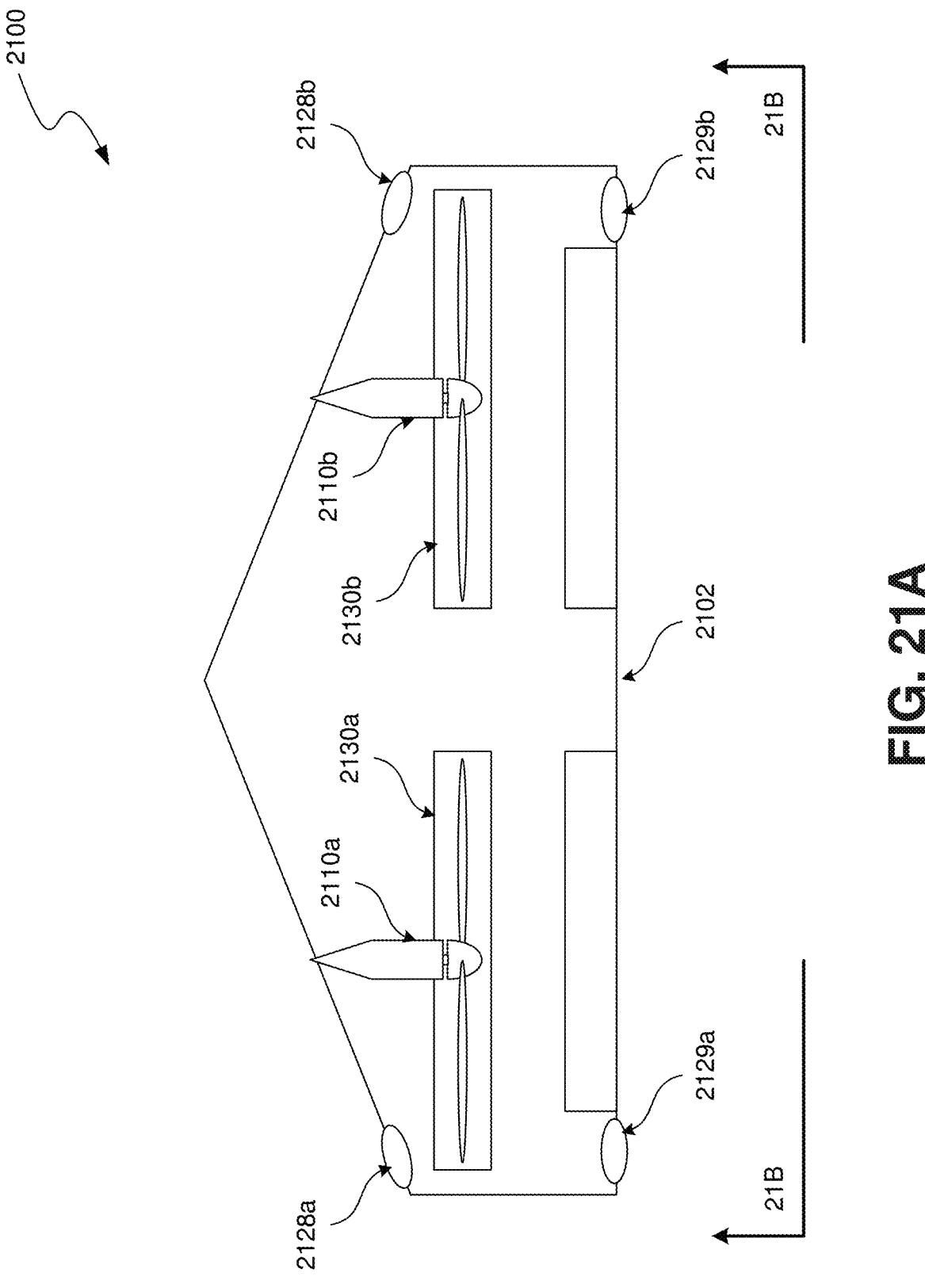
FIG. 21A shows a top view of a fifth example fixed-wing UAV.
Figure 21B:
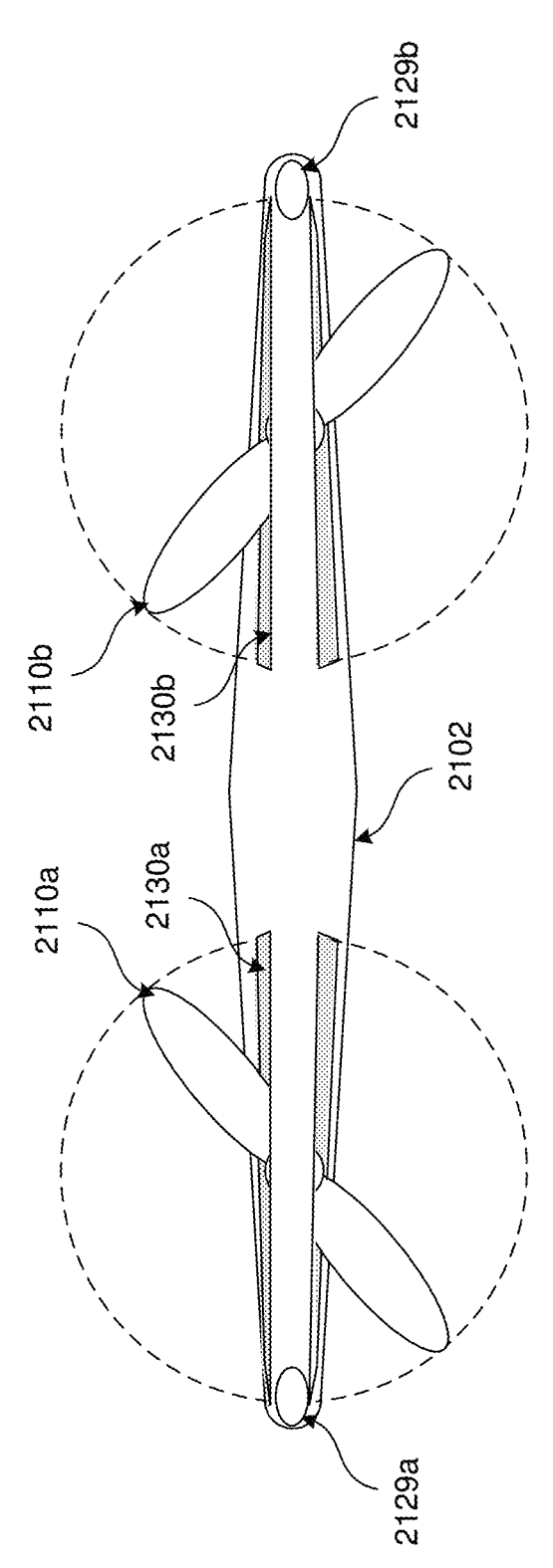
FIG. 21B shows a rear view of the example UAV of FIG. 21A.
Figure 22A:
FIG. 22A shows a perspective view of a sixth example fixed-wing UAV.
Figure 22A:
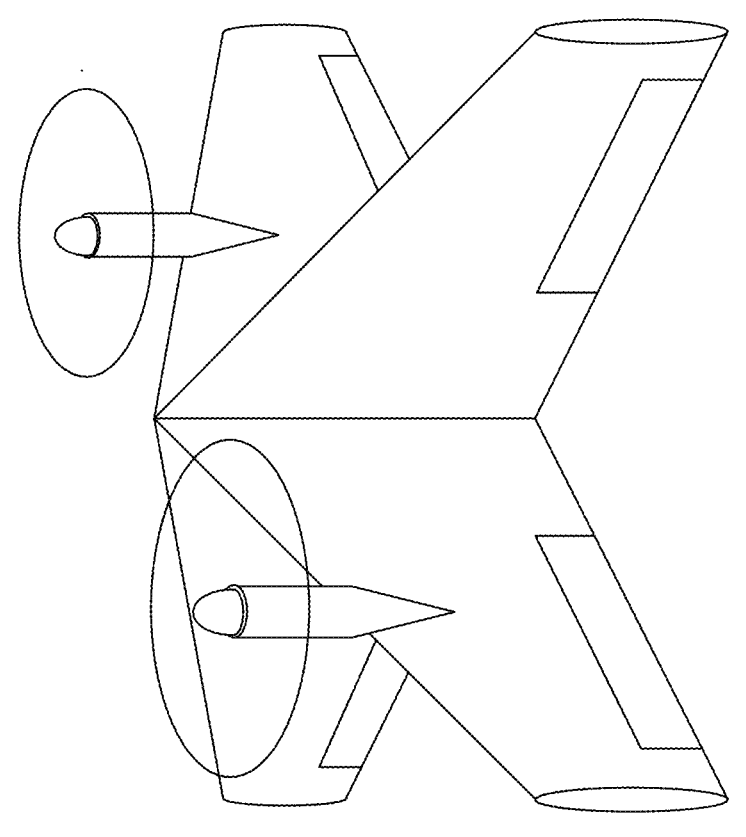
Figure 22B:
FIG. 22B shows a perspective view of a seventh example fixed-wing UAV.
Figure 22B:
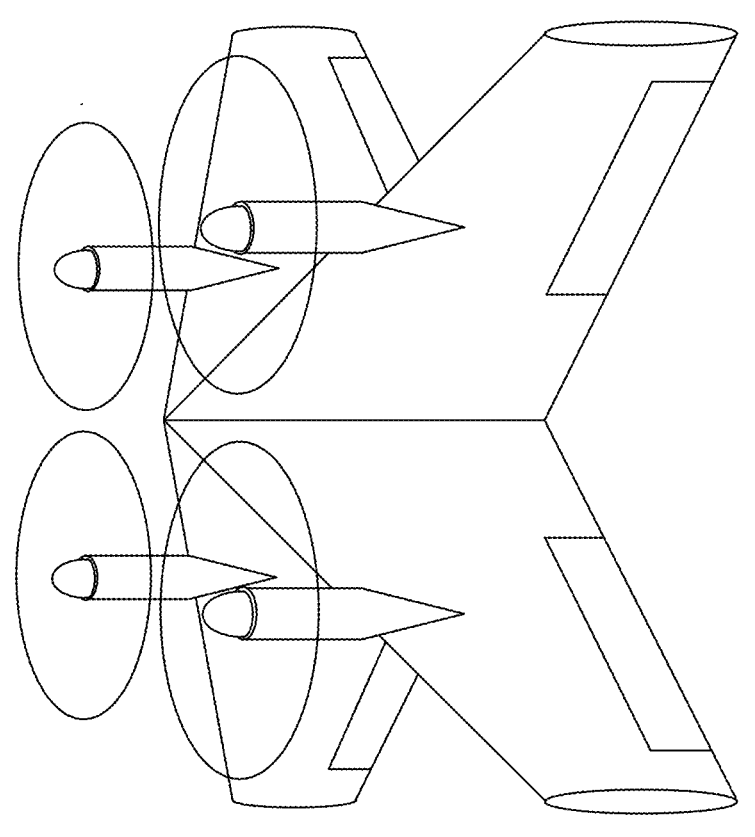

In some embodiments, the powered rotors of a fixed-wing UAV may be rearranged so as to not interfere with image capture devices arranged along leading or training edges of a fixed flight surface. For example, FIGS. 21A and 22B show a top view and a rear view (respectively) of an example UAV 2100 that includes powered rotors 2110*a*-*b* that are arranged substantially between the leading edge and trailing edge of a fixed flight surface 2102. As shown in FIGS. 21A-21B, the rotors 2110*a* and 2110*b* are arranged so as to rotate freely within slots 2130*a* and 2130*b* (respectively) that pass through the fixed wing flight surface 2102. Arranging the rotors 2110*a*-*b* at such a location eliminates any possibility of obfuscation of image capture devices 2128*a*-*b* arranged along the leading edge (as may be present in the example UAVs 1900*a*-*b*) or obfuscation of image capture devices 2129*a*-*b* arrange along the trailing edge. Although not depicted in FIGS. 21A-B, the UAV 2100 may also be equipped with upward and downward facing image capture devices (e.g., as depicted in FIGS. 20A-20B) and/or one or more gimbaled image capture devices (e.g., as depicted in FIGS. 19A-19B).

A fixed-wing UAV can include more fixed flight surfaces than are depicted in FIGS. 17-21B. For example, FIG. 22A shows an example UAV 2200*a* that includes two fixed wings arranged perpendicular to each other. The perpendicular wing may function as an aerodynamic stabilizer during regular flight and may further function to keep the UAV 2200*a* upright on the ground before takeoff and upon landing. FIG. 22B shows an example UAV 2200*b* similar to example UAV 2200*a*, but with four rotors.

Aerial Vehicle—Example System

Figure 23:
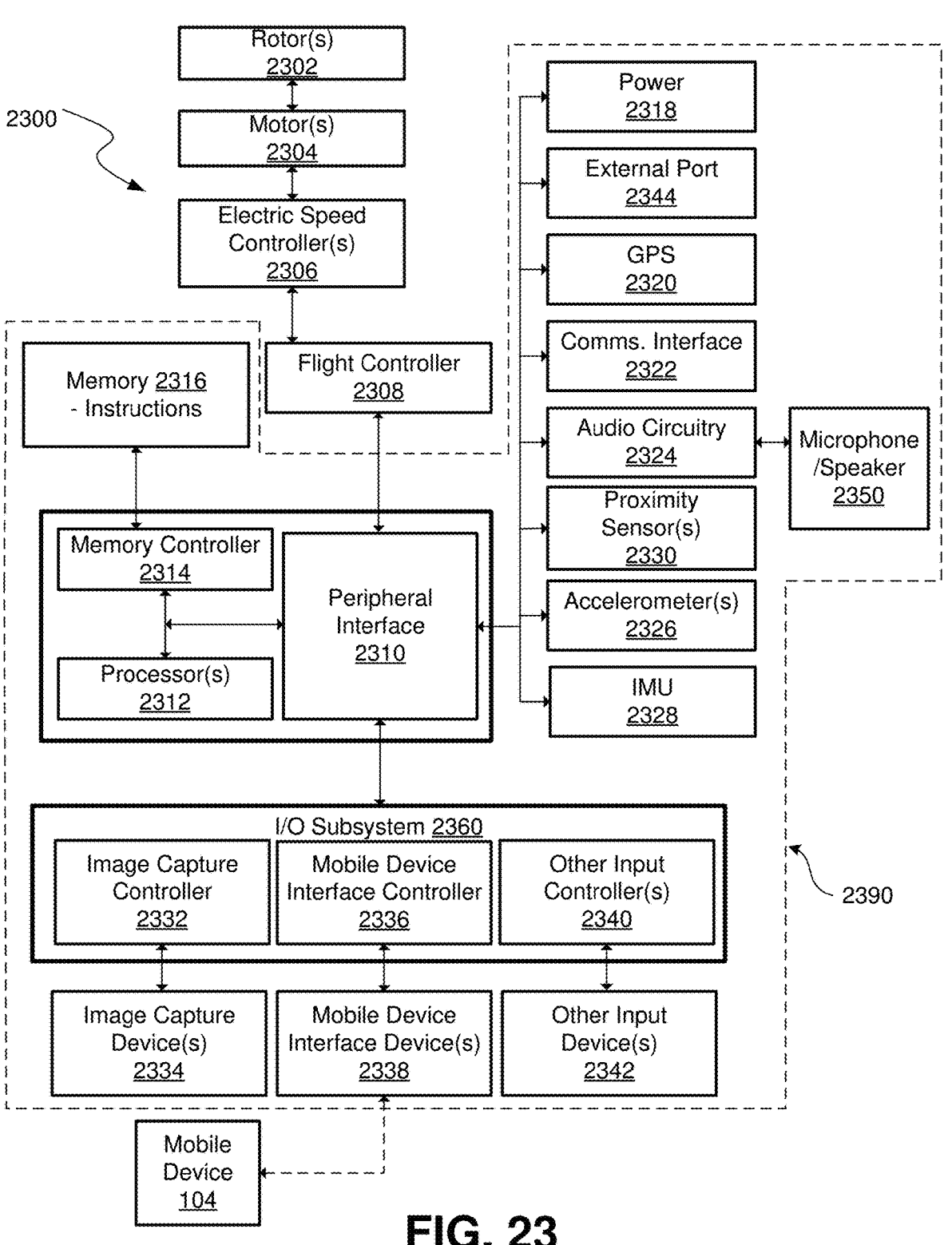
FIG. 23 shows a block diagram of an example aerial vehicle system.

FIG. 23 shows a diagram of an example system 2300 including various functional system components that may be part of any of the aforementioned aerial vehicles, including UAVs 100, 400, 500, 600, 700, 800, 900, 1000, 1100, 1200, 1500, 1500*d*, 1600, 1700, 1900*a*-*b*, 2000, 2100, or 2200. System 2300 may include one or more propulsion systems (e.g., rotors 2302 and motor(s) 2304), one or more electronic speed controllers 2306, a flight controller 2308, a peripheral interface 2310, processor(s) 2312, a memory controller 2314, a memory 2316 (which may include one or more computer-readable storage media), a power module 2318, a GPS module 2320, a communications interface 2322, audio circuitry 2324, an accelerometer 2326 (including subcomponents, such as gyroscopes), an IMU 2328, a proximity sensor 2330, an optical sensor controller 2332 and associated optical sensor(s) 2334, a mobile device interface controller 2336 with associated interface device(s) 2338, and any other input controllers 2340 and input device(s) 2342, for example, display controllers with associated display device(s). These components may communicate over one or more communication buses or signal lines as represented by the arrows in FIG. 23.

System 2300 is only one example of a system that may be part of any of the aforementioned aerial vehicles. Other aerial vehicles may include more or fewer components than shown in system 2300, may combine two or more components as functional units, or may have a different configuration or arrangement of the components. Some of the various components of system 2300 shown in FIG. 23 may be implemented in hardware, software or a combination of both hardware and software, including one or more signal processing and/or application specific integrated circuits. Also, an aerial vehicle may include an off-the-shelf aerial vehicle (e.g., a currently available remote-controlled UAV), coupled with a modular add-on device (for example, one including components within outline 2390), to perform the innovative functions described in this disclosure.

A propulsion system (e.g., comprising components 2302-2304) may comprise fixed-pitch rotors. The propulsion system may also include variable-pitch rotors (for example, using a gimbal mechanism), a variable-pitch jet engine, or any other mode of propulsion having the effect of providing force. The propulsion system may vary the applied thrust, for example, by using an electronic speed controller 2306 to vary the speed of each rotor.

Flight controller 2308 may include a combination of hardware and/or software configured to receive input data (e.g., sensor data from image capture devices 2334, generated trajectories from an autonomous navigation system 120, or any other inputs), interpret the data and output control commands to the propulsion systems 2302-2306 and/or aerodynamic surfaces (e.g., fixed-wing control surfaces) of the aerial vehicle. Alternatively, or in addition, a flight controller 2308 may be configured to receive control commands generated by another component or device (e.g., processors 2312 and/or a separate computing device), interpret those control commands and generate control signals to the propulsion systems 2302-2306 and/or aerodynamic surfaces (e.g., fixed-wing control surfaces) of the aerial vehicle. In some embodiments, the previously mentioned navigation system 120 may comprise the flight controller 2308 and/or any one or more of the other components of system 2300. Alternatively, the flight controller 2308 shown in FIG. 23 may exist as a component separate from the navigation system 120, for example, similar to the flight controller 160 shown in FIG. 2.

Memory 2316 may include high-speed random-access memory and may also include non-volatile memory, such as one or more magnetic disk storage devices, flash memory devices, or other non-volatile solid-state memory devices. Access to memory 2316 by other components of system 2300, such as the processors 2312 and the peripherals interface 2310, may be controlled by the memory controller 2314.

The peripherals interface 2310 may couple the input and output peripherals of system 2300 to the processor(s) 4112 and memory 2316. The one or more processors 2312 run or execute various software programs and/or sets of instructions stored in memory 2316 to perform various functions for the UAV 100 and to process data. In some embodiments, processors 2312 may include general central processing units (CPUs), specialized processing units, such as graphical processing units (GPUs), particularly suited to parallel processing applications, or any combination thereof. In some embodiments, the peripherals interface 2310, the processor (s) 2312, and the memory controller 2314 may be implemented on a single integrated chip. In some other embodiments, they may be implemented on separate chips.

The network communications interface 2322 may facilitate transmission and reception of communications signals often in the form of electromagnetic signals. The transmission and reception of electromagnetic communications signals may be carried out over physical media such as copper wire cabling or fiber optic cabling, or may be carried out wirelessly, for example, via a radiofrequency (RF) transceiver. In some embodiments, the network communications interface may include RF circuitry. In such embodiments, RF circuitry may convert electrical signals to/from electromagnetic signals and communicate with communications networks and other communications devices via the electromagnetic signals. The RF circuitry may include well-known circuitry for performing these functions, including, but not limited to, an antenna system, an RF transceiver, one or more amplifiers, a tuner, one or more oscillators, a digital signal processor, a CODEC chipset, a subscriber identity module (SIM) card, memory, and so forth. The RF circuitry may facilitate transmission and receipt of data over communications networks (including public, private, local, and wide area). For example, communication may be over a wide area network (WAN), a local area network (LAN), or a network or networks such as the Internet. Communication may be facilitated over wired transmission media (e.g., via Ethernet) or wirelessly. Wireless communication may be over a wireless cellular telephone network, a wireless local area network (LAN) and/or a metropolitan area network (MAN), and other modes of wireless communication. The wireless communication may use any of a plurality of communications standards, protocols and technologies, including, but not limited to, Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11n and/or IEEE 802.11ac), Voice Over Internet Protocol (VoIP), Wi-MAX, or any other suitable communication protocols.

The audio circuitry 2324, including the speaker and microphone 2350, may provide an audio interface between the surrounding physical environment and the aerial vehicle. The audio circuitry 2324 may receive audio data from the peripherals interface 2310, convert the audio data to an electrical signal, and transmit the electrical signal to the speaker 2350. The speaker 2350 may convert the electrical signal to human-audible sound waves. The audio circuitry 2324 may also receive electrical signals converted by the microphone 2350 from sound waves. The audio circuitry 2324 may convert the electrical signal to audio data and transmit the audio data to the peripherals interface 2310 for processing. Audio data may be retrieved from and/or transmitted to memory 2316 and/or the network communications interface 2322 by the peripherals interface 2310.

The I/O subsystem 2360 may couple input/output peripherals of the aerial vehicle, such as an optical sensor system 2334, the mobile device interface 2338, and other input/control devices 2342, to the peripherals interface 2310. The I/O subsystem 2360 may include an optical sensor controller 2332, a mobile device interface controller 2336, and other input controller(s) 2340 for other input or control devices. The one or more input controllers 2340 receive/send electrical signals from/to other input or control devices 2342.

The other input/control devices 2342 may include physical buttons (e.g., push buttons, rocker buttons, etc.), dials, touchscreen displays, slider switches, joysticks, click wheels, and so forth.

The mobile device interface device 2338 along with mobile device interface controller 2336 may facilitate the transmission of data between the aerial vehicle and other computing devices such as a mobile device 104. According to some embodiments, communications interface 2322 may facilitate the transmission of data between the aerial vehicle and a mobile device 104 (for example, where data is transferred over a Wi-Fi network).

System 1200 also includes a power system 1218 for powering the various components. The power system 1218 may include a power management system, one or more power sources (e.g., battery, alternating current (AC), etc.), a recharging system, a power failure detection circuit, a power converter or inverter, a power status indicator (e.g., a light-emitting diode (LED)) and any other components associated with the generation, management and distribution of power in computerized device.

System 2300 may also include one or more image capture devices 2334. Image capture devices 2334 may be the same as any of the image capture devices associated with any of the aforementioned aerial vehicles including UAVs 100, 400, 500, 600, 700, 800, 900, 1000, 1100, 1200, 1500, 1500_d_, 1600, 1700, 1900_a-b_, 2000, 2100, or 2200. FIG. 23 shows an image capture device 2334 coupled to an image capture controller 2332 in I/O subsystem 2360. The image capture device 2334 may include one or more optical sensors. For example, image capture device 2334 may include charge-coupled device (CCD) or complementary metal-oxide semiconductor (CMOS) phototransistors. The optical sensors of image capture devices 2334 receive light from the environment, projected through one or more lenses (the combination of an optical sensor and lens can be referred to as a "camera"), and converts the light to data representing an image. In conjunction with an imaging module located in memory 2316, the image capture device 2334 may capture images (including still images and/or video). In some embodiments, an image capture device 2334 may include a single fixed camera. In other embodiments, an image capture device 2340 may include a single adjustable camera (adjustable using a gimbal mechanism with one or more axes of motion). In some embodiments, an image capture device 2334 may include a camera with a wide-angle lens providing a wider FOV (e.g., at least 180 degrees). In some embodiments, an image capture device 2334 may include an array of multiple cameras providing up to a full 360 degree view in all directions. In some embodiments, an image capture device 2334 may include two or more cameras (of any type as described herein) placed next to each other in order to provide stereoscopic vision. In some embodiments, an image capture device 2334 may include multiple cameras of any combination as described above. In some embodiments, the cameras of an image capture device 2334 may be arranged such that at least two cameras are provided with overlapping FOV at multiple angles around the aerial vehicle, thereby enabling stereoscopic (i.e., 3D) image/video capture and depth recovery (e.g., through computer vision algorithms) at multiple angles around aerial vehicle. In some embodiments, the aerial vehicle may include some cameras dedicated for image capture of a subject and other cameras dedicated for image capture for visual navigation (e.g., through visual inertial odometry).

UAV system 2300 may also include one or more proximity sensors 2330. FIG. 23 shows a proximity sensor 2330 coupled to the peripherals interface 2310. Alternately, the proximity sensor 2330 may be coupled to an input controller 2340 in the I/O subsystem 2360. Proximity sensors 2330 may generally include remote sensing technology for proximity detection, range measurement, target identification, etc. For example, proximity sensors 2330 may include radar, sonar, and LIDAR.

System 2300 may also include one or more accelerometers 2326. FIG. 23 shows an accelerometer 2326 coupled to the peripherals interface 2310. Alternately, the accelerometer 2326 may be coupled to an input controller 2340 in the I/O subsystem 2360.

System 2300 may include one or more IMU 2328. An IMU 2328 may measure and report the UAV's velocity, acceleration, orientation, and gravitational forces using a combination of gyroscopes and accelerometers (e.g., accelerometer 2326).

System 2300 may include a global positioning system (GPS) receiver 2320. FIG. 23 shows a GPS receiver 2320 coupled to the peripherals interface 2310. Alternately, the GPS receiver 2320 may be coupled to an input controller 2340 in the I/O subsystem 2360. The GPS receiver 2320 may receive signals from GPS satellites in orbit around the earth, calculate a distance to each of the GPS satellites (through the use of GPS software), and thereby pinpoint a current global position of the aerial vehicle.

In some embodiments, the software components stored in memory 2316 may include an operating system, a communication module (or set of instructions), a flight control module (or set of instructions), a localization module (or set of instructions), a computer vision module (or set of instructions), a graphics module (or set of instructions), and other applications (or sets of instructions). For clarity, one or more modules and/or applications may not be shown in FIG. 23.

An operating system (e.g., Darwin™, RTXC, Linux™, Unix™, Apple™ OS X, Microsoft Windows™, or an embedded operating system such as VxWorks™) includes various software components and/or drivers for controlling and managing general system tasks (e.g., memory management, storage device control, power management, etc.), and facilitates communication between various hardware and software components.

A communications module may facilitate communication with other devices over one or more external ports 2344 and may also include various software components for handling data transmission via the network communications interface 2322. The external port 2344 (e.g., Universal Serial Bus (USB), Firewire, etc.) may be adapted for coupling directly to other devices or indirectly over a network (e.g., the Internet, wireless LAN, etc.).

A graphics module may include various software components for processing, rendering, and displaying graphics data. As used herein, the term "graphics" may include any object that can be displayed to a user, including, without limitation, text, still images, videos, animations, icons (such as user-interface objects including soft keys), and the like. The graphics module, in conjunction with a graphics processing unit (GPU) 2312, may process in real time, or near real time, graphics data captured by optical sensor(s) 2334 and/or proximity sensors 2330.

A computer vision module, which may be a component of a graphics module, provides analysis and recognition of graphics data. For example, while the aerial vehicle is in flight, the computer vision module, along with a graphics module (if separate), GPU 2312, and image capture devices (s) 2334, and/or proximity sensors 2330 may recognize and track the captured image of an object located on the ground.

The computer vision module may further communicate with a localization/navigation module and flight control module to update a position and/or orientation of the aerial vehicle and to provide course corrections to fly along a planned trajectory through a physical environment.

A localization/navigation module may determine the location and/or orientation of the aerial vehicle and provide this information for use in various modules and applications (e.g., to a flight control module in order to generate commands for use by the flight controller 2308).

Image capture devices(s) 2334, in conjunction with an image capture device controller 2332 and a graphics module, may be used to capture images (including still images and video) and store them into memory 2316.

The above identified modules and applications each correspond to a set of instructions for performing one or more functions described above. These modules (i.e., sets of instructions) need not be implemented as separate software programs, procedures or modules, and, thus, various subsets of these modules may be combined or otherwise rearranged in various embodiments. In some embodiments, memory 2316 may store a subset of the modules and data structures identified above. Furthermore, memory 2316 may store additional modules and data structures not described above.

Example Computer Processing System

Figure 24:
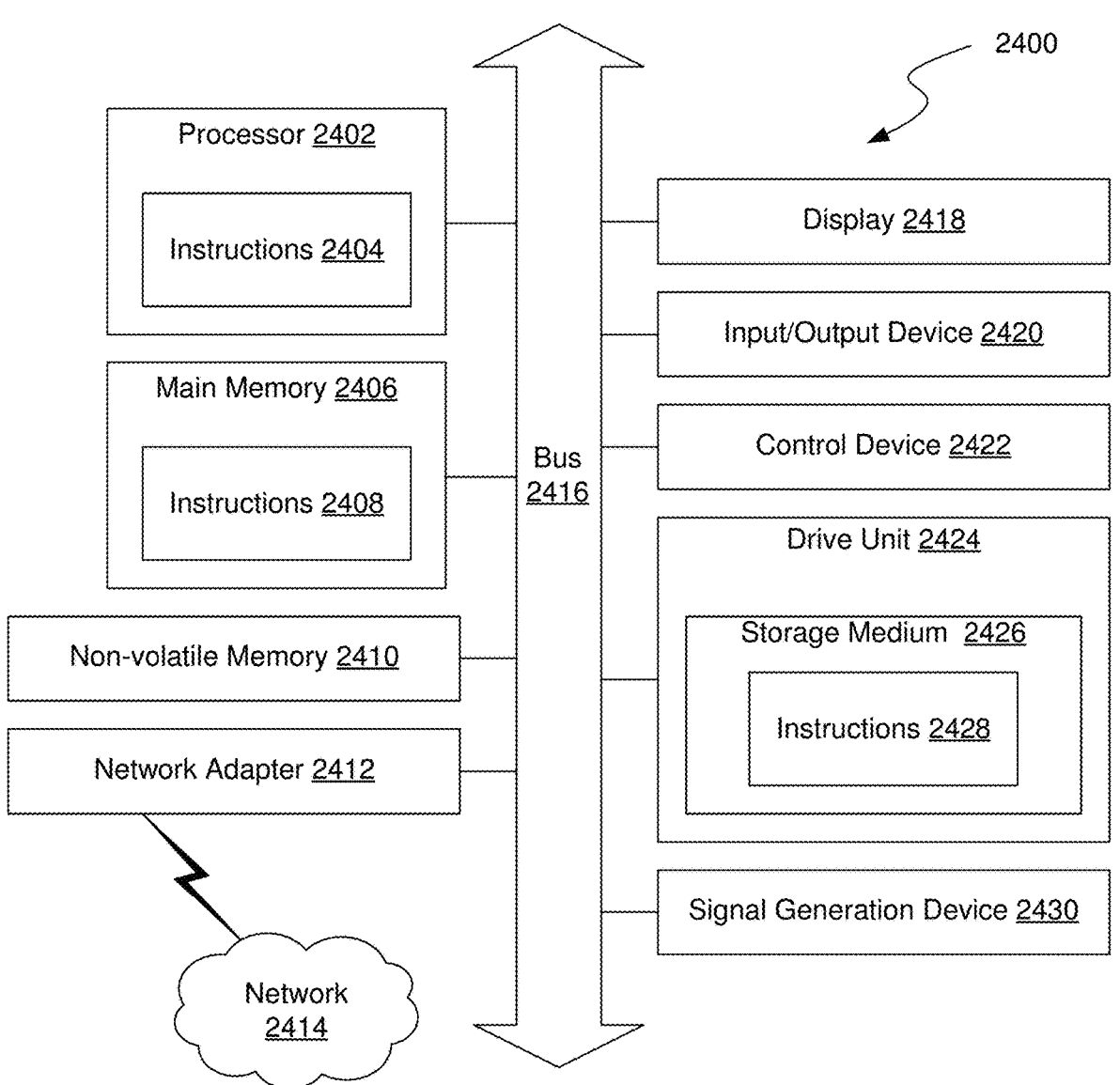
FIG. 24 shows a block diagram of an example computer processing system.

FIG. 24 is a block diagram illustrating an example of a computer processing system 2400 in which at least some operations described in this disclosure can be implemented. The example computer processing system 2400 may be part of any of the aforementioned devices including, but not limited to, mobile device 104 or any of the aforementioned UAVs 100, 400, 500, 600, 700, 800, 900, 1000, 1100, 1200, 1500, 1500*d*, 1600, 1700, 1900*a-b*, 2000, 2100, or 2200. The processing system 2400 may include one or more processors 2402 (e.g., CPU), main memory 2406, non-volatile memory 2410, network adapter 2412 (e.g., network interfaces), display 2418, input/output devices 2420, control device 2422 (e.g., keyboard and pointing devices), drive unit 2424, including a storage medium 2426, and signal generation device 2430 that are communicatively connected to a bus 2416. The bus 2416 is illustrated as an abstraction that represents any one or more separate physical buses, point-to-point connections, or both, connected by appropriate bridges, adapters, or controllers. The bus 2416, therefore, can include, for example, a system bus, a Peripheral Component Interconnect (PCI) bus or PCI-Express bus, a Hyper-Transport or industry standard architecture (ISA) bus, a small computer system interface (SCSI) bus, a universal serial bus (USB), IIC (I2C) bus, or an Institute of Electrical and Electronics Engineers (IEEE) standard 1394 bus (also called "Firewire"). A bus may also be responsible for relaying data packets (e.g., via full or half duplex wires) between components of the network appliance, such as the switching fabric, network port(s), tool port(s), etc.

While the main memory 2406, non-volatile memory 2410, and storage medium 2426 (also called a "machine-readable medium") are shown to be a single medium, the term "machine-readable medium" and "storage medium" should be taken to include a single medium or multiple media (e.g., a centralized or distributed database, and/or associated caches and servers) that store one or more sets of instructions 2428. The term "machine-readable medium" and "storage medium" shall also be taken to include any medium that is capable of storing, encoding, or carrying a set of instructions for execution by the computing system and that cause the computing system to perform any one or more of the methodologies of the presently disclosed embodiments.

In general, the routines executed to implement the embodiments of the disclosure may be implemented as part of an operating system or a specific application, component, program, object, module, or sequence of instructions referred to as "computer programs." The computer programs typically comprise one or more instructions (e.g., instructions 2404, 2408, 2428), set at various times in various memory and storage devices in a computer, and that, when read and executed by one or more processing units or processors 2402, cause the processing system 2400 to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally, regardless of the particular type of machine or computer-readable media used to actually effect the distribution.

Further examples of machine-readable storage media, machine-readable media, or computer-readable (storage) media include recordable type media such as volatile and non-volatile memory devices 2410, floppy and other removable disks, hard disk drives, optical discs (e.g., Compact Disc Read-Only Memory (CD-ROMS), Digital Versatile Discs (DVDs)), and transmission type media, such as digital and analog communication links.

The network adapter 2412 enables the computer processing system 2400 to mediate data in a network 2414 with an entity that is external to the computer processing system 2400, such as a network appliance, through any known and/or convenient communications protocol supported by the computer processing system 2400 and the external entity. The network adapter 2412 can include one or more of a network adaptor card, a wireless network interface card, a router, an access point, a wireless router, a switch, a multi-layer switch, a protocol converter, a gateway, a bridge, a bridge router, a hub, a digital media receiver, and/or a repeater.

The network adapter 2412 can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including, for example, the access and operation rights of an object by an individual, a machine, and/or an application, and the circumstances under which the permission rights stand.

As indicated above, the techniques introduced here may be implemented by, for example, programmable circuitry (e.g., one or more microprocessors), programmed with software and/or firmware, entirely in special-purpose hardwired (i.e., non-programmable) circuitry, or in a combination or such forms. Special-purpose circuitry can be in the form of, for example, one or more application-specific integrated circuits (ASICs), programmable logic devices (PLDs), field-programmable gate arrays (FPGAs), etc.

Note that any of the embodiments described above can be combined with another embodiment, except to the extent that it may be stated otherwise above, or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended claims. Accordingly, the specifications and drawings are to be regarded in an illustrative sense, rather than a restrictive sense.

What is claimed is:

1. An aerial vehicle comprising:
a body that extends along a longitudinal axis from a forward end to an aft end, the body having a port side and a starboard side on opposite sides of the longitudinal axis;
a first rotor assembly extending from the port side of the body proximate to the forward end of the body;
a second rotor assembly extending from the starboard side of the body proximate to the forward end of the body;
a third rotor assembly extending from the port side of the body proximate to the aft end of the body;
a fourth rotor assembly extending from the starboard side of the body proximate to the aft end of the body;
a plurality of upward-facing image capture devices mounted to capture imagery of a space above the aerial vehicle;
a plurality of downward-facing image capture devices mounted to capture imagery of a space below the aerial vehicle; and
a computer system communicatively coupled to the plurality of upward-facing image capture devices and the plurality of downward-facing image capture devices, the computer system configured to:
process images captured by any one or more of the plurality of upward-facing image capture devices or the plurality of downward-facing image capture devices to estimate a position and/or orientation of the aerial vehicle;
generate a planned trajectory for the aerial vehicle through a physical environment based on the processing of the images; and
control a propulsion system and/or flight surface of the aerial vehicle to cause the aerial vehicle to autonomously maneuver along the planned trajectory.

2. The aerial vehicle of claim 1, wherein:
the plurality of upward-facing image capture devices are oriented relative to a body of the aerial vehicle to enable stereoscopic computer vision substantially above the aerial vehicle; and
the plurality of downward-facing image capture devices are oriented relative to the body of the aerial vehicle to enable stereoscopic computer vision substantially below the aerial vehicle.

3. The aerial vehicle of claim 1, wherein:
the plurality of upward-facing image capture devices include:
three image capture devices arranged on one or more top surfaces of the aerial vehicle so as to enable trinocular stereoscopic computer vision in a first plurality of directions substantially above the aerial vehicle; and the plurality downward-facing image capture devices include:

three image capture devices arranged on one or more bottom surfaces of the aerial vehicle so as to enable trinocular stereoscopic computer vision in a second plurality of directions substantially below the aerial vehicle.

4. The aerial vehicle of claim 1, wherein at least one of the plurality of upward-facing image capture devices and at least one of the plurality of downward-facing image capture devices have overlapping fields of view.

5. The aerial vehicle of claim 1, wherein at least one of the plurality of upward-facing image capture devices or the plurality of downward-facing image capture devices has a field of view of at least 180 degrees.

6. The aerial vehicle of claim 1, wherein the plurality of upward-facing image capture devices and the plurality of downward-facing image capture devices are arranged so as to enable stereoscopic image capture in all directions around the aerial vehicle.

7. The aerial vehicle of claim 1, wherein:

the plurality of upward-facing image capture devices include:

a first image capture device arranged along a top surface of the first rotor assembly;

a second image capture device arranged along a top surface of the second rotor assembly; and a third image capture device arranged along a top surface of the body proximate to the aft end of the body; and the plurality of downward-facing image capture devices include:

a fourth image capture device arranged along a bottom surface of the third rotor assembly;

a fifth image capture device arranged along a bottom surface of the fourth rotor assembly; and a sixth image capture device arranged along a bottom surface of the body proximate to the forward end of the body.

8. The aerial vehicle of claim 1, wherein the first rotor assembly includes a first powered rotor arranged along a bottom surface of the first rotor assembly;

the second rotor assembly includes a second powered rotor arranged along a bottom surface of the second rotor assembly;

the third rotor assembly includes a third powered rotor arranged along a top surface of the third rotor assembly; and the fourth rotor assembly includes a fourth powered rotor arranged along a top surface of the fourth rotor assembly.

9. The aerial vehicle of claim 1, wherein at least one of the first rotor assembly, second rotor assembly, third rotor assembly, or fourth rotor assembly includes:

a support arm that extends from a wall of the body to a rotor housing.

10. The aerial vehicle of claim 9, wherein at least a portion of the support arm, the wall of the body, and the rotor housing are formed as a unitary part in the construction of the aerial vehicle.

11. The aerial vehicle of claim 1, further comprising:

a plurality of protective structural elements, each of the plurality of protective structural elements arranged proximate to a different one of the plurality of upward-facing image capture devices and the plurality of downward-facing image capture devices, the plurality of protective structural elements configured to protect the plurality of upward-facing image capture devices and the plurality of downward-facing image capture devices from contact with physical objects while the aerial vehicle is in use.

12. The aerial vehicle of claim 1, wherein the aerial vehicle is an unmanned aerial vehicle (UAV).

13. The aerial vehicle of claim 1, wherein the aerial vehicle is a fixed-wing aircraft.

14. A computing apparatus comprising one or more non-transitory computer-readable media; and program instructions stored on the one or more computer-readable storage media that, when executed by one or more processors, direct a control system of an aerial vehicle having a plurality of upward-facing image capture devices and a plurality of downward-facing image capture devices to at least:

process images captured by any one or more of the plurality of upward-facing image capture devices or the plurality of downward-facing image capture devices to estimate a position and/or orientation of the aerial vehicle;

generate a planned trajectory for the aerial vehicle through a physical environment based on the processing of the images;

control a propulsion system and/or flight surface of the aerial vehicle to cause the aerial vehicle to autonomously maneuver along the planned trajectory;

wherein the plurality of upward-facing image capture devices are oriented relative to a body of the aerial vehicle to enable stereoscopic computer vision substantially above the aerial vehicle and the plurality of downward-facing image capture devices are oriented relative to the body of the aerial vehicle to enable stereoscopic computer vision substantially below the aerial vehicle; and wherein the aerial vehicle includes a body that extends along a longitudinal axis from a forward end to an aft end, the body having a port side and a starboard side on opposite sides of the longitudinal axis, a first rotor assembly extending from the port side of the body proximate to the forward end of the body, a second rotor assembly extending from the starboard side of the body proximate to the forward end of the body, a third rotor assembly extending from the port side of the body proximate to the aft end of the body, and a fourth rotor assembly extending from the starboard side of the body proximate to the aft end of the body.

15. The apparatus of claim 14, wherein:

the plurality of upward-facing image capture devices include:

a first image capture device arranged along a top surface of the first rotor assembly;

a second image capture device arranged along a top surface of the second rotor assembly; and a third image capture device arranged along a top surface of the body proximate to the aft end of the body; and the plurality of downward-facing image capture devices include:

a fourth image capture device arranged along a bottom surface of the third rotor assembly;

a fifth image capture device arranged along a bottom surface of the fourth rotor assembly; and a sixth image capture device arranged along a bottom surface of the body proximate to the forward end of the body.

16. An unmanned aerial vehicle comprising:

a body that extends along a longitudinal axis from a forward end to an aft end, the body having a port side and a starboard side on opposite sides of the longitudinal axis;

a first rotor assembly extending from the port side of the body proximate to the forward end of the body;

a second rotor assembly extending from the starboard side of the body proximate to the forward end of the body;

a third rotor assembly extending from the port side of the body proximate to the aft end of the body;

a fourth rotor assembly extending from the starboard side of the body proximate to the aft end of the body;

a plurality of upward-facing image capture devices including at least three image capture devices arranged on one or more top surfaces of the aerial vehicle so as to enable trinocular stereoscopic computer vision in a first plurality of directions substantially above the aerial vehicle;

a plurality of downward-facing image capture devices including at least three image capture devices arranged on one or more bottom surfaces of the aerial vehicle so as to enable trinocular stereoscopic computer vision in a second plurality of directions substantially below the aerial vehicle; and a computer system communicatively coupled to the plurality of upward-facing image capture devices and the plurality of downward-facing image capture devices, the computer system configured to:

process images captured by any one or more of the plurality of upward-facing image capture devices or the plurality of downward-facing image capture devices to estimate a position and/or orientation of the aerial vehicle;

generate a planned trajectory for the aerial vehicle through a physical environment based on the processing of the images; and control a propulsion system and/or flight surface of the aerial vehicle to cause the aerial vehicle to autonomously maneuver along the planned trajectory.

17. The unmanned aerial vehicle of claim 16, wherein at least one of the plurality of upward-facing image capture devices and at least one of the plurality of downward-facing image capture devices have overlapping fields of view and at least one of the plurality of upward-facing image capture devices or the plurality of downward-facing image capture devices has a field of view of at least 180 degrees.

18. The aerial vehicle of claim 1, wherein the computer system is further configured to update the planned trajectory in real time in response to visual odometry data extracted from images captured by the image capture devices.

19. The aerial vehicle of claim 1, wherein the planned trajectory avoids regions identified by the computer system as obstacle zones based on depth estimation derived from the stereoscopic image capture.

20. The aerial vehicle of claim 1, wherein the computer system is configured to reject a planned trajectory if any field of view from the image capture devices includes saturated or underexposed pixels exceeding a threshold level.

21. The aerial vehicle of claim 1, wherein the body further includes one or more lateral-facing image capture devices arranged to capture imagery of a lateral environment to the port and starboard sides of the aerial vehicle.

22. The aerial vehicle of claim 1, wherein the computer system is configured to switch from a global navigation satellite system-based localization mode to a vision-only localization mode when GNSS signal strength falls below a threshold.

* * * * *